(12) United States Patent
Chen

(10) Patent No.: US 10,008,123 B2
(45) Date of Patent: Jun. 26, 2018

(54) GENERATING A MISSION PLAN FOR CAPTURING AERIAL IMAGES WITH AN UNMANNED AERIAL VEHICLE

(71) Applicant: Skycatch, Inc., San Francisco, CA (US)

(72) Inventor: David Chen, San Francisco, CA (US)

(73) Assignee: SKYCATCH, INC., San Francisco, CA (US)

( * ) Notice: Subject to any disclaimer, the term of this patent is extended or adjusted under 35 U.S.C. 154(b) by 0 days. days.

(21) Appl. No.: 15/659,133

(22) Filed: Jul. 25, 2017

(65) Prior Publication Data

US 2017/0337824 A1    Nov. 23, 2017

Related U.S. Application Data

(63) Continuation-in-part of application No. 15/291,433, filed on Oct. 12, 2016, now Pat. No. 9,852,639, which
(Continued)

(51) Int. Cl.
*G08G 5/00* (2006.01)
*G05D 1/02* (2006.01)
(Continued)

(52) U.S. Cl.
CPC ......... *G08G 5/0034* (2013.01); *B64C 39/024* (2013.01); *G05D 1/0094* (2013.01);
(Continued)

(58) Field of Classification Search
USPC .......... 701/2, 3, 8, 9, 25, 26, 400, 408, 409, 701/410, 528, 533; 348/144, 153;
(Continued)

(56) References Cited

U.S. PATENT DOCUMENTS

| 6,134,500 A | * | 10/2000 | Tang | G06Q 10/047 |
| | | | | 701/10 |
| 7,580,776 B1 | * | 8/2009 | McCusker | G01C 23/00 |
| | | | | 701/10 |

(Continued)

OTHER PUBLICATIONS

U.S. Appl. No. 14/887,954, Apr. 22, 2016, Office Action.
(Continued)

*Primary Examiner* — Jonathan L Sample
(74) *Attorney, Agent, or Firm* — Keller Jolley Preece

(57) ABSTRACT

Systems and methods are disclosed for generating a digital flight path within complex mission boundaries. In particular, in one or more embodiments, systems and methods generate flight legs that traverse a target site within mission boundaries. Moreover, one or more embodiments include systems and methods that utilize linking algorithms to connect the generated flight legs into a flight path. Moreover, one or more embodiments include systems and methods that generate a mission plan based on the flight path. In one or more embodiments, the generated mission plan enables a UAV to traverse a flight area within mission boundaries and capture aerial images with regard to the target site. Furthermore, in one or more embodiments, systems and methods capture digital aerial images of vertical surfaces of a structure by generating a reference surface and flight legs corresponding to the reference surface.

20 Claims, 22 Drawing Sheets

US 10,008,123 B2
Page 2

Related U.S. Application Data is a continuation of application No. 14/887,954, filed on Oct. 20, 2015, now Pat. No. 9,508,263.

(51) Int. Cl.
  *B64C 39/02* (2006.01)
  *G05D 1/00* (2006.01)

(52) U.S. Cl.
  CPC ........... *G05D 1/0202* (2013.01); *G08G 5/006* (2013.01); *G08G 5/0069* (2013.01); *G08G 5/0086* (2013.01); *B64C 2201/123* (2013.01); *B64C 2201/127* (2013.01)

(58) Field of Classification Search
  USPC ........................................................ 367/124
  See application file for complete search history.

(56) References Cited

U.S. PATENT DOCUMENTS

| | | | | |
|---|---|---|---|---|
| 7,606,115 | B1* | 10/2009 | Cline | G08G 5/045 367/124 |
| 8,675,068 | B2* | 3/2014 | Nixon | B64D 47/08 348/144 |
| 8,990,002 | B1* | 3/2015 | Leonard | G01S 5/0284 367/1 |
| 9,026,272 | B2* | 5/2015 | Kokkeby | G01S 3/7864 701/3 |
| 9,235,763 | B2* | 1/2016 | Joyce | G01C 11/04 |
| 9,508,263 | B1 | 11/2016 | Teng et al. | |
| 9,612,598 | B2* | 4/2017 | Schultz | G05D 1/0094 |
| 9,618,934 | B2* | 4/2017 | Deroos | G05D 1/0011 |
| 9,646,283 | B2* | 5/2017 | Kantor | G08G 5/0013 |
| 9,718,564 | B1* | 8/2017 | Beckman | G06Q 10/0832 |
| 2004/0249519 | A1* | 12/2004 | Frink | B64D 45/0015 701/3 |
| 2006/0025900 | A1* | 2/2006 | Arnouse | B64D 45/0015 701/10 |
| 2006/0106506 | A1* | 5/2006 | Nichols | G05D 1/101 701/3 |
| 2006/0287842 | A1* | 12/2006 | Kim | G01H 9/004 702/183 |
| 2008/0243383 | A1* | 10/2008 | Lin | G01C 21/165 701/469 |
| 2009/0037091 | A1* | 2/2009 | Bolt, Jr. | G01C 21/00 701/10 |
| 2009/0040307 | A1* | 2/2009 | Rubin | B60R 11/04 348/153 |
| 2009/0157233 | A1* | 6/2009 | Kokkeby | G01S 3/7864 701/3 |
| 2009/0210109 | A1* | 8/2009 | Ravenscroft | G01C 21/005 701/26 |
| 2010/0017046 | A1* | 1/2010 | Cheung | G01S 7/003 701/2 |
| 2010/0145552 | A1* | 6/2010 | Herman | G08G 5/0034 701/3 |
| 2010/0286859 | A1* | 11/2010 | Feigh | G05D 1/0044 701/25 |
| 2012/0078585 | A1* | 3/2012 | Ilies | G06F 17/50 703/1 |
| 2012/0158280 | A1* | 6/2012 | Ravenscroft | G01C 21/005 701/400 |
| 2013/0062457 | A1* | 3/2013 | Deakin | B64B 1/08 244/25 |
| 2013/0124089 | A1* | 5/2013 | Herman | G01C 21/20 701/528 |
| 2014/0018979 | A1* | 1/2014 | Goossen | G08G 5/0034 701/3 |
| 2014/0207365 | A1* | 7/2014 | Pereira | G01C 21/00 701/400 |
| 2014/0249738 | A1* | 9/2014 | Euteneuer | G01S 13/9303 701/301 |
| 2014/0257595 | A1* | 9/2014 | Tillmann | G01C 11/02 701/2 |
| 2014/0316616 | A1* | 10/2014 | Kugelmass | G05D 1/101 701/8 |
| 2015/0219498 | A1* | 8/2015 | Tillotson | G01J 4/04 348/144 |
| 2015/0276353 | A1* | 10/2015 | Ueno | F41H 7/04 244/2 |
| 2016/0046374 | A1* | 2/2016 | Kugelmass | G05D 1/101 701/8 |
| 2016/0069688 | A1* | 3/2016 | Polansky | G05D 1/0005 701/3 |
| 2016/0202695 | A1* | 7/2016 | Deroos | G05D 1/0011 701/2 |
| 2016/0304198 | A1* | 10/2016 | Jourdan | B64C 39/024 |
| 2016/0313736 | A1* | 10/2016 | Schultz | B64D 47/08 |
| 2016/0371985 | A1* | 12/2016 | Kotecha | G08G 5/0034 |
| 2017/0110014 | A1 | 4/2017 | Teng et al. | |

OTHER PUBLICATIONS

U.S. Appl. No. 14/887,954, Jul. 14, 2016, Notice of Allowance.
U.S. Appl. No. 15/291,433, Apr. 21, 2017, Office Action.
U.S. Appl. No. 15/291,433, Aug. 10, 2017, Notice of Allowance.

* cited by examiner

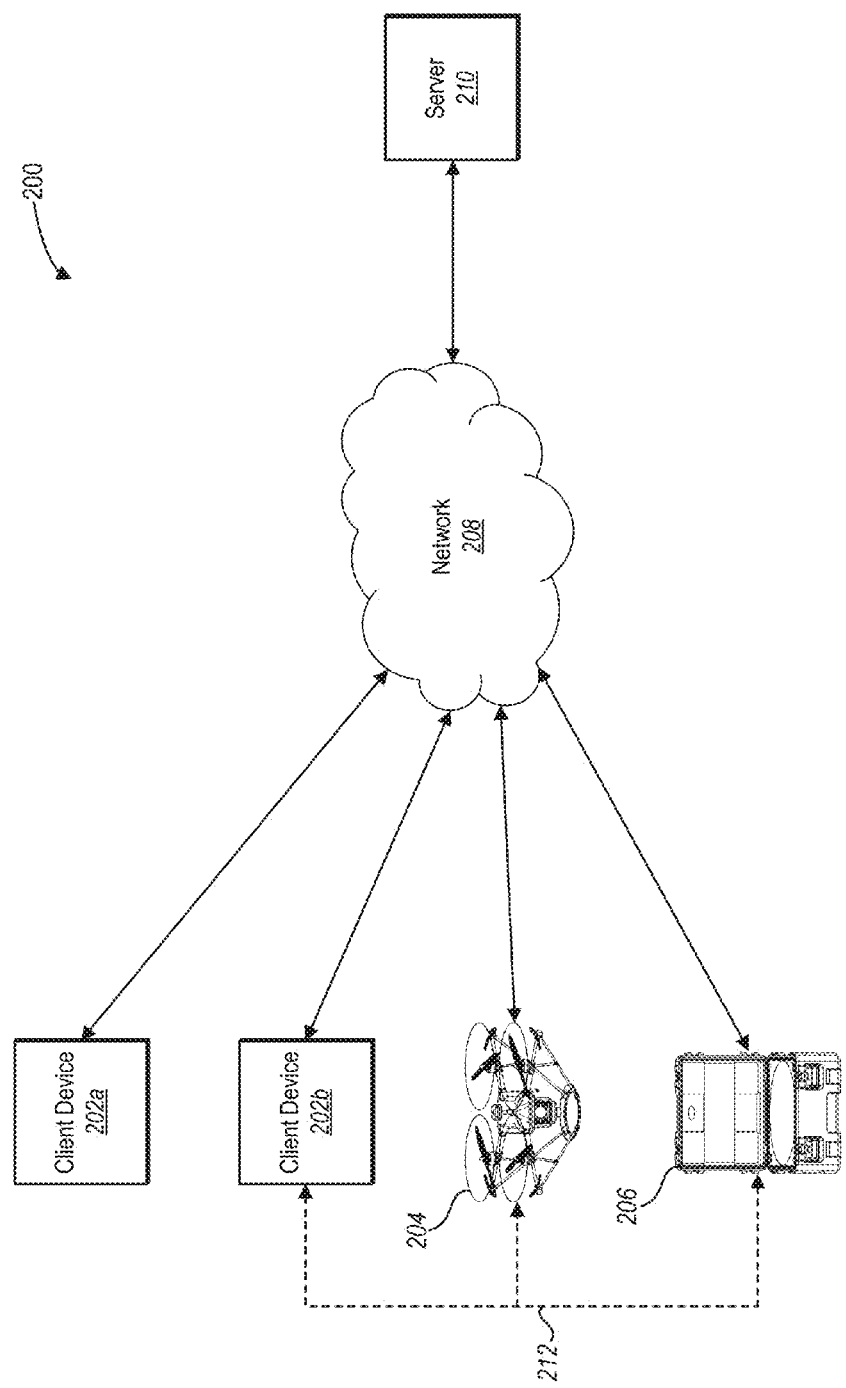

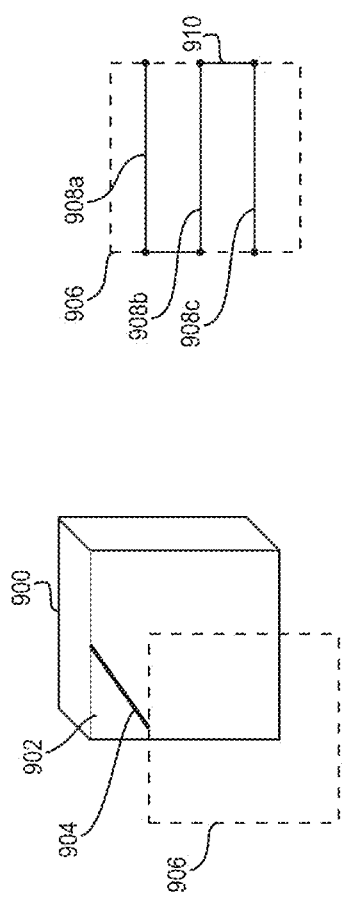
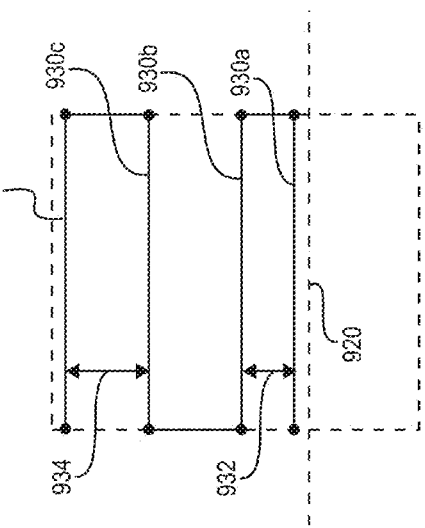
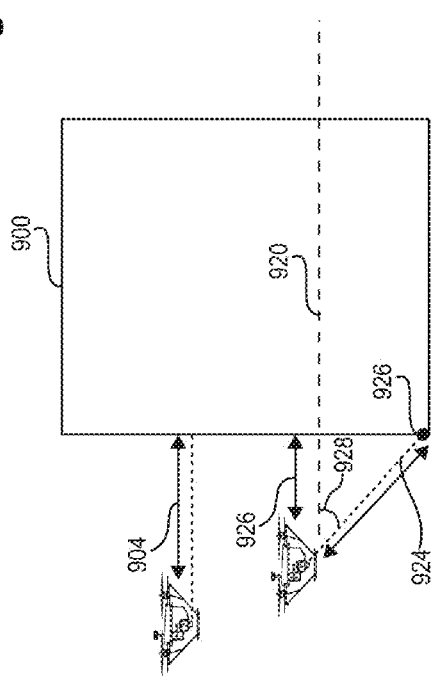
Fig. 9A
Fig. 9B

GENERATING A MISSION PLAN FOR CAPTURING AERIAL IMAGES WITH AN UNMANNED AERIAL VEHICLE

CROSS-REFERENCE TO RELATED APPLICATIONS

The present application is a continuation in part of U.S. patent application Ser. No. 15/291,433, filed on Oct. 12, 2016, which is a continuation of U.S. patent application Ser. No. 14/887,954, filed on Oct. 20, 2015, which is now issued as U.S. Pat. No. 9,508,263. The aforementioned applications are hereby incorporated by reference in their entirety.

BACKGROUND

1. Technical Field

One or more embodiments of the present disclosure relate generally to digital mission plans for unmanned aerial vehicles (UAVs). More specifically, one or more embodiments of the present disclosure relate to systems and methods for generating a digital mission plan for capturing aerial images within a mission boundary utilizing a UAV.

2. Background and Relevant Art

Individuals and businesses increasingly utilize digital aerial images to capture information regarding target sites. Indeed, in light of advances in unmanned aerial vehicles (UAVs), digital aerial photography has become increasingly affordable, and therefore accessible, for individual, industrial, and commercial applications. For instance, individuals now commonly utilize UAVs to capture digital aerial images of homes, places of interest, or even recreational activities.

In many applications, individuals and businesses seek to capture digital aerial images utilizing digitally automated UAVs. For instance, in many industrial applications, such as mining or construction, business consumers seek updated aerial images or maps of a target site on a daily (or hourly) basis. Accordingly, clients seek systems that can regularly and automatically traverse a target site and capture aerial images. Some conventional automated flight systems have been developed to address this client demand, but these conventional systems have various problems and limitations.

For example, some conventional automated flight systems can capture digital aerial images of a target site, but fail to account for prohibited flight areas. For instance, many industrial and commercial clients seek to capture digital aerial images of a site but are prohibited from flying in certain areas as a result of no-flight zones, uncooperative adjacent property owners, sensitive areas, or physical obstacles (e.g., powerlines, buildings, etc.). Common automated UAV flight systems typically fail to generate flight plans that accommodate prohibited flight areas.

Similarly, many conventional automated UAV flight systems fail to accommodate irregular, arbitrary flight areas. For instance, some common automated flight systems can generate a flight plan that flies over a rectangular target area, but cannot generate a flight plan that stays within more complex, arbitrary polygons. For example, in many applications a target site has an irregular shape as a result of roads, property lines, sensitive air space, or other considerations. Known automated flight systems cannot accommodate such irregular target sites or generate flight plans that will stay within irregular flight areas.

Moreover, many conventional automated UAV flight systems generate a two-dimensional flight plan that provides geographical coordinate pairs (i.e., x and y coordinates) for a UAV flight. These systems, however, fail to adequately plan for changes in elevation with regard to the ground surface or obstacles. Thus, for example, common automated UAV flight systems cannot generate a mission plan with altitude data (i.e., changing z coordinates) that properly accounts for elevation data with regard to the target site.

Furthermore, conventional UAV flight systems also have difficulty generating flight plans to capture digital aerial images of vertical surfaces (e.g., structures with vertical surfaces) on a target site. For example, conventional UAV flight systems can generate a flight plan to fly over a target site with a structure, however, UAVs flying over structures cannot capture detailed digital aerial images of vertical surfaces (because the vertical surfaces are aligned parallel to the viewpoint of the camera). This is a significant problem because, without sufficiently detailed digital aerial images of vertical surfaces, conventional systems are unable to generate models that accurately reflect the vertical surfaces. Some conventional UAV flight systems seek to resolve this problem by utilizing a pilot to manually fly a UAV next to vertical surfaces. Unfortunately, manually controlled UAVs flying in close proximity to vertical surfaces often result in collisions that cause significant damage to UAVs, structures, or individuals on a target site.

Finally, many common automated flight systems are time consuming and difficult to use, as well as rigid, providing a user with very few options in how a UAV will traverse a target site. Users desire automated flight systems that generate flight missions quickly and intuitively as well as providing flexibility in handling a variety of target sites, site conditions, etc. Common systems struggle to satisfy user desire for fast, simple, and flexible operation, particularly in light of the fact that a near-infinite number of possibilities exist with regard to traversing any given target site to capture digital aerial images utilizing a UAV.

Accordingly, a number of problems and disadvantages exist with conventional systems for creating a mission plan for a UAV to capture digital aerial images of a target site.

BRIEF SUMMARY

Embodiments of the present disclosure provide benefits and/or solve one or more of the foregoing or other problems in the art with systems and methods for generating UAV mission plans. For example, in one or more embodiments, systems and methods solidify less volatile portions of a flight mission before applying one or more algorithms to identify an optimal or near-optimal means of traversing a target site. Specifically, the disclosed systems and methods generate a plurality of flight legs for traversing the target site and then identify efficient flight plans based on the generated flight legs.

For example, in one or more embodiments, a disclosed system identifies a mission boundary defining a UAV flight area, wherein the mission boundary encompasses a target site for capturing a plurality of aerial images by a UAV. Then, the system generates flight legs for the UAV flight area. In particular, the system generates flight legs separated by a leg spacing based on one or more characteristics of the UAV, where each flight leg intersects the mission boundary at two endpoints. In addition, the system also identifies flight vertices comprising corners of the mission boundary and the endpoints for each of the flight legs. With the flight vertices in hand, the system builds a flight path that does not extend beyond the mission boundary by combining the flight legs utilizing the flight vertices. Moreover, the disclosed system generates a mission plan based on the flight path, the mission plan comprising computer-executable instructions for causing the UAV to capture aerial images of the target site in accordance with the flight path.

By generating a flight path within the missionary boundary utilizing the flight legs, in one or more embodiments, the disclosed systems and methods can avoid prohibited areas. Thus, for example, a system can define a mission boundary that corresponds to a no-flight zone and generate a flight plan that remains within the mission boundary. Moreover, by building a flight plan utilizing the flight vertices and the flight legs, one or more embodiments of the disclosed systems and methods can accommodate irregular, arbitrary mission boundaries. For instance, one or more embodiments of the disclosed systems and methods can generate a flight path that stays within convex polygons, concave polygons, polygons with a variety of corners, or polygons with sides of varying lengths and angles.

In addition, in one or more embodiments, the disclosed systems and methods can also generate a mission plan with altitude data that takes into consideration variations in elevation across a target site. In particular, in one or more embodiments, the disclosed systems and methods access elevation data with regard to a target site and generate altitude data in the mission plan based on the elevation data across the target site.

Moreover, in one or more embodiments, the disclosed systems and methods can also generate mission plans for capturing digital aerial images of vertical surfaces on a target site. For example, the disclosed systems and methods can identify structures with vertical surfaces on a target site, and generate mission plans with flight legs that allow a UAV to capture digital aerial images of the vertical surfaces. To illustrate, the disclosed systems and methods can generate a three-dimensional model of the target site, identify a structure on the target site based on the three-dimensional model, and then generate a mission plan with flight legs at different elevations to capture digital aerial images of the vertical surfaces of the structure. Accordingly, the disclosed systems and methods can capture digital aerial images of vertical surfaces and utilize the digital aerial images to generate three-dimensional models that include accurate models of the vertical surfaces.

Furthermore, by identifying flight legs and then building a flight path from the identified flight legs utilizing one or more linking algorithms, the disclosed systems and methods can generate flight missions quickly (i.e., with reduced processing time). Moreover, the disclosed systems and methods provide a user interface that allows users to flexibly and intuitively generate flight missions with regard to a variety of target sites and site conditions.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 2 illustrates a schematic diagram of an exemplary environment in which the mission generation system of FIG. 1 can operate in accordance with one or more embodiments;

FIGS. 9A-9B illustrate a representation of generating a reference surface and flight legs corresponding to the reference surface in accordance with one or more embodiments;

DETAILED DESCRIPTION

Figure 1:
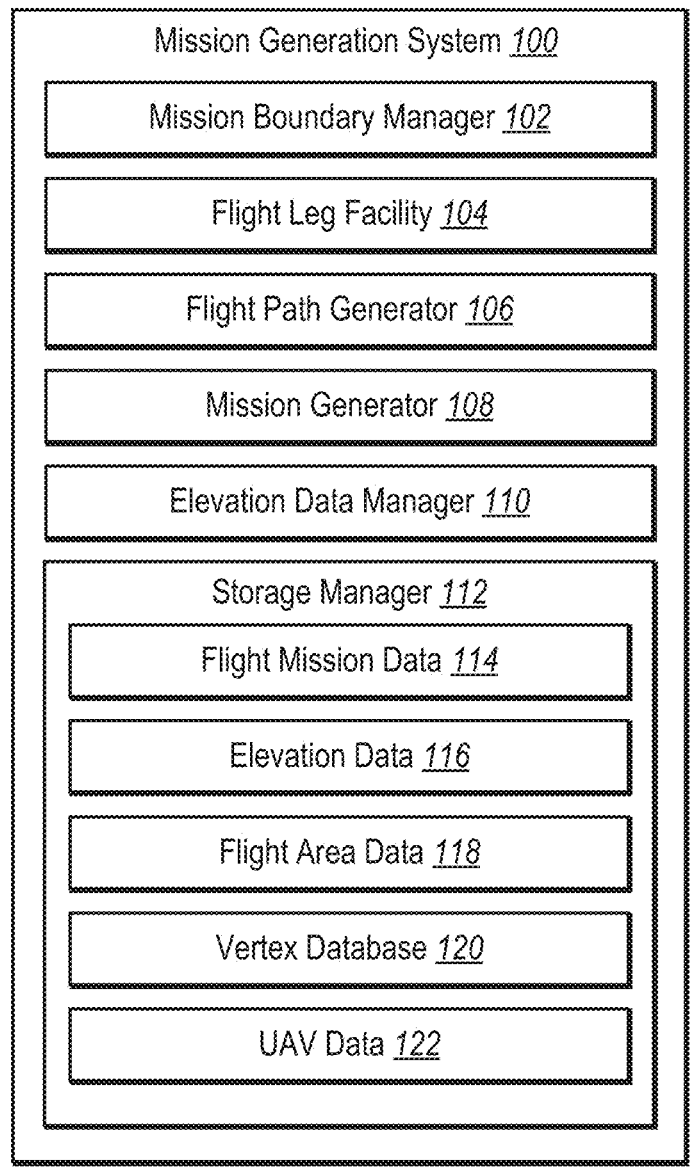
FIG. 1 illustrates a schematic diagram of a mission generation system in accordance with one or more embodiments.

The present disclosure includes various embodiments and features of a mission generation system and corresponding processes that produce mission plans for capturing aerial images of a target site by a UAV. In particular, in one or more embodiments the mission generation system generates flight legs for traversing a target site and identifies optimal or near-optimal connections between the flight legs utilizing one or more linking algorithms. The mission generation system can generate a flight path that remains within a mission boundary. Moreover, the mission generation system can incorporate the flight path into a mission plan for capturing aerial images of a target site utilizing a UAV.

For example, in one or more embodiments the mission generation system identifies a mission boundary defining a UAV flight area. Specifically, the mission generation system identifies a mission boundary that encompasses a target site for capturing a plurality of aerial images by a UAV. Then, in one or more embodiments, the mission generation system generates flight legs for the UAV flight area. In particular, the mission generation system generates flight legs that are separated by a leg spacing based on one or more characteristics of the UAV, where each flight leg intersects the mission boundary at two endpoints. In addition, in one or more embodiments, the mission generation system identifies flight vertices comprising corners of the mission boundary and the endpoints for each of the flight legs. Upon generating flight legs and identifying flight vertices, in one or more embodiments the mission generation system builds a flight path by combining the flight legs utilizing the flight vertices, wherein the flight path does not extend beyond or outside of the mission boundary. Moreover, in one or more embodiments, the mission generation system generates a mission plan based on the flight path, wherein the mission plan comprises computer-executable instructions for causing the UAV to capture aerial images of the target site in accordance with the flight path.

By identifying a mission boundary, generating flight legs within a mission boundary, and combining the flight legs, the mission generation system can generate a flight path that stays within a mission boundary and avoids prohibited flight areas. In particular, the disclosed mission generation system can generate a flight path that stays within complex mission boundaries of arbitrary shape and size. Thus, the mission generation system can generate a flight path that avoids impermissible flight areas adjacent to, or within, a target site, while still generating a mission plan that traverses the permissible flight areas of the target site to capture aerial images.

In one or more embodiments, the mission generation system identifies a mission boundary defining a UAV flight area by accessing digital flight area information. For instance, in one or more embodiments, the mission generation system identifies a mission boundary by accessing a digital database of flight zones, digital property boundaries, digital aerial images, or digital surveys. The mission generation system can utilize such digital flight area information to generate a mission boundary and define a UAV flight area. Because flight zones, property boundaries, features of aerial images, digital surveys, etc., are often complex geometrical shapes, mission boundaries often result in complex, arbitrary polygons.

Upon identifying a mission boundary, in one or more embodiments, the mission generation system generates a plurality of flight legs. In particular, the mission generation system can generate a plurality of flight legs that traverse the mission boundary while staying within the mission boundary. More specifically, in one or more embodiments, the mission generation system generates flight legs comprising a plurality of parallel straight lines within the mission boundary. In this manner, one or more embodiments of the mission generation system generate flight legs that intersect the mission boundary at two endpoints.

The mission generation system can generate flight legs at a particular flight angle. For example, the mission generation system can create flight legs at an angle that maximizes the average length of the flight legs traversing a UAV flight area. Additionally or alternatively, the flight angle can be predetermined, provided by a user, and/or based on environmental conditions (e.g., wind).

Similarly, the mission generation system can generate flight legs at a particular leg spacing. For example, in one or more embodiments, the mission generation system identifies a leg spacing between flight legs based on one or more characteristics of a UAV. For instance, the mission generation system can select a leg spacing based on a resolution or lens angle of a camera affixed to a UAV. Moreover, the mission generation system can base the leg spacing on a desired resolution for the captured aerial images. In this manner, the mission generation system can ensure that the flight legs traverse the mission boundary in a manner that will permit a camera affixed to the UAV to capture sufficiently-detailed images of the target site.

Moreover, in one or more embodiments, the mission generation system generates a flight path by combining flight legs utilizing one or more linking algorithms. In particular, the mission generation system can combine flight legs utilizing a nearest-neighbor linking algorithm, a cheapest-edge linking algorithm, a Christofides linking algorithm, and/or a brute-force linking algorithm. By utilizing these algorithms, the mission generation system can combine flight legs to form an optimal, or near-optimal, flight path from the flight legs and vertices of the mission boundary.

The mission generation system can apply different algorithms depending on various characteristics of the target site, the mission boundary, or the flight legs. For instance, in one or more embodiments, the mission generation system applies a nearest-neighbor linking algorithm upon determining that the mission boundary is convex. Similarly, in one or more embodiments, the mission generation system applies a cheapest-edge linking algorithm upon a determination that the mission boundary is concave. Moreover, in one or more embodiments, the mission generation system applies a brute-force linking algorithm upon a determination that the number of flight legs is less than a pre-determined flight leg threshold. Thus, the mission generation system can select algorithms particular to the features of a site or mission to produce more accurate results in a reduced amount of time.

Some of the algorithms utilized by the mission generation system link flight legs together based on the shortest connection between two identified endpoints. Accordingly, in one or more embodiments, the mission generation system also calculates the shortest connections between a plurality of pairs of endpoints. Specifically, the mission generation system can identify the shortest connections between each endpoint of a plurality of flight legs within a mission boundary. The mission generation system can utilize the shortest connections to combine the flight legs into a flight path.

It will be appreciated that target sites may include terrain with significant changes in elevation. These elevation changes can have a significant impact on aerial images. For example, the resolution and scope (e.g., width) of aerial images may change if the distance between the ground and a camera changes. Similarly, elevation changes can have a significant impact on a UAV (e.g., the UAV may need to adjust altitude to avoid collision with other objects). Accordingly, as mentioned previously, the mission generation system can generate a mission plan based on elevation data with regard to a target site. For example, in one or more embodiments, the mission generation system applies altitude data to one or more flight legs. For instance, the mission generation system can create one or more waypoints within one or more flight legs to provide altitude data for a UAV mission plan.

The mission generation system can identify elevation data of a target site in a variety of ways. For instance, in one or more embodiments, the mission generation system identifies elevation data from a third-party resource. In other embodiments, the mission generation system can generate its own elevation data. For example, in one or more embodiments, the mission generation system can traverse a target site, capture a plurality of aerial images, and generate elevation data with regard to the target site from the plurality of aerial images. The mission generation system can build a mission plan based on the identified elevation data.

Incorporating target site elevation data can often be quite large and time consuming to process. Accordingly, in one or more embodiments, the mission generation system compresses elevation data. For instance, in one or more embodiments, the mission generation system transforms elevation data into an image to reduce the size and time required to transfer and utilize elevation data. Specifically, in one or more embodiments, the mission generation system transforms elevation data into RGB values of an image file.

The mission generation system can also obtain elevation data based on user input. For example, in one or more embodiments, a user can provide information regarding one or more obstacles. For instance, the mission generation system can receive information regarding location, shape, and/or elevation of one or more obstacles within a target site. In response, the mission generation system can modify a mission plan based on the obstacles. For example, the mission generation system can add waypoints with regard to one or more flight legs to fly over (or around) one or more obstacles within a mission boundary.

The mission generation system can also generate and modify a mission plan based on a variety of additional factors with regard to a UAV and a target site. For example, the mission generation system can generate a mission plan based on a flight range of a UAV, a battery life of a UAV, a speed of a UAV, and other factors. Similarly, the mission generation system can generate a mission plan that considers wind, temperature, and other environmental factors. Thus, for example, a UAV can generate a mission plan that divides a flight path based on battery life and the amount of wind. Moreover, the UAV can dynamically modify a mission plan based on actual measured factors, such as a measured battery level, measured environmental factors, or a measured flight course.

In one or more embodiments, the mission generation system can also generate a mission plan for capturing digital aerial images of a vertical surface on the target site. In particular, the mission generation system can generate a mission plan that traverses vertical surfaces of a structure on a site, allowing the mission generation system to capture a plurality of digital aerial images of the vertical surfaces and generate a model of the target site that accurately reflects the vertical surfaces. Indeed, the mission generation system can generate a mission plan with a variety of waypoints at different elevations and positions that allow a UAV to capture digital aerial images of a building, a vertical face of a mine, a vertical face of a mountain, or other structures on a target site.

For example, in one or more embodiments, the mission generation system utilizes a plurality of digital aerial images to generate a three-dimensional model of a target site. The mission generation system then utilizes the three-dimensional model to identify structures on the target site. In addition, the mission generation system generates (or modifies) a mission plan to capture digital aerial images of the structures. For example, the mission generation system can determine a vertical surface of a structure, generate a reference surface from the vertical surface of the structure, and then generate flight legs and a flight path corresponding to the vertical surface.

To illustrate, in one or more embodiments, the mission generation system generates a reference surface by offsetting a vertical surface of a structure. Moreover, the mission generation system generates parallel flight legs along the reference surface and connects the flight legs to generate a flight path that traverses the reference surface. The mission generation system can then cause a UAV to fly along the flight path and capture digital aerial images of the vertical surface.

Moreover, upon capturing digital aerial images of the vertical surface, the mission generation system can generate a three-dimensional model of the vertical surface. For example, the mission generation system can utilize a structure from motion algorithm and the digital aerial images of the vertical surface to generate a three-dimensional point cloud that accurately reflects the vertical surface.

In one or more embodiments, the mission generation system can also generate a mission plan that increases safety of a flight by maintaining a minimum flight altitude from horizontal surfaces such as the ground or a roof. Moreover, the mission generation system 100 can maintain the minimum flight altitude while capturing digital aerial images of positions of structures below the minimum flight altitude. For example, in one or more embodiments, the mission generation system 100 generates a mission plan that includes modified camera angles to capture digital aerial images of positions of vertical surfaces below a minimum flight altitude without flying a UAV (or camera) below the minimum flight altitude.

Capturing digital aerial images with a modified camera angle can impact the resolution and overlap of resulting digital aerial images. Thus, in one or more embodiments, the mission generation system can determine a modified offset to capture digital aerial images of portions of structures below a minimum flight altitude based on camera angle and camera resolution. In addition, the mission generation system can modify leg spacing to maintain overlap of resulting digital aerial images while accounting for different camera angles.

Furthermore, in one or more embodiments, the mission generation system can perform various functions while a UAV is in flight. In particular, while flying a mission plan with a UAV, the mission generation system can identify structures and modify a mission plan to capture digital aerial images of the structures during a flight. For example, in one or more embodiments, the mission generation system generates a low-resolution three-dimensional model of the target site during a flight mission, utilizes the low-resolution three-dimensional model to identify structures with vertical surfaces, and modifies the flight mission in flight to capture additional digital aerial images of the vertical surfaces.

As used herein, the term "mission boundary" refers to a border of a flight area with regard to a target site. The mission boundary can be user-provided and/or generated based on user input and other data. In some embodiments, the term mission boundary may represent a border defining a permissible area in which a UAV is permitted to fly. For instance, the term mission boundary includes a border defining an area in which a UAV is permitted to fly to capture one or more aerial images. The term mission boundary also includes a border between a permissible area in which a UAV is permitted to fly and one or more impermissible areas in which a UAV is not permitted to fly, or in which flying the UAV is undesirable or dangerous.

As used herein, the term "target site" refers to a location on Earth. In particular, the term target site includes a location on Earth that a user seeks to capture in a plurality of aerial images. The term target site can include a construction site, a mining site, a particular property, a wilderness area, a disaster area, or other location.

As used herein, the term "flight legs" refers to a portion of a flight path. In particular, the term flight legs includes parallel portions of a flight path within a mission boundary. For instance, the term flight legs includes parallel portions of a flight path within a mission boundary, the portions arranged at a flight angle and separated by a leg spacing.

As used herein, the term "endpoints" refers to ends of a flight leg. In particular, the term endpoints includes two ends of a flight leg. For example, the term endpoints includes points where flight legs intersect a mission boundary.

As used herein, the term "vertices" refers to points along a mission boundary. In particular, the term vertices includes corners of a mission boundary and endpoints. For instance, the term vertices refers to points where flight legs intersect a mission boundary. Similarly, the term vertices refers to corners of a mission boundary representing a property corner, a corner of a no-flight zone, or some other corner.

As used herein, the term "flight path" refers to a route for a UAV. In particular, the term flight path includes a route for a UAV to traverse a UAV flight area (or vertical surface or structure). For instance, the term flight path includes a plurality of flight legs with connections between the flight legs. For example, a flight path can include a plurality of flight legs connected by the shortest connections between flight legs, as ascertained by one or more algorithms.

As used herein, the term "mission plan" refers to a plan for traversing a target site utilizing a UAV. A mission plan can include both location and altitude data for traversing a target site. A mission plan can include a plan for flying to and from a base location (such as a docking station) in traversing a target site. A mission plan can also include a plan for splitting up a flight based on a UAV range, a UAV battery life, or any other factors affecting flight of a UAV.

As used herein, the term "digital aerial image" refers to any digital symbol, picture, icon, or illustration captured by a camera in the air. For example, the term "digital aerial image" includes a digital picture captured by a camera affixed to a UAV in flight. The term "digital aerial image" includes digital files with the following, or other, file extensions: JPG, TIFF, BMP, PNG, RAW, or PDF. The term "digital aerial image" also includes one or more images (e.g., frames) in a digital aerial video (e.g., a digital video captured from a UAV in flight).

As used herein, the term "structure" refers to an object having a vertical surface. For example, the term "structure" includes a building, a trench, a mountain, or an open mine. Moreover, as used herein, the term "vertical surface" refers to a surface with an orientation greater than forty-five degrees relative to a horizontal plane. For example, the term "vertical surface" includes a side of a building, a wall of a trench, a side of a steep mountain, or a wall of an open mine.

As used herein, the term "reference surface" refers to a digital surface generated based on a vertical surface of a structure. In particular, the term "reference surface" includes a digital surface generated based on an offset of a vertical surface of a structure. To illustrate, a reference surface can include a digital surface that mirrors a vertical surface of a structure at an offset (i.e., a distance) relative to the position of the vertical surface of the structure. A reference surface can include a variety of different shapes or forms. For example, the reference surface can include a two-dimensional surface on a single plane, such as a square, rectangle, pyramid, circle, or oval. The reference surface can also include a three-dimensional shape (solid, hollow, closed, or open). For example, a reference surface can include a prism, rectangular prism, pyramid, cube, cylinder, sphere, cone, or three-dimensional polygon. Indeed, as described in greater detail below, the mission generation system can generate a reference surface comprising a three-dimensional polygon by offsetting a plurality of outer surfaces of a structure.

Turning now to FIG. 1, additional detail will be provided regarding components and capabilities of one or more embodiments of the mission generation system. In particular, FIG. 1 shows a schematic diagram illustrating an example embodiment of a mission generation system 100. As shown in FIG. 1, in one or more embodiments, the mission generation system 100 includes a mission boundary manager 102, a flight leg facility 104, a flight path generator 106, a mission generator 108, an elevation data manager 110, and a storage manager 112. Moreover, the storage manager 112 may also include, as shown, flight mission data 114, elevation data 116, flight area data 118, vertex data 120, and UAV data 122.

As just mentioned, and as illustrated in FIG. 1, the mission generation system 100 may include the mission boundary manager 102. The mission boundary manager 102 can create, generate, provide, modify, access, and/or manage one or more mission boundaries. For instance, the mission boundary manager 102 can generate a mission boundary defining a UAV flight area with regard to a target site.

The mission boundary manager 102 can access and utilize digital flight area information to generate one or more mission boundaries. As used herein, the term "digital flight area information" refers to any information bearing on a UAV flight area. For example, the mission boundary manager 102 can access digital flight area information comprising one or more digital flight zones (e.g., no-fly zones with respect to airports, military bases, national parks, temporary flight restriction zones), property boundaries (e.g., digital recorded property lines, digital section maps, digital government boundary maps), roads, utilities (e.g., power lines/poles), digital aerial images (e.g., digital aerial photographs, satellite images), digital maps, digital surveys (e.g., digital boundary survey, PLATs, on-site surveys), electronic plans (digital construction plans, improvement plans, as-built plans), or other digital information.

The mission boundary manager 102 can access digital flight area information from a variety of sources. For instance, the mission boundary manager 102 can access digital flight area information from a third-party, such as a municipality that provides digital property information. The mission boundary manager 102 can also access stored digital flight area information from flight area data 118. For instance, the mission boundary manager 102 can access a plurality of previously-captured aerial images from flight area data 118. The mission boundary manager 102 can also obtain digital flight area information from a computer-readable storage medium or via the Internet.

As mentioned, in one or more embodiments, the mission boundary manager 102 utilizes digital flight area information to generate a mission boundary. For instance, in one or more embodiments, the mission boundary manager 102 detects a target site, and defines mission boundaries with regard to the target site based on digital flight area information. For example, a user can select a target site, the mission boundary manager 102 can access aerial images, property lines, and other digital flight area information with regard to the selected target site, and the mission boundary manager 102 can suggest to the user potential mission boundaries for the target site. Additionally or alternatively, a user can outline a mission boundary via user input, and the mission boundary manager 102 can suggest a more accurate mission boundary based on digital flight area information.

In other embodiments, the mission boundary manager 102 can define a mission boundary based on user input. For instance, in one or more embodiments, the mission boundary manager 102 provides for display a digital map or digital aerial image to a user and receives user input of a mission boundary in relation to the digital map or digital aerial image. For example, the user can draw the mission boundary over the displayed digital map or image.

The mission boundary manager 102 can generate a mission boundary of any size, type, or shape. For instance, the mission boundary manager 102 can generate a mission boundary manager comprising a polygon with any number of corners and sides. The mission boundary manager 102 can generate mission boundaries comprising convex polygons or concave polygons. The mission boundary manager 102 can also generate mission boundaries comprising curves, arcs, or circles.

Moreover, the mission boundary manager 102 can generate multiple mission boundaries to define a UAV flight area. For instance, in circumstances where a UAV flight area encompasses a no flight area, the mission boundary manager 102 can generate an outer mission boundary and an inner mission boundary (e.g., a donut shape). For example, the mission boundary manager 102 can define an outer mission boundary with a first shape (e.g., a ten sided polygon) and an inner mission boundary with a second shape (e.g., a square). Thus, for example, if a target site contains a secure area that a UAV is not permitted to access, the mission boundary manager 102 can exclude the secure area from the UAV flight area by defining an inner mission boundary around the secure area and an outer mission boundary area with regard to the perimeter of the target site. The mission boundary manager 102 can generate any number of inner/outer mission boundaries, depending on the particular target site or embodiment.

The mission boundary manager 102 can also modify one or more mission boundaries. For example, the mission boundary manager 102 can determine a change in digital flight area information and revise one or more mission boundaries. For instance, a temporary flight restriction may initially prohibit UAV flight in a certain area adjacent to a target site. At a later point in time, the temporary flight restriction may be lifted. The mission boundary manager 102 can detect a change in the temporary flight restriction, and modify the mission boundary accordingly (e.g., to enlarge the UAV flight area to reflect removal of the temporary flight restriction).

Similarly, the mission boundary manager 102 can detect changes to property lines, changes in aerial images, changes in other digital flight area information, or additional user input with regard to a UAV flight area. Then, the mission boundary manager 102 can modify a mission boundary based on the detected changes.

For example, in one or more embodiments, the mission boundary manager 102 can create an initial mission boundary prior to a first UAV flight of a target site. Thereafter, the UAV can capture aerial images of the target site and the mission generation system 100 can generate a model (e.g., a 3D model) or other representation of the target site. The mission boundary manager 102 can modify the initial mission boundary based on the generated targeted site model (e.g., move a mission boundary edge based on a location of a property line, if the aerial images and/or target site model provide a more accurate location of the property line).

As shown in FIG. 1, the mission generation system 100 also includes the flight leg facility 104. The flight leg facility 104 can create, generate, select, provide, access, and/or manage one or more flight legs. In particular, the flight leg facility 104 can generate flight legs within a mission boundary (e.g., a mission boundary provided by the mission boundary manager 102). Moreover, the flight leg facility 104 can generate flight legs corresponding to a reference surface to capture digital aerial images of a vertical surface of a structure.

In one or more embodiments, the flight leg facility 104 generates parallel flight legs. For instance, the flight leg facility 104 can generate parallel flight legs that traverse a target site or a UAV flight area. Moreover, the flight leg facility 104 can generate parallel flight legs that traverse a target site and stay within a mission boundary. Similarly, the flight leg facility 104 can generate parallel flight legs that traverse a reference surface that is offset from a vertical surface of a structure.

For example, in one or more embodiments, the flight leg facility 104 generates flight legs by calculating a centroid of a UAV flight area (i.e., the area encompassed by the mission boundary or the area of a reference surface). The flight leg facility 104 can create initial flight legs to fill the UAV flight area that are offset based on leg spacing from the centroid (e.g., the initial flight leg can be offset by half a leg spacing from the centroid in a direction perpendicular to a flight leg angle) of the UAV flight area and oriented in a particular direction. The flight leg facility 104 can also identify portions of the initial flight legs that lie within the UAV flight area and portions of the initial flight legs that fall outside the UAV flight area. In one or more embodiments, the flight leg facility 104 discards the portions of the initial flight legs that fall outside the UAV flight area. Moreover, in one or more embodiments, the flight leg facility 104 generates flight legs based on the portions of the initial flight legs that fall within the UAV flight area.

As mentioned, the flight leg facility 104 can generate flight legs with one or more leg spacings. For instance, in at least one embodiment, the flight leg facility 104 can generate flight legs with an equal leg spacing between flight legs (i.e., flight legs that are spaced an equal distance apart). By providing equal leg spacing, in some embodiments, the mission generation system 100 can enable a UAV to capture digital aerial images that overlap sufficiently and by an equal (or near equal) amount.

In other embodiments, the flight leg facility 104 can generate flight legs with different leg spacings. For instance, the mission generation system 100 can identify a portion of the target site that is particularly critical to a client or particularly difficult to accurately capture (e.g., an area of significant elevation change or an area containing covered or hidden features). In this case, the flight leg facility 104 can modify the leg spacing to emphasize the portion of the target site. In particular, the flight leg facility 104 can apply a smaller leg spacing with regard to the portion of the target site. By applying a smaller spacing, the mission generation system 100 can enable a UAV to capture digital aerial images that overlap by a greater amount and provide greater detail with regard to the portion of the target site.

Similarly, the flight leg facility 104 can generate leg spacings that vary based on a UAV utilizing different camera angles to capture digital aerial images. For example, the flight leg facility 104 can determine that a UAV cannot fly at a particular position or elevation. The flight leg facility 104 can modify leg spacing to traverse the target site so as not to fly at the particular position or elevation while modifying a camera angle to capture digital aerial images corresponding to the particular position or elevation. To illustrate, the flight leg facility 104 can identify a portion of a vertical surface of a structure that falls below a minimum flight altitude. The flight leg facility 104 can generate a flight leg above the minimum flight altitude to capture digital aerial images of the portion by modifying a camera angle. The flight leg facility 104 can then modify leg spacing to accommodate for the modified camera angle.

The flight leg facility 104 can select a leg spacing based on a variety of factors. For example, the flight leg facility 104 can select leg spacing based on one or more characteristics of a UAV. For instance, the flight leg facility 104 can select a leg spacing based on flight capabilities of a UAV, such as a maximum (or recommended) flight altitude, a maximum (or recommended) flight speed of a UAV, or other characteristics. For instance, a UAV with a capability to fly only at lower altitudes may require a smaller leg spacing than a UAV with a capability to fly at a higher altitude.

In addition, the flight leg facility 104 can select leg spacing based on other characteristics of a UAV, such as characteristics of one or more cameras affixed to a UAV. For example, the flight leg facility 104 can select leg spacing based on the resolution of a camera or the resolution of digital images resulting from use of the camera. Similarly, the flight leg facility 104 can select leg spacing based on a camera lens angle or a width of digital images resulting from use of the camera. For instance, in one or more embodiments, the flight leg facility 104 can select a wider leg spacing based on a determination that a camera aboard a UAV has a higher resolution and wider angle lens than a camera aboard another UAV.

The flight leg facility 104 can also select leg spacing based on a desired aerial image resolution. For instance, in one or more embodiments, a user can provide a desired resolution of aerial images resulting from a UAV flight. The flight leg facility 104 can utilize the desired aerial image resolution (e.g., along with the capabilities of the UAV/camera) to select a leg spacing.

In addition to leg spacing, the flight leg facility 104 can also select one or more flight angles associated with flight legs. For instance, with regard to embodiments that utilize parallel flight legs, the flight leg facility 104 can identify a flight angle that controls the direction of the parallel flight legs. The flight leg facility 104 can select a flight angle based on a variety of factors.

For instance, in one or more embodiments, the flight leg facility 104 selects a flight angle that reduces (or minimizes) the amount of flight time. For example, the flight leg facility 104 can select a flight angle that reduces (e.g., minimizes) the number of flight legs or the number of connections required between flight legs. Similarly, the flight leg facility 104 can select a flight angle that increases (e.g., maximizes) the length of one or more flight legs. For example, the flight leg facility 104 can select a flight angle that increases (e.g., maximizes) the average length of all flight legs.

The flight leg facility 104 can also select a flight angle based on one or more environmental characteristics. For instance, the flight leg facility 104 can select a flight angle based on a direction of wind (e.g., select a flight angle that is parallel to the wind to avoid being blown off course or select a flight angle perpendicular to the wind to avoid variations in UAV speed). Similarly, the flight leg facility 104 can select a flight angle based on a position of the sun (e.g., select a flight angle that is towards the sun to avoid glare from objects perpendicular to flight leg).

In some embodiments, the flight leg facility 104 generates non-parallel flight legs. For instance, the flight leg facility 104, can generate flight legs that are not parallel in order to circumvent obstacles, capture images of elevated objects, obtain additional images (or images that overlap by a greater degree) with regard to certain portions of a target site, obtain images of a greater resolution with regard to a certain portion of a site, or for a variety of other reasons.

In generating non-parallel flight legs, the flight leg facility 104 can identify and utilize a plurality of flight angles. For example, the flight leg facility 104 can utilize a first flight angle for a first flight leg, a second flight angle for a second flight leg (e.g., to move closer to a desired area of a target site), and then utilize the first flight angle for a third flight leg.

In one or more embodiments, the flight leg facility 104 can also generate non-linear flight legs. For example, the flight leg facility 104 can generate flight legs that are circular, curvilinear, parabolic, logarithmic, zigzagged, or some other shape or pattern. In one or more embodiments, the flight leg facility 104 identifies the shape or pattern of flight legs based on the amount of time to traverse the flight legs. For example, in one or more embodiments, the flight leg facility 104 identifies the shape or pattern of flight legs that maximize the length of flight legs and/or minimizes the number of flight legs. In additional or alternative embodiments, the flight leg facility 104 can generate flight legs that follow the contours and/or shapes of one or more topographical features (e.g., hills) or structures (e.g., buildings).

In other embodiments, the flight leg facility 104 identifies a flight leg shape or pattern based on user input. For instance, in one or more embodiments, the user can select a desired shape of a flight leg. In other embodiments, a certain client may require a UAV to traverse a specific pattern in covering a target site. For example, a client may want the UAV to follow a plurality of roads that traverse the target site. In such circumstances, the flight leg facility 104 can generate flight legs based on user input of the flight legs.

In one or more embodiments, the flight leg facility 104 can generate a reference surface for utilization in generating flight legs. In particular, in one or more embodiments, the flight leg facility 104 can receive an indication of vertical surfaces (e.g., from the elevation data manager 110) on a target site and generate reference surfaces corresponding to the vertical surfaces. For example, the flight leg facility 104 can generate a reference surface by offsetting a vertical surface of a structure by a particular offset (e.g., a distance).

To illustrate, the flight leg facility 104 can receive an indication of a vertical surface of a structure. The flight leg facility 104 can determine an offset amount and generate a reference surface by offsetting the vertical surface by the offset amount. The flight leg facility 104 can then generate flight legs corresponding to the reference surface. In particular, the flight leg facility 104 can generate flight legs on the reference surface to traverse the vertical surfaces of the structure and capture digital aerial images.

As mentioned above, in one or more embodiments, the reference surface is a three-dimensional shape based on a plurality of vertical surfaces of a structure. The flight leg facility 104 can also generate flight legs in relation to such a three-dimensional shape. For example, in one or more embodiments, the flight leg facility 104 projects the three-dimensional shape to a two-dimensional space, generates flight legs for the three-dimensional shape along the three-dimensional space in the two-dimensional space, and then projects the flight legs back into three-dimensional space. In this manner, the flight leg facility 104 can generate flight legs that traverse multiple vertical surfaces of a structure for capturing digital aerial images.

As just mentioned, the flight leg facility 104 can determine an offset amount for a reference surface. Specifically, the flight leg facility 104 can determine one or more offset amounts based on a variety of factors. For example, the flight leg facility 104 can determine an offset amount based on a camera resolution of a camera affixed to a UAV, based on a desired resolution of resulting digital images, based on a camera angle, or based on a desired amount of overlap between resulting digital images.

As illustrated in FIG. 1, the mission generation system 100 also includes the flight path generator 106. The flight path generator 106 can create, combine, generate, modify, or access one or more flight paths. For instance, the flight path generator 106 can combine a plurality of flight legs to form a flight path. In particular, the flight path generator 106 can combine a plurality of flight legs by identifying connections between the flight legs to form a flight path.

In one or more embodiments, the flight path generator 106 identifies vertices. In particular, the flight path generator 106 can identify points where flight legs intersect a mission boundary (i.e., endpoints) as well as corners of mission boundaries (or edges of a reference surface). The flight path generator 106 can identify vertices to assist in generating an optimal or near-optimal flight path from a plurality of flight legs.

Specifically, in one or more embodiments, the flight path generator 106 utilizes the vertices to generate shortest connections. In particular, the flight path generator 106 can calculate the shortest connection between any two vertices (e.g., the shortest connection between any two endpoints). For instance, in one or more embodiments, the flight path generator 106 utilizes a Floyd-Warshall algorithm to obtain the shortest connection between any two identified endpoints in polynomial time.

For example, the flight path generator 106 can identify a shortest connection between a first endpoint and a second endpoint. Moreover, with regard to two endpoints that do not have a common line of sight (e.g., cannot be connected by a straight line that stays within the mission boundary), the flight path generator 106 can identify the shortest connection between the two endpoints while staying within the mission boundary. In particular, the flight path generator 106 can utilize the one or more vertices to connect two endpoints that do not have a common line of sight.

In one or more embodiments, the flight path generator 106 can generate a shortest connection database that includes the shortest connection between one or more (or all) pairs of endpoints with regard to a mission boundary. In such circumstances, the flight path generator 106 can store the shortest connection database (e.g., within the vertex database 120). The flight path generator 106 can also utilize the shortest connection database to combine a plurality of flight legs to generate a flight path.

Specifically, the flight path generator 106 can utilize a variety of algorithms to combine flight legs and connections to generate a flight path. For instance, as mentioned above, the flight path generator 106 can utilize a nearest-neighbor linking algorithm, a cheapest-edge linking algorithm, a Christofides linking algorithm, or a brute-force linking algorithm.

As just mentioned, the flight path generator 106 can utilize a nearest-neighbor linking algorithm to generate a flight path. Specifically, and as discussed in greater detail below, in one or more embodiments the nearest-neighbor linking algorithm generates a flight path by identifying a starting endpoint, proceeding through a flight leg, and identifying the nearest endpoint. For example, in one or more embodiments, the flight path generator 106 starts at a first endpoint of a first flight leg, proceeds to the second endpoint of the first flight leg, and then proceeds to the nearest unvisited endpoint of a second flight leg. In one or more embodiments, the flight path generator 106 identifies the nearest unvisited endpoint of the second flight leg by referencing the shortest connection database (e.g., by identifying the shortest connection in the shortest connection database originating from the second endpoint of the first flight leg).

Upon proceeding to the nearest unvisited endpoint of the second flight leg, in one or more embodiments the nearest-neighbor linking algorithm proceeds to the second endpoint of the second flight leg. The flight path generator 106 again identifies the nearest unvisited endpoint of a third flight leg. In one or more embodiments, the nearest-neighbor linking algorithm generates a possible flight path by continuing in this pattern until traversing all of the flight legs.

In one or more embodiments, the flight path generator 106 can generate multiple possible flight paths utilizing the nearest-neighbor linking algorithm. Specifically, the flight path generator 106 can test every endpoint as a starting point and calculate a possible flight path for every endpoint utilizing the nearest-neighbor linking algorithm. Upon calculating a possible flight path originating from every endpoint, the flight path generator 106 can select the resulting flight path with the shortest length.

In addition to utilizing a nearest-neighbor linking algorithm, in one or more embodiments, the flight path generator 106 utilizes a cheapest-edge linking algorithm. In one or more embodiments, the cheapest-edge linking algorithm builds a flight path beginning with all of the flight legs (e.g., flight legs generated by the flight leg facility 104). Moreover, the cheapest-edge linking algorithm adds connections to the flight path by identifying a smallest connection. Specifically, the cheapest-edge linking algorithm identifies the smallest connection (e.g., from the smallest connection database) that does not result in a cycle and does not result in a vertex with more than two paths. In one or more embodiments, the cheapest-edge linking algorithm adds the identified smallest connection to the flight path.

In one or more embodiments, the cheapest-edge linking algorithm continues by identifying the next smallest connection (e.g., from the smallest connection database) that does not result in a cycle and does not result in a vertex with more than two paths and adds the identified smallest connection to the flight path. The cheapest-edge linking algorithm can continue this pattern until connecting all of the flight legs into a flight path.

As mentioned previously, the flight path generator 106 can also utilize a Christofides linking algorithm to build a flight path. A Christofides linking algorithm can compute a flight that is guaranteed to be within 150% of a minimum flight path length. One or more embodiments utilize a modified Christofides algorithm that creates a minimum spanning tree that contains all the flight legs. In other words, the flight path generator 106 can run a Christofides algorithm under the condition that it contains all flight legs. In this manner, in one or more embodiments, the flight path generator 106 builds a flight path.

In yet other embodiments, the flight path generator 106 can utilize a brute-force linking algorithm. In particular, a brute-force algorithm can test all permutations of route configurations and identify the absolute minimum. In other words, the flight path generator 106 can search all possible combinations of linking flight legs and identify the flight path that results in the minimum distance.

In some embodiments, the flight path generator 106 utilizes multiple algorithms. For instance, in one or more embodiments, the flight path generator 106 applies the nearest-neighbor linking algorithm, the cheapest-edge linking algorithm, and the Christofides linking algorithm, and selects the shortest resulting flight path.

In addition, in one or more embodiments, the flight path generator 106 utilizes different algorithms in response to different characteristics of a target site, mission boundary, or flight legs. For example, in one or more embodiments, the flight path generator 106 detects whether a mission boundary is convex or concave. If the mission boundary is convex, the flight path generator 106 applies a nearest-neighbor linking algorithm. If the mission boundary is concave, the flight path generator 106 applies a nearest-neighbor linking algorithm, a cheapest-edge linking algorithm, and/or a Christofides linking algorithm.

Similarly, in one or more embodiments, the flight path generator 106 detects a number of flight legs (or a number of endpoints) and selects an algorithm based on the number of flight legs. For example, in one or more embodiments, the flight path generator 106 compares the number of flight legs to a flight leg threshold. Based on the comparison, the flight path generator 106 can apply different algorithms. For example, in one or more embodiments if the number of flight legs falls below the flight leg threshold, the flight path generator 106 applies a brute-force linking algorithm. If, however, the number of flight legs meets or exceeds the flight leg threshold, the flight path generator 106 applies a different algorithm (e.g., a nearest-neighbor linking algorithm, a cheapest-edge linking algorithm, and/or a Christofides linking algorithm).

In one or more embodiments, the flight path generator 106 can also generate one or more flight paths while taking into consideration a location of a docking station. For instance, in one or more embodiments, a UAV may need to start at a docking station and discontinue a mission to return to a docking station (e.g., to recharge or exchange a battery). The flight path generator 106 can generate a flight path that takes into consideration starting at a docking station, a need to return to a docking station, and a location of the docking station.

For instance, in one or more embodiments, the flight path generator 106 can determine a location of a docking station. The flight path generator 106 can identify shortest connections between flight leg endpoints and the docking station. Moreover, the flight path generator 106 can utilize the shortest connections between the endpoints and the docking station to generate a connection from endpoints to the docking station. For example, the flight path generator 106 can identify a shortest connection between a docking station and a first endpoint to start, identify a shortest connection from a second endpoint to the docking station, and identify a shortest connection from the docking station to a third endpoint.

Moreover, in one or more embodiments, the flight path generator 106 can select a flight path based on the added distance traveling to and from the docking station. For instance, with regard to the nearest-edge linking algorithm, the flight path generator 106 can add a condition that requires a connection to a docking station after traversing a certain distance. Based on the condition, the flight path generator 106 can generate a flight path that traverses a number of flight legs, routes to a docking station, and then resumes traversing flight legs. Moreover, the flight path generator 106 can test a variety of starting points and connections, based on the condition requiring connection to a docking station, and select the shortest resultant flight path that satisfies the condition.

As mentioned above, the flight path generator 106 can also select a flight path to capture digital aerial images of a vertical surface. In particular, the flight path generator 106 can select a flight path from flight legs to traverse a structure at different elevations and capture digital aerial images of vertical surfaces of the structure. The flight path generator 106 can also select a flight path to reduce (e.g., minimize) the distance and/or time required to capture digital aerial images of a structure. Moreover, the flight path generator 106 can select a flight path to reduce (e.g., minimize) energy utilized by the UAV or changes in elevation required to capture digital aerial images of a vertical surface and/or structure. For example, the flight path generator 106 can weight potential flight legs based on vertical distance travelled to generate a flight path that minimizes change in elevation required to capture digital aerial images of a vertical surface and/or structure.

In addition to generating flight paths, the flight path generator 106 can also modify one or more flight paths. For example, in response to a break in a mission, the flight path generator 106 can generate a modified flight plan. For instance, the flight path generator 106 can determine what portions of the flight path have already been visited, and calculate a modified flight path for the remainder of the UAV flight area. For instance, the flight path generator 106 can identify a new starting position and new connections between flight legs based on a remaining portion of a UAV flight area that a UAV has not traversed.

Similarly, the flight path generator 106 can modify flight paths based on other updated or revised information. For instance, upon receiving a modified mission boundary, modified flight legs, or other information, the flight path generator 106 can modify one or more flight paths. Indeed, in one or more embodiments, the flight path generator 106 can receive an indication of a structure (e.g., from the elevation data manager 110) on a target site. In response, the flight path generator 106 can modify flight paths to capture digital aerial images of vertical surfaces of the structure.

As illustrated in FIG. 1, in addition to the flight path generator 106, the mission generation system 100 also includes the mission generator 108. The mission generator 108 can create, generate, modify, and/or manage one or more mission plans. In particular, the mission generator 108 can create a mission plan based on one or more flight paths (e.g., flight paths provided by the flight path generator 106).

For example, based on a flight path, the mission generator 108 can create a mission plan that includes computer-executable instructions for causing a UAV to capture aerial images of the target site in accordance with the flight path. In particular, the mission generator 108 can transform a generated flight path to computer-executable instructions that a UAV can utilize to traverse a UAV flight area with regard to a target site. As one example, the mission generator 108 can generate a plurality of waypoints corresponding to, for example, the flight path, changes in flight direction, changes in flight altitude, and/or UAV battery levels (e.g., representing points where the UAV needs to "return to home" to recharge or receive a replacement battery). As will be explained in more detail below, each waypoint can include location information (e.g., X and Y coordinates) as well as altitude information (e.g., Z coordinates).

For example, the mission generator 108 can create a mission plan that includes digital altitude information. In particular, the mission generator 108 can add digital altitude information to a flight path based on digital elevation data related to a target site. For example, the mission generator 108 can access elevation data regarding a site (e.g., from the elevation data manager 110) and generate a mission plan based on the accessed information.

For instance, in one or more embodiments, the mission generator 108 adds altitude information to a mission plan so as to maintain a certain altitude from the ground. For example, the mission generator 108 can receive information that indicates a rise in elevation at a midpoint of a flight leg in a flight path. The mission generator 108 can add one or more waypoints to accommodate the rise in elevation. For instance, the mission generator 108 can add a waypoint to a flight path at a location before the jump in elevation (e.g., corresponding to a structure or other topographical feature having an abrupt change in elevation) and add a waypoint to the flight path at (or near) a location corresponding to the jump in elevation so that the altitude of the UAV approximates the jump in elevation in the target site. In additional or alternative examples, with respect to gradual elevation changes, the mission generator 108 can add a waypoint of a first altitude to a flight path at or near a first change in elevation (e.g., the bottom of an incline) and add another waypoint of second altitude to the flight path at or near a second change in elevation (e.g., the top of an incline), so that the flight of the UAV generally follows the underlying changes in elevation.

In one or more embodiments, the mission generator 108 maintains a certain altitude above the ground based on one or more characteristics of the UAV. For example, in one or more embodiments, the mission generator 108 may establish altitude data based on a resolution or lens angle of a camera affixed to a UAV. For instance, a client may desire digital aerial images of a particular resolution (e.g., 1 pixel per 5 cm) and a certain amount of overlap between aerial images (e.g., 60% side overlap and 50% forward overlap). Based on the characteristics of a camera affixed to the UAV, the UAV may need to maintain a certain altitude above the ground to obtain the desired resolution and/or overlap. The mission generator 108 can identify an altitude to maintain based on the desired resolution and/or overlap and the resolution, lens angle, and/or other characteristics of the camera affixed to the UAV.

The mission generator 108 can also create a mission plan based on one or more obstacles in a target site. For example, the mission generator 108 can detect an obstacle based on user input or based on elevation data. In response, the mission generator 108 can modify a flight path to avoid the obstacle.

For instance, the mission generator 108 can modify a flight path to fly over an obstacle. In particular, the mission generator 108 can add one or more waypoints to a flight path to adjust the altitude of a UAV. Specifically, the mission generator 108 can add waypoints such that the UAV maintains a certain distance from the obstacle.

In other embodiments, the mission generator 108 can modify a flight path to circumvent an obstacle. For example, if an obstacle is above a height threshold (e.g., a maximum flying altitude of the UAV or a height that will take too long to reach), the mission generator 108 can modify a flight path to circumvent the obstacle, rather than flying over the obstacle. Specifically, the mission generator 108 can identify an obstacle boundary and calculate a shortest connection around the obstacle.

For example, if the obstacle is a building, the mission generator 108 can identify building corners and identify a shortest connection around the building back to a flight path. The mission generator 108 can modify the flight path to navigate around the building utilizing the shortest connection.

As mentioned above, rather than simply circumventing an obstacle, the mission generator 108 can also modify the mission plan to capture aerial images of an obstacle (i.e., a structure). In particular, in response to identifying an obstacle (i.e., a structure), the mission generator 108 can generate a mission plan that orbits an obstacle to obtain digital aerial images of the obstacle. For example, the mission generator 108 can modify the mission plan to provide instructions for orbiting a building at various flight altitudes to obtain digital aerial images of the building. More specifically, the mission generator 108 can modify the mission plan to orbit the building at altitudes separated by a vertical spacing (e.g., utilizing flight legs and flight paths generated based on a reference surface from the flight leg facility 104 and the flight path generator 106). Moreover, the mission generator 108 can include instructions in the mission plan to rotate a camera affixed to the UAV (or rotate the UAV itself) to capture digital aerial images of the building adjacent to the UAV during flight.

The mission generator 108 can also dynamically modify a mission plan during a mission. In particular, the mission generator 108 can receive information regarding a UAV or mission and modify the mission plan based on the additional information. For instance, in one or more embodiments, the mission generator 108 receives information regarding UAV speed, UAV altitude, UAV remaining battery life, UAV position, wind, temperature, or other information and modifies the mission based on the information.

Specifically, the mission generator 108 can determine that a battery utilized by a UAV for flight is losing charge at a faster rate than anticipated. In response, the mission generator 108 can modify the mission plan. In particular, the mission generator 108 can provide additional criteria to the flight path generator 106, and receive a revised flight path that returns the UAV to a docking station. Moreover, the flight path generator 106 can identify a modified flight path to navigate after the docking station. The mission generator 108 can generate a modified mission plan based on the modified flight path from the flight path generator 106. Additionally or alternatively, the mission generator 108 can add and/or move waypoints to the mission plan in order to incorporate the mission plan modifications.

In addition, as shown in FIG. 1, the mission generation system 100 also includes the elevation data manager 110. The elevation data manager 110 can access, receive, analyze, generate, provide, or modify elevation data. For instance, the elevation data manager 110 can access and provide elevation data with regard to a target site. Moreover, the elevation data manager 110 can generate elevation data with regard to a site. In particular, the elevation data manager 110 can access or generate elevation data for utilization in creating a mission plan (e.g., generating altitude data for a mission plan by the mission generator 108).

The elevation data manager 110 can obtain elevation data from a variety of sources. For example, in one or more embodiments the elevation data manager 110 can obtain information from a third party resource. Specifically, in one or more embodiments, the elevation data manager 110 obtains elevation data from the United States National Aeronautics and Space Administration (NASA), such as data from the Shuttle Radar Topography Mission (SRTM).

In alternative embodiments the elevation data manager 110 generates elevation data. For example, in one or more embodiments the elevation data manager 110 can obtain a plurality of initial images of a target site (e.g., from an initial flight of the target site by a UAV). Utilizing the plurality of initial images of the target site, the elevation data manager 110 can generate elevation data. In particular, the elevation data manager 110 can utilize a plurality of initial images of a target site to generate a three-dimensional model (e.g., a three-dimensional point cloud) of the target site. In this manner, the elevation data manager 110 can generate current, site-specific elevation data.

For example, in one or more embodiments, the elevation data manager 110 obtains a first plurality of digital aerial images of a target site and utilizes the first plurality of digital aerial images to generate a low-resolution three-dimensional model (e.g., a sparse point cloud). Specifically, the elevation data manager 110 can scale down the plurality of digital aerial images to generate low resolution digital aerial images and utilize the low resolution digital aerial images to generate a low-resolution three-dimensional model. The elevation data manager 110 can then utilize the low-resolution three-dimensional model to identify structures (or other features) on a target site.

The elevation data manager 110 can also generate three-dimensional models of vertical surfaces. For example, upon obtaining a second plurality of digital aerial images of a vertical surface of a structure, the elevation data manager 110 can generate a three-dimensional model that includes the vertical surface of the structure.

The elevation data manager 110 can also transform, compress, or decompress elevation data. Indeed, elevation data can take a significant amount of memory and processing power to utilize or manipulate. Accordingly, the elevation data manager 110 can transform the elevation data (e.g., from a third-party source, such as NASA, or from a previously generated 3D model) to make the elevation data more manageable. In particular, in one or more embodiments, the elevation data manager 110 transforms the elevation data into an image. Specifically, in one or more embodiments, the elevation data manager 110 transforms the elevation data into a PNG file. In other embodiments, the elevation data manger 110 transform the elevation data into a JPEG, IMG, TIFF, GIF, BMP, or other image file.

More specifically, in one or more embodiments, the elevation data manager 110 utilizes an image file that stores information in the form of RGB (red, green blue) data. The elevation data manager 110 encodes the elevation into RGB data and embeds the information in the image file. In this manner, the elevation data manager 110 can significantly reduce the amount of space and processing power needed to utilize or manipulate elevation data. When needed, the elevation data manager 110 can also transform information from the encoded RGB data to more traditional elevation data.

Although described above with regard to RGB data, it will be appreciated that the elevation data manager 110 can also encode data utilizing other forms of image data. For example, the elevation data manager 110 can also encode data within image files utilizing LAB color data, or other image data types.

Moreover, as illustrated in FIG. 1, the mission generation system 100 also includes the storage manager 112. The storage manager 112 maintains data for the mission generation system 100. The storage manager 112 can maintain data of any type, size, or kind, as necessary to perform the functions of the mission generation system 100.

As illustrated, the storage manager 112 may include flight mission data 114. Flight mission data 114 includes mission plan information to enable a UAV to traverse a mission boundary and capture a plurality of images with regard to a target site. As described above, mission data 114 may include altitude data, one or more waypoints, a location of a docking station, structure location, and other information necessary for completion of a mission to capture a plurality of aerial images with regard to the target site.

Moreover, as shown in FIG. 1, the storage manager 112 may also include elevation data 116. As mentioned above, elevation data 116 may include information regarding elevations of a target site. Elevation data 116 can include a plurality of images captured by a UAV and utilized to generate elevation data of a site. Elevation data 116 can also include elevation data obtained from any other source. Similarly, elevation data 116 can include elevation data compressed and embedded into one or more image files. Elevation data 116 may also include altitude data generated with regard to one or more mission plans (e.g., a low-resolution three-dimensional model such as a sparse point cloud or a high-resolution three-dimensional model such as a dense point cloud). Moreover, elevation data 116 can also include vertical surfaces and/or reference surfaces.

As shown in FIG. 1, the storage manager 112 may also include flight area data 118. Flight area data 118 includes digital flight area information (as described previously). For example, flight area data 118 can include flight zones, property boundaries, aerial images of a target site, electronic plans, survey data, or other digital flight area data. Flight area data 118 may also include one or more mission boundaries generated or received with regard to a target site.

Moreover, as illustrated in FIG. 1, the storage manager 112 may also include vertex database 120. The vertex database 120 can include information regarding vertices. In particular, in one or more embodiments, the vertex database 120 includes information regarding mission boundary corners, flight leg endpoints, obstacle corners, or other vertices. Moreover, in one or more embodiments, the vertex database 120 includes information regarding connections between vertices, such as a shortest connection database.

Similarly, FIG. 1 illustrates that the storage manager 112 also includes UAV data 122. UAV data 122 includes information regarding one or more characteristics of one or more UAVs. For instance, UAV data 122 includes information regarding capabilities (e.g., speed, flight time, battery charge time, range, etc.) of a UAV. Similarly, UAV data 122 includes information regarding one or more cameras affixed to a UAV (e.g., resolution, lens angle). UAV data 122 also includes dynamic information regarding characteristics of a UAV during a mission, such as remaining battery life, flight speed, elevation, position, etc. UAV data also includes environmental data encountered by a UAV (e.g., wind, temperature, or sun location).

Each of the components 102-112 of the mission generation system 100 and their corresponding elements may be in communication with one another using any suitable communication technologies. It will be recognized that although components 102-112 are shown to be separate in FIG. 1, any of components 102-112 may be combined into fewer components (such as into a single component), divided into more components, or configured into different components as may serve a particular embodiment. Moreover, one or more embodiments of the mission generation system 100 may include additional components or fewer components than those illustrated in FIG. 1.

The components 102-112 and their corresponding elements can comprise software, hardware, or both. For example, the components 102-112 and their corresponding elements can comprise one or more instructions stored on a computer-readable storage medium and executable by processors of one or more computing devices. When executed by the one or more processors, the computer-executable instructions of the mission generation system 100 can cause one or more computing systems (e.g., one or more server devices) to perform the methods and provide the functionality described herein. Alternatively, the components 102-112 can comprise hardware, such as a special purpose processing device to perform a certain function or group of functions. Additionally or alternatively, the components 102-112 can comprise a combination of computer-executable instructions and hardware.

Furthermore, the components 102-112 of the mission generation system 100 and their corresponding elements may, for example, be implemented as one or more stand-alone applications, as one or more modules of an application, as one or more plug-ins, as one or more library functions or functions that may be called by other applications, and/or as a cloud-computing model. Thus, the components 102-112 of the mission generation system 100 and their corresponding elements may be implemented as a stand-alone application, such as a desktop or mobile application. Furthermore, the components 102-112 of the mission generation system 100 may be implemented as one or more web-based applications hosted on a remote server. Alternatively or additionally, the components of the mission generation system 100 may be implemented in a suite of mobile device applications or "apps."

Turning now to FIG. 2, further information will be provided regarding implementation of the mission generation system 100. Specifically, FIG. 2 illustrates a schematic diagram of one embodiment of an exemplary system environment ("environment") 200 in which the mission generation system 100 can operate. As illustrated in FIG. 2, the environment 200 can include client devices 202a-202b, a UAV 204, a docking station 206, a network 208, and server(s) 210. The client devices 202a-202b, the UAV 204, the docking station 206, the network 208, and the server(s) 210 may be communicatively coupled with each other either directly or indirectly (e.g., through network 208). The client devices 202a-202b, the UAV 204, the docking station 206, the network 208, and the server(s) 210 may communicate using any communication platforms and technologies suitable for transporting data and/or communication signals, including any known communication technologies, devices, media, and protocols supportive of remote data communications, examples of which will be described in more detail below with respect to FIG. 10.

As just mentioned, and as illustrated in FIG. 2, the environment 200 can include the client devices 202a-202b. The client devices 202a-202b may comprise any type of computing device. For example, the client devices 202a-202b may comprise one or more personal computers, laptop computers, mobile devices, mobile phones, tablets, special purpose computers, TVs, or other computing devices. In one or more embodiments, the client devices 202a-202b may comprise computing devices capable of communicating with the UAV 204, the docking station 206, and/or the server(s) 210. More specifically, in one or more embodiments, a pilot may utilize the client device 202b to locally control and/or communicate with the UAV 204. The client devices 202a-202b may comprise one or more computing devices as discussed in greater detail below with regard to FIG. 10.

Moreover, FIG. 2 also illustrates that the environment 200 can include the UAV 204. As used herein, the term "UAV" or "unmanned aerial vehicle" refers to an aircraft that can be piloted autonomously or remotely by a control system. Accordingly, the UAV 204 may comprise any type of UAV, including a micro UAV, low altitude UAV, or high altitude UAV, whether autonomously or remotely piloted. Similarly, the UAV 204 may include multi-rotor UAVs, single-rotor UAVs, blimp UAVs, or other types of UAVs. In particular, the UAV 204 may include an onboard computer that controls the autonomous flight of the UAV 204.

In at least one embodiment, the UAV 204 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers. The UAV 204 may contain one or more computer-readable storage media and/or one or more processors with instructions stored thereon that, when executed by the one or more processors cause the UAV 204 to perform functions described herein.

Alternatively or additionally, the environment 200 may include the docking station 206. The docking station 206 may be utilized to land, store, charge, guide, or repair the UAV 204. In particular, in one or more embodiments, the docking station 206 can charge or replace batteries exhausted by the UAV 204 during flight. Moreover, the docking station 206 may be utilized to communicate with the UAV 204 prior to, during, or after a flight.

As illustrated in FIG. 2, the client devices 202*a*-202*b*, the UAV 204, the docking station 206, and/or the server(s) 210 may communicate via the network 208. The network 208 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 208 may be any suitable network over which the client devices 202*a*-202*b* (or other components) may access the server(s) 210 or vice versa. The network 208 will be discussed in more detail below with regard to FIG. 10.

Moreover, as illustrated in FIG. 2, the environment 200 also includes the server(s) 210. The server(s) 210 may generate, store, receive, and/or transmit any type of data, including flight mission data 114, elevation data 116, flight area data 118, vertex database 120, and UAV data 122. For example, the server(s) 210 receive data from the client device 202*a* and send the data to the client device 202*b*, the UAV 204, and/or the docking station 206. In one example embodiment, the server(s) 210 comprise a data server. The server(s) 210 can also comprise a communication server or a web-hosting server. Additional details regarding the server (s) 210 will be discussed below with respect to FIG. 10.

Although FIG. 2 illustrates two client devices 202*a*-202*b*, the single UAV 204, and the single docking station 206, it will be appreciated that the client devices 202*a*-202*b*, the UAV 204, and the docking station 206 can represent any number of computing devices, UAVs, or docking stations (fewer or greater than shown). Similarly, although FIG. 2 illustrates a particular arrangement of the client devices 202*a*-202*b*, the UAV 204, the docking station 206, the network 208, and the server(s) 210, various additional arrangements are possible.

For example, the client device 202*b*, the UAV 204 and/or the docking station 206 may communicate directly one with another via a local connection 212. The local connection 212 may comprise any recognized form of wired or wireless communication. For example, in one or more embodiments the client device 202*b* may include a mobile computing device (e.g., tablet) utilized by a UAV operator to communicate with the UAV 204 and the docking station 206 using BLUETOOTH technology.

By way of an additional example, in one or more embodiments, the client device 202*a* can request and receive from the server(s) 210 elevation data 116, flight area data 118, and UAV data 122 via the network 208. The client device 202*a* can identify a mission boundary, create flight legs, and generate one or more flight paths (e.g., via the mission boundary manager 102, the flight leg facility 104, and the flight path generator 106 implemented on the client device 202*a*). Moreover, the client device 202*a* can generate a mission plan from the one or more flight paths (e.g., via the mission generator 108 and the elevation data manager 110 implemented on the client device 202*a*). The client device 202*a* can transmit the mission plan to the client device 202*b* via the network 208, and the client device 202*b* can convey the mission plan to the UAV 204. The UAV 204 can execute the mission plan with regard to a target site. In addition, the UAV 204 can return to the docking station 206 during the mission to recharge or replace a battery utilized for operation of the UAV 204. In one or more embodiments, the UAV 204 can detect environmental information, and convey the environmental information to the client device 202*b*, which can modify the mission plan based on the environmental information (e.g., via the flight path generator 106, the mission generator 108, and the elevation data manager 110 implemented on the client device 202*b*). Moreover, in one or more embodiments, client device 202*b* can modify the mission plan based on completed portions of the mission plan, or other factors. Ultimately, the UAV 204 can capture a plurality of digital aerial images of a target site based on the generated/modified mission plan.

In another example embodiment, upon capturing a plurality of digital aerial images, the mission generation system 100 identifies a structure and generates (or modifies) a mission plan that captures additional digital aerial images of vertical surfaces of the structure. For example, the UAV 204 can send a plurality of digital aerial images of the target site to the client device 202*b*. The client device 202*b* can down-scale the digital aerial images to generate low-resolution digital aerial images (e.g., via the elevation data manager 110) and send the low-resolution digital aerial images to the server 210. The server 210 can generate a low-resolution three-dimensional model of the target site based on the low-resolution digital aerial images (e.g., via the elevation data manager 110) and send the low-resolution three-dimensional model to the client device 202*b*. The client device 202*b* can display the low-resolution three-dimensional model to a user. Moreover, the client device 202*b* can detect user interaction with the three-dimensional model and identify a vertical surface (i.e., structure) based on the user interaction (e.g., via the flight leg facility 104). For example, the client device 202*b* can receive selection of a vertical surface represented in the low-resolution three-dimensional model. Upon identifying a vertical surface (e.g., a structure), the client device 202*b* can generate a mission plan to capture digital aerial images of the vertical surface. In particular, the client device 202*b* can generate a reference surface (e.g., via the flight leg facility 104) by offsetting the vertical surface, generate flight legs in relation to the reference surface (e.g., via the flight leg facility 104), and generate a flight path based on the flight legs (e.g., via the flight path generator 106). The client device 202*b* can then generate a mission plan incorporating the flight path (e.g., via the mission generator 108). The client device 202*b* can communicate with the UAV 204 to execute the mission plan and capture a second plurality of digital aerial images of the vertical surface. The UAV 204 (e.g., via the client device 202*b*) can send the second plurality of digital aerial images to the server 210. Moreover, the server 210 can utilize the second plurality of digital aerial images to generate a three-dimensional model of the vertical surface.

As illustrated by the previous example embodiments, the mission generation system 100 may be implemented in whole, or in part, by the individual elements 202*a*-210 of the environment 200. Although the previous example, described certain components of the mission generation system 100 implemented with regard to certain components of the environment 200 (e.g., implementation of the flight leg facility 104 via the client device 202*a*), it will be appreciated that components of the mission generation system 100 can be implemented in any of the components of the environment 200. For example, the mission generation system 100 may be implemented entirely on the client device 202b. Similarly, the mission generation system 100 may be implemented on the server(s) 210. Alternatively or additionally, different components and functions of the mission generation system 100 may be implemented separately among the client devices 202a-202b, the UAV 204, the docking station 206, the network 208, and the server(s) 210. For instance, the mission generator 108 may be implemented as part of the docking station 206, the elevation data manager 110 may be implemented as part of the UAV 204, the flight path generator 106 may be implemented as part of the client device 202b, and the storage manager 112 may be implemented as part of the server(s) 210.

Figure 3A:
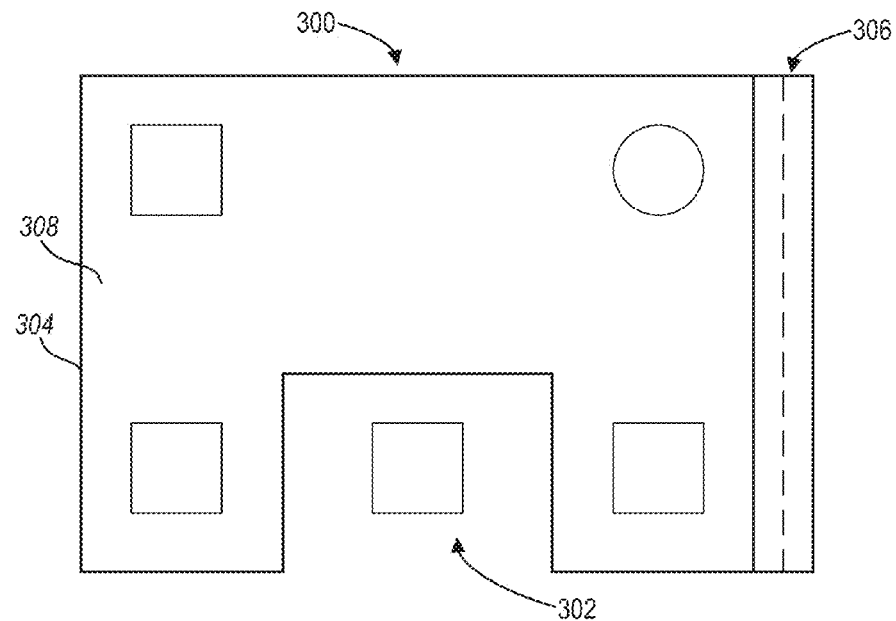
FIG. 3A illustrates a representation of a target site and a mission boundary in accordance with one or more embodiments.
Figure 3B:
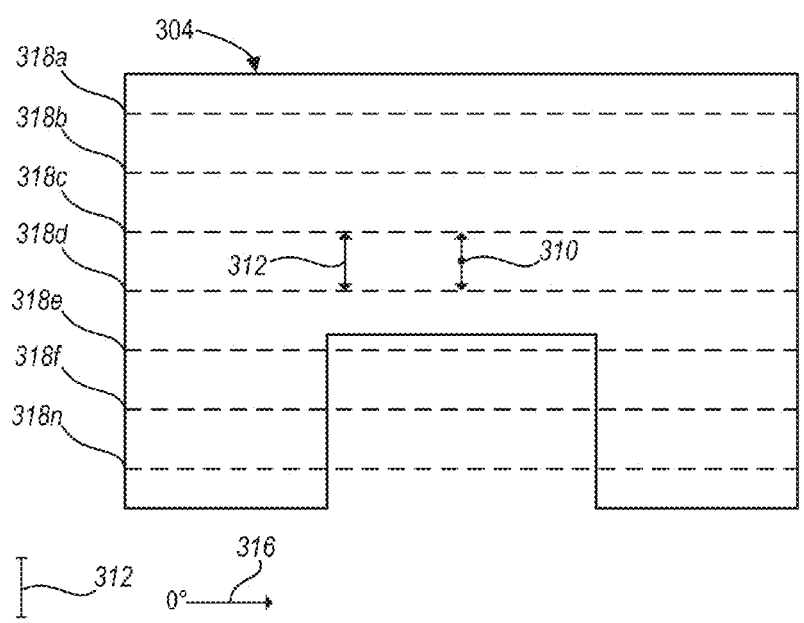
FIG. 3B illustrates a representation of generating flight legs in accordance with one or more embodiments.
Figure 3C:
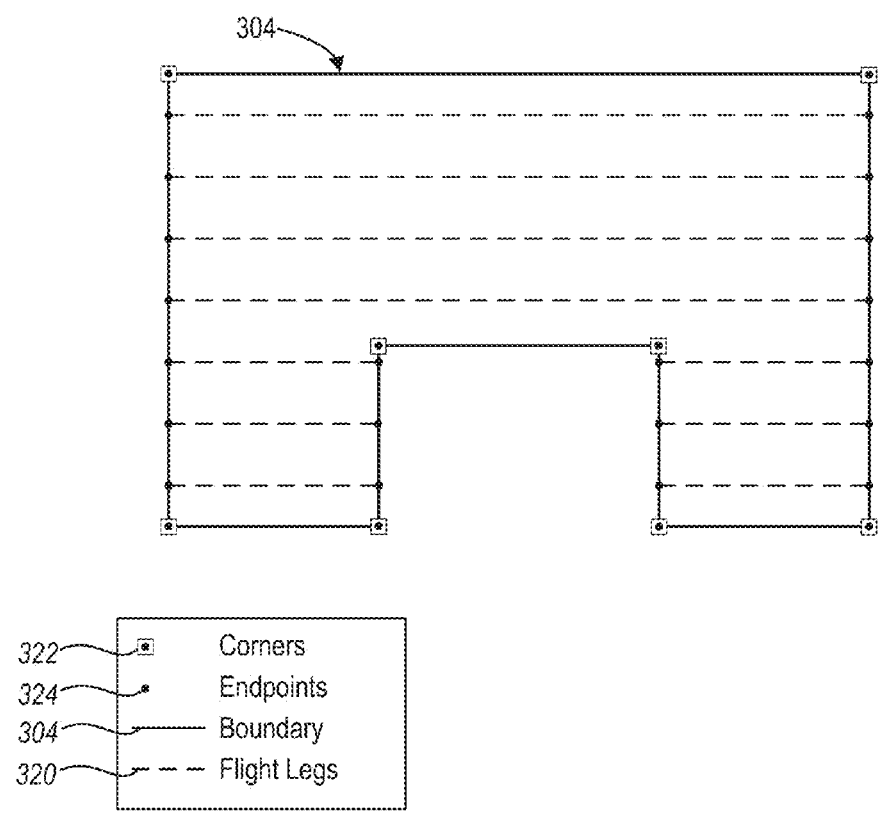
FIG. 3C illustrates a representation of generating flight legs and identifying flight leg endpoints and boundary corners in accordance with one or more embodiments.

Turning now to FIGS. 3A-3C, additional detail will be provided regarding calculating flight legs within a mission boundary in accordance with one or more embodiments. In particular, FIG. 3A illustrates an aerial view of a target site 300 and a neighboring property 302. FIG. 3A also illustrates a representation of a mission boundary 304 created by the mission generation system 100 that defines a UAV flight area 308.

Specifically, in the embodiment of FIG. 3A, the mission generation system 100 creates the mission boundary 304 based on a combination of user input and digital flight area information. In particular, the mission generation system 100 identifies a digital property map outlining the property boundary of the target site 300 and the neighboring property 302. The mission generation system 100 suggests the property boundary of the target site 300 to a user as part of a proposed mission boundary. Based on user selection of the property boundary, the mission generation system 100 creates the mission boundary 304. Moreover, the mission generation system 100 identifies the area within the mission boundary 304 as the UAV flight area 308.

As described above, in other embodiments, the mission generation system 100 can utilize other digital flight area information to generate a mission boundary. For instance, the mission generation system 100 could also generate the mission boundary 304 by analyzing a digital aerial image, identifying a road 306, and suggesting an edge of the road 306 as a portion of a mission boundary. Similarly, the mission generation system 100 can analyze digital flight zones and determine that an edge of the target site 300 abuts a wilderness area that prohibits UAV flights.

Although the UAV flight area 308 and the target site 300 largely coincide with regard to the embodiment of FIG. 3A, it will be appreciated that in one or more embodiments, the UAV flight area 308 will differ from the target site 300. For example, in some embodiments, portions of the target site 300 may not allow for UAV flight (e.g., sensitive areas of a target site where UAV flights are prohibited); thus, the UAV flight area 308 may be smaller than the target site 300. In some embodiments, however, the UAV flight area 308 may be larger than the target site 300 (e.g., where a UAV is permitted to fly along adjacent properties outside of the target site in capturing digital aerial images).

Upon identifying a mission boundary, in one or more embodiments the mission generation system 100 generates flight legs. In particular, in one or more embodiments, the mission generation system 100 generates flight legs by calculating a centroid of a UAV flight area, and then creating flight legs at a specified flight angle and leg spacing from the centroid.

For example, FIG. 3B illustrates a representation of generating flight legs in accordance with one or more embodiments. In particular, FIG. 3B illustrates the mission boundary 304 generated with regard to the target site 300. Moreover, FIG. 3B illustrates a centroid 310 of the UAV flight area 308 calculated by the mission generation system 100.

Based on the centroid 310, the mission generation system 100 can create initial flight legs 318a-318n utilizing the flight angle 316 and the leg spacing 312. In particular, the mission generation system 100 can generate initial flight legs 318c, 318d by drawing lines oriented at the flight angle 316 a distance of one half of the leg spacing 312 from the centroid 310 (i.e., a distance perpendicular to the flight angle 316). In this manner, the mission generation system 100 creates the initial flight legs 318c, 318d. From the initial flight leg 318c, the mission generation system 100 generates initial flight leg 318b by drawing a line at the flight angle 316 a distance of the leg spacing 312 from the initial flight leg 318c (i.e., a distance perpendicular to the initial flight leg 318c).

Following this pattern, the mission generation system 100 can create the initial flight legs 318a-318n. In particular, the mission generation system 100 can generate the initial flight legs 318a-318n such that the initial flight legs 318a-318n are oriented in the direction of the flight angle 316 and separated by the leg spacing 312.

As mentioned previously, however, in one or more embodiments the mission generation system 100 creates flight legs that stay within the mission boundary 304. FIG. 3C illustrates generation of flight legs within the mission boundary 304 in accordance with one or more embodiments. In particular, the mission generation system 100 determines that portions of the initial flight legs 318e-318n fall outside of the mission boundary 304. Accordingly, the mission generation system 100 discards the portions of the initial flight legs 318e-318n that fall outside of the mission boundary 304. Moreover, the mission generation system 100 identifies the portions of the initial flight legs 318a-318n that fall within the mission boundary 304 as flight legs 320.

As illustrated in FIG. 3C, upon identifying flight legs, in one or more embodiments the mission generation system 100 can also identify vertices of a mission boundary. In particular, with regard to FIG. 3C, the mission generation system 100 identifies mission boundary corners 322 and flight leg endpoints 324. Specifically, the mission generation system 100 identifies the flight leg endpoints 324 by determining the intersection of the flight legs 320 and the mission boundary 304. Moreover, the mission generation system 100 identifies the mission boundary corners 322 by identifying ends of edges of the mission boundary 304.

Although FIGS. 3A-3C illustrate a particular method for generating flight legs, it will be appreciated that other embodiments of the mission generation system 100 can generate flight legs utilizing other approaches. For example, rather than utilizing a centroid, one or more embodiments select an alternative starting point for generating flight legs. For example, in one or more embodiments, the mission generation system 100 can identify the longest edge of the mission boundary 304 and generate flight legs starting at the longest edge. In particular, the mission generation system 100 can start at the longest edge and create a flight leg that is a leg spacing (or ½ a leg spacing, or some other distance) from the longest edge at the flight angle.

In addition, although FIGS. 3B-3C illustrate a particular flight angle (i.e., a horizontal flight angle of zero), it will be appreciated that the mission generation system 100 can utilize any flight angle (or multiple flight angles). Indeed, as described previously, in one or more embodiments the mission generation system 100 selects the flight angle 316 in order to reduce (i.e., minimize) flight time. For example, in one or more embodiments, the mission generation system 100 selects the flight angle 316 such that the number of flight legs is minimized. In other embodiments, the mission generation system 100 selects the flight angle such that the length of flight legs is maximized. Specifically, in one or more embodiments, the mission generation system 100 generates initial flight legs at a variety of flight angles and selects final flight legs based on the particular flight angle that minimizes flight time (e.g., maximizes the length of flight legs or minimizes the number of flight legs).

Moreover, although FIGS. 3B-3C illustrate a particular leg spacing, it will be appreciated that the mission generation system 100 can utilize any leg spacing (or multiple different leg spacings). Indeed, as described previously, in one or more embodiments the mission generation system 100 selects the leg spacing 312 based on one or more characteristics of a UAV. For instance, with regard to the embodiment of FIGS. 3B-3C, the mission generation system 100 selects the leg spacing 312 based on a desired resolution (e.g., 1 pixel every 10 cm) and overlap (e.g., side overlap of 50%) of aerial images. Accordingly, the mission generation system 100 selects the leg spacing 312 based on the resolution and lens angle of the camera affixed to the UAV.

Figure 4:
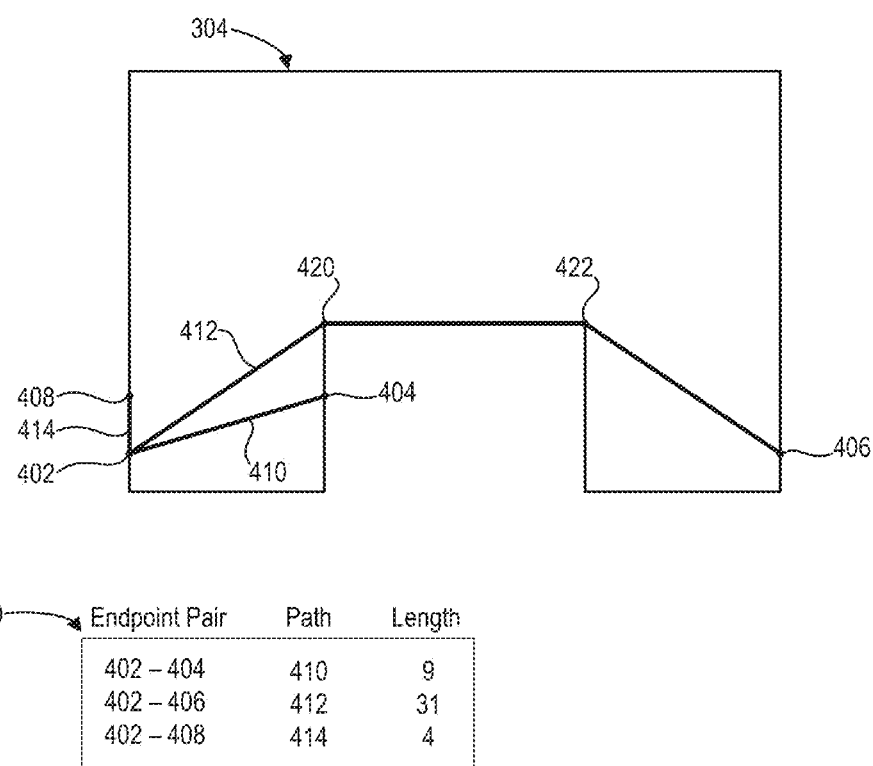
FIG. 4 illustrates a representation of generating shortest connections between endpoint pairs in accordance with one or more embodiments.

Upon identifying vertices, in one or more embodiments, the mission generation system 100 identifies one or more connections between vertices. In particular, in one or more embodiments, the mission generation system 100 identifies shortest connections between endpoints. For example, FIG. 4 illustrates identifying shortest connections in accordance with one or more embodiments. In particular, FIG. 4 illustrates the mission boundary 304, a first endpoint 402, a second endpoint 404, a third endpoint 406, and a fourth endpoint 408.

The mission generation system 100 can identify two endpoints and calculate a shortest connection between the two endpoints subject to the condition that the shortest connection remains within the mission boundary. For example, as illustrated in FIG. 4, the mission generation system 100 can identify a shortest connection 410 between the first endpoint 402 and the second endpoint 404. Specifically, because the first endpoint 402 and the second endpoint 404 are in a line of sight, the shortest connection 410 is a straight line between the first endpoint 402 and the second endpoint 404.

In addition, the mission generation system 100 can identify a shortest connection between endpoints, even where the endpoints do not share a common line of sight. For example, a straight line between the first endpoint 402 and the third endpoint 406 would cross outside of the mission boundary 304. Accordingly, the mission generation system 100 identifies a shortest connection 412 between the first endpoint 402 and the third endpoint 406 utilizing the mission boundary corners 420, 422. In particular, the mission generation system 100 identifies the shortest connection 412 by finding the shortest distance between the first endpoint 402 and the first mission boundary corner 420, finding the shortest distance between the first mission boundary corner 420 and the second mission boundary corner 422, and then finding the shortest distance between the second mission boundary corner 422 and the third endpoint 406. In this manner, the mission generation system 100 can calculate connections between vertices that are not in line of sight with one another using intermediate vertices such that the total flight distance is minimized.

In addition, the mission generation system 100 can also identify a shortest connection between endpoints that lie on the mission boundary 304. For example, the first endpoint 402 and the fourth endpoint 408 are adjacent endpoints on the mission boundary 304. The mission generation system 100 can identify a shortest connection 414 between the first endpoint 402 and the fourth endpoint 408 as a line along the mission boundary 304.

As mentioned previously, the mission generation system 100 can also generate a shortest connection database 430. In particular, the shortest connection database 430 identifies the shortest connection between a plurality of endpoint pairs. More specifically the shortest connection database identifies the shortest connection between a plurality of endpoints pairs, with the condition that the shortest connection between each endpoint pair remains within the mission boundary 304. Thus, for example, the shortest connection database 430 identifies the shortest connection 412 between the first endpoint 402 and the third endpoint 406 and the corresponding length of the shortest connection 412.

In one or more embodiments, the mission generation system 100 calculates shortest connections between vertices utilizing a Floyd-Warshall algorithm. A Floyd-Warhsall algorithm can generate the lengths of the shortest paths between all pairs of vertices. Specifically, in one or more embodiments, the mission generation system 100 defines vertices as:

$$V = E \cup C$$

where V is a set of vertices, E is a set of flight leg endpoints, and C is a set of corners of a mission boundary.

In one or more embodiments, the mission generation system 100 constructs a visibility graph, G from V. A visibility graph is a graph comprising edges between vertices that reside within a mission boundary. Accordingly, the visibility graph G comprises all edges between vertices, V, that fall within a mission boundary. In one or more embodiments, the mission generation system 100 executes a Floyd-Marshall algorithm with regard to G. The Floyd-Marshall algorithm produces the shortest path between any two vertices (e.g., endpoints) in polynomial time.

Because endpoints reflect the ends of flight legs, in one or more embodiments, the shortest connection database 430 reflects not only the shortest connection between endpoints, but also the shortest connect between flight legs. Accordingly, utilizing the methods described above, the mission generation system 100 can identify the shortest path between any pair of flight legs. The mission generation system 100 can utilize the shortest connections between flight legs to identify a single pathway (e.g., a flight path) that minimizes the total length.

As mentioned above, the mission generation system 100 can connect flight legs into a flight path utilizing a variety of algorithms. In particular, in one or more embodiments, the mission generation system 100 utilizes a nearest-neighbor linking algorithm. In one or more embodiments, a nearest-neighbor linking algorithm builds a flight path by starting at an endpoint of a flight leg, going through that flight leg, and proceeding to the nearest unvisited endpoint. In one or more embodiments, the mission generation system 100 runs the nearest neighbor linking algorithm over all possible starting points and the run resulting in the smallest total distance is chosen.

Figure 5A:
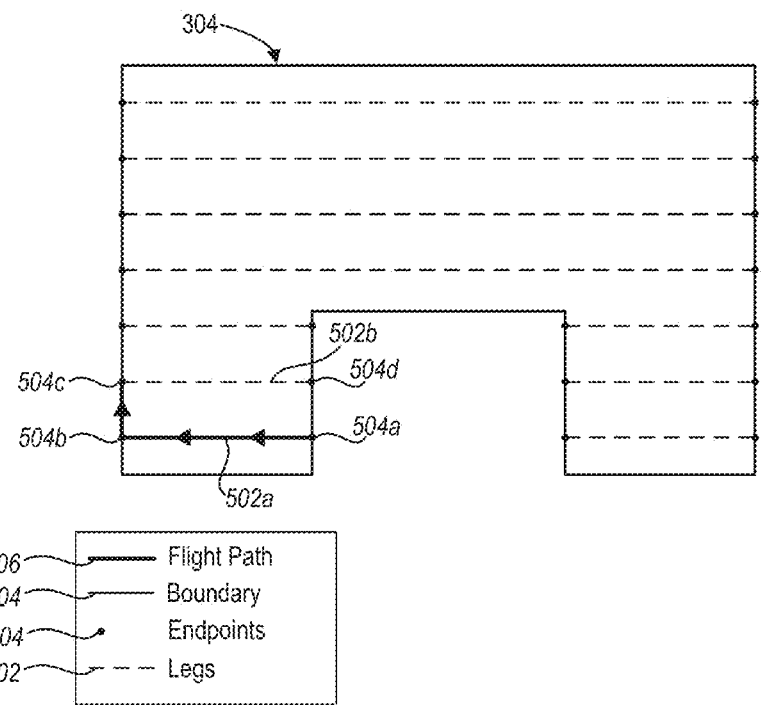
FIG. 5A illustrates a representation of building a flight path utilizing a nearest-neighbor linking algorithm in accordance with one or more embodiments.
Figure 5B:
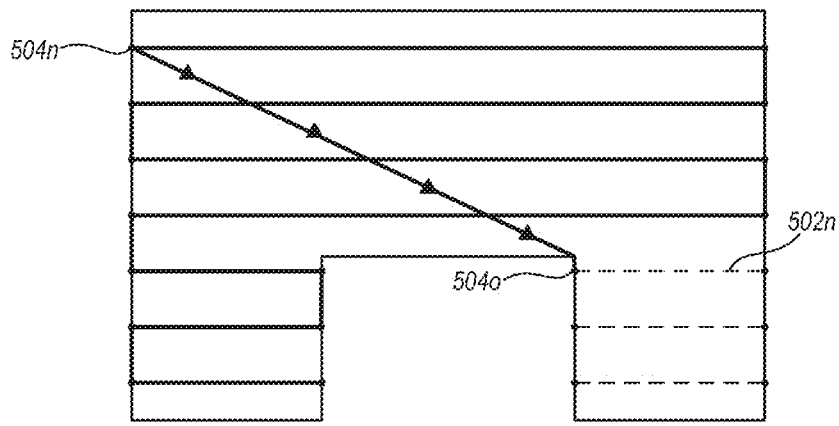
FIG. 5B illustrates a representation of continuing to build the flight path of FIG. 5A utilizing a nearest-neighbor linking algorithm in accordance with one or more embodiments.
Figure 5C:
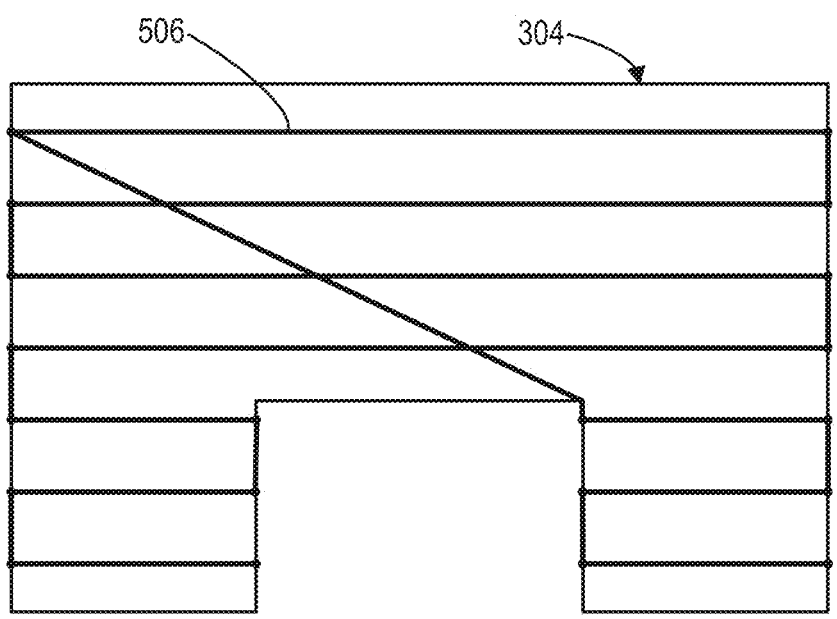
FIG. 5C illustrates a representation of the completed flight path of FIG. 5A, built utilizing a nearest-neighbor algorithm in accordance with one or more embodiments.

For example, FIGS. 5A-5C illustrate connecting flight legs utilizing a nearest-neighbor linking algorithm in accordance with one or more embodiments. In particular, FIG. 5A illustrates the mission boundary 304 with generated flight legs 502 and flight leg endpoints 504 within the mission boundary 304. In applying a nearest-neighbor linking algorithm, the mission generation system 100 selects a first endpoint 504a as a starting point. The mission generation system 100 begins to define a flight path 506 by traversing the first flight leg 502a from the first endpoint 504a to the second endpoint 504b, and adding the first flight leg 502a to the flight path 506.

The mission generation system 100 then seeks the next nearest unvisited endpoint from the second endpoint 504b. The mission generation system 100 determines that third endpoint 504c is the next nearest unvisited endpoint. In particular, with regard to the embodiment of FIG. 5A, the mission generation system 100 references the shortest connection database 430 to determine the nearest unvisited endpoint from the second endpoint 504b. The shortest connection database 430 indicates that the nearest endpoint from the second endpoint 504b is the third endpoint 504c, which the flight path 506 has not yet visited. Accordingly, the mission generation system 100 adds the shortest connection from the second endpoint 504b to the third endpoint 504c to the flight path 506.

The mission generation system 100 can proceed to add additional legs to the flight path following a similar pattern. For instance, the mission generation system 100 proceeds to the third endpoint 504c and goes through the second flight leg 502b to the fourth endpoint 504d. The mission generation system 100 adds the second flight leg 502b to the flight path 506 and searches for the nearest unvisited endpoint from the fourth endpoint 504d.

FIG. 5B illustrates the flight path 506 after the mission generation system 100 has proceeded to endpoint 504n. At endpoint 504n, the mission generation system 100 again searches for the next nearest, unvisited endpoint. Notably, there is no unvisited endpoint in the near vicinity of endpoint 504n. However, the mission generation system 100 can identify that the next nearest unvisited endpoint is 504o, which is not within the line of sight of endpoint 504n. Utilizing identified vertices, the mission generation system 100 can identify the shortest connection between the endpoint 504n and the endpoint 504o (e.g., by referencing the shortest connection database 430). Moreover, the mission generation system 100 can add the shortest connection between endpoints 504n and 504o to the flight path 506, as illustrated in FIG. 5B.

Upon proceeding to the endpoint 504o, the mission generation system 100 can add the flight leg 502n to the flight path, proceed to the next endpoint, locate the next nearest unvisited endpoint, and continue until no additional unvisited endpoints remain. For example, FIG. 5C illustrates the flight path 506 after adding all flight legs such that no additional unvisited endpoints remain. In this manner, the mission generation system 100 can utilize a nearest-neighbor linking algorithm to combine flight legs into a flight path.

Notably, the flight path 506 created utilizing the nearest-neighbor linking algorithm remains within the mission boundary 304. Moreover, the flight path 506 traverses the target site while maintaining a particular leg spacing between legs.

As mentioned above, in one or more embodiments, the mission generation system 100 utilizes the nearest-neighbor linking algorithm to generate a plurality of flight paths based on different starting points and then selects a final flight path from the plurality of flight paths (e.g., the shortest flight path). For example, the mission generation system 100 can generate a second flight path that starts at the second endpoint 504b (rather than at the first endpoint 504a). The mission generation system 100 can compare the length of the second flight path and the length of the previously generated flight path and select the shortest flight path resulting from the comparison as the final flight path. In one or more embodiments, the mission generation system 100 calculates a flight path for every endpoint and selects the shortest resulting flight path.

In addition to the nearest-neighbor linking algorithm, the mission generation system 100 can also utilize a cheapest-edge linking algorithm to build a flight path. In particular, the mission generation system 100 can generate a flight path by adding flight legs to the flight path and repeatedly adding the smallest unpicked connection that does not result in a cycle and does not create a vertex with three paths.

Figure 6A:
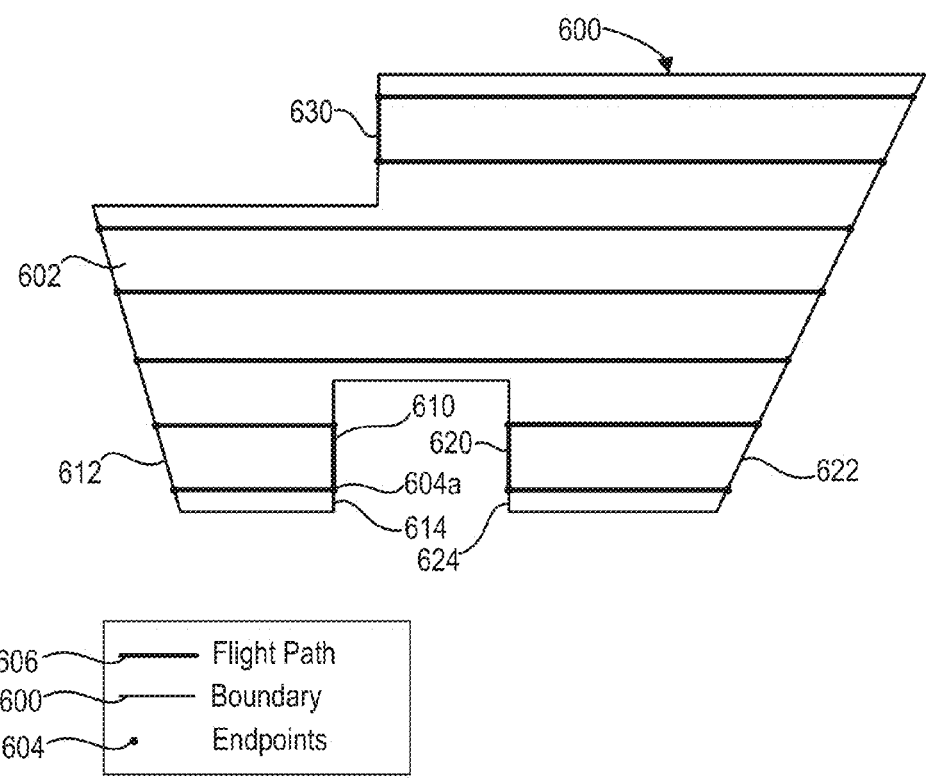
FIG. 6A illustrates a representation of building a flight path utilizing a cheapest-edge linking algorithm in accordance with one or more embodiments.
Figure 6B:
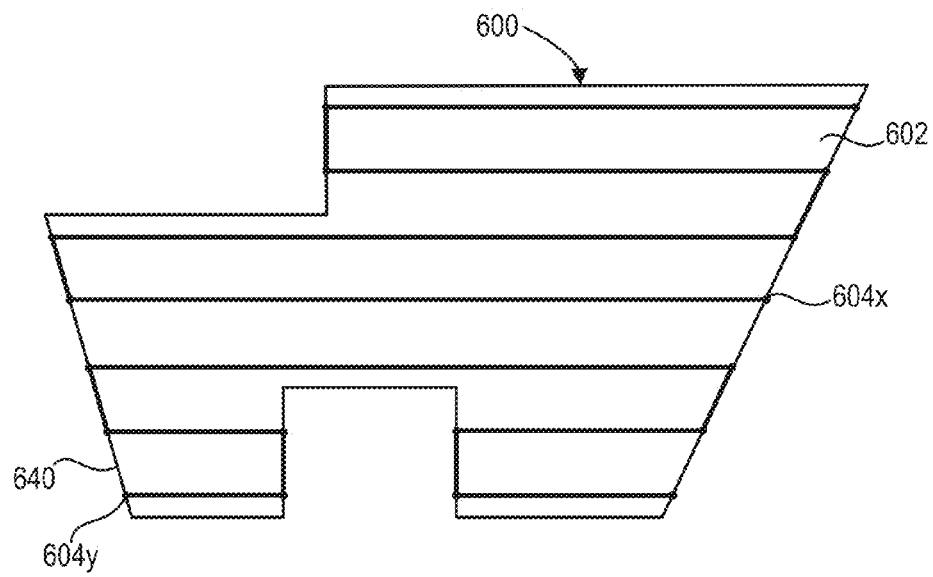
FIG. 6B illustrates a representation of continuing to build the flight path of FIG. 6A utilizing a cheapest-edge linking algorithm in accordance with one or more embodiments.
Figure 6C:
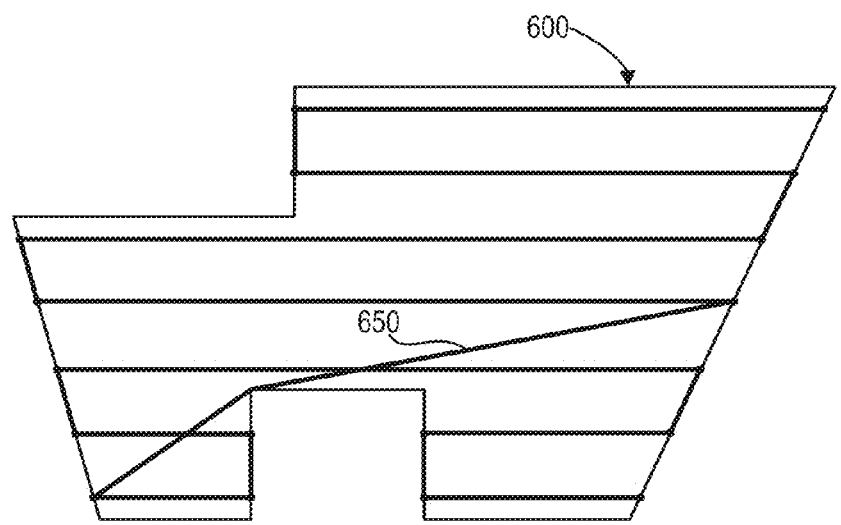
FIG. 6C illustrates a representation of the completed flight path of FIG. 6A, built utilizing a cheapest-edge linking algorithm in accordance with one or more embodiments.

For example, FIGS. 6A-6C illustrate generating a flight path utilizing a cheapest-edge linking algorithm in accordance with one or more embodiments. In particular, FIG. 6A illustrates a mission boundary 600 encompassing a UAV flight area 602. Moreover, FIG. 6A illustrates endpoints 604 corresponding to a plurality of flight legs generated by the mission generation system 100.

In applying the cheapest-edge linking algorithm, the illustrated embodiment of the mission generation system 100 first adds each of the generated flight legs to a flight path 606. As illustrated, however, adding the flight legs to the flight path 606, leaves a series of unconnected flight legs. The mission generation system 100 connects flight legs utilizing the cheapest-edge linking algorithm by identifying the smallest unpicked edge that satisfies two conditions: (1) the unpicked edge, if added to the flight path, cannot result in a cycle (i.e., a closed loop) and (2) the unpicked edge, if added to the flight path, cannot result in a three-degree vertex (i.e., a vertex with three routes leading into our out of the vertex). Thus, with regard to the embodiment of FIG. 6A the mission generation system 100 identifies a first connection 610 as the smallest unpicked edge that satisfies both conditions.

In one or more embodiments, the mission generation system 100 identifies the first connection 610 by referencing a shortest connection database (e.g., the shortest connection database 430). For instance, the mission generation system 100 can identify the shortest connection from the database and determine whether the shortest connection satisfies the two conditions enumerated above. If the shortest connection does not satisfy the two conditions, the mission generation system 100 can proceed to the next shortest connection until finding the shortest available connection that satisfies the two conditions. For example, with regard to FIG. 6A the mission generation system 100 identifies the first connection 610 as the shortest connection in a shortest connection database.

As illustrated in FIG. 6A, upon identifying the first connection 610, the mission generation system 100 searches for the next shortest connection that does not result in a cycle or a three-degree vertex. Notably, however, because the mission generation system 100 added the first connection 610 to the flight path 606, a number of connections fail to satisfy the requisite conditions. For instance, the mission generation system 100 cannot add the unused connection 612 to the flight path 606 because adding the unused connection 612 would create a loop. Similarly, the mission generation system 100 cannot add the second unused connection 614 because adding the second unused connection 614 to the flight path would result in a three-degree vertex (i.e., endpoint 604a would have three paths).

As illustrated, however, the mission generation system 100 ultimately identifies a second connection 620. In particular, the mission generation system 100 identifies the second connection 620 as the next smallest unpicked connection that does not result in a cycle or a three-degree vertex. Accordingly, the mission generation system 100 adds the second connection 620 to the flight path 606. Moreover, by adding the second connection 620, the third unused connection 622 and the fourth unused connection 624 can no longer satisfy the pertinent criteria (i.e., the third unused connection 622 would create a loop and the fourth unused connection 624 would create a three-degree vertex).

The mission generation system 100 continues this pattern by identifying the next smallest unpicked connection that does not result in a cycle or a three-degree vertex (i.e., a third connection 630) and adding the next smallest connection to the flight path 606. In this manner, the cheapest-edge linking algorithm connects the flight legs and builds the flight path 606. After connecting a number of flight legs, however, the number of connections that can satisfy the pertinent criteria begin to dwindle. For example, FIG. 6B illustrates the mission boundary 600, the UAV flight area 602, and the flight path 606 after adding a number of connections to the flight path 606. In particular, the mission generation system 100 has added connections to the flight path 606 until only two endpoints 604x and 604y remain unconnected.

In applying the cheapest-edge linking algorithm, the mission generation system 100 identifies the next shortest connection that does not create a loop or a three-degree vertex. Unlike the previous connections, the connections immediately adjacent to endpoints 604x and 604y fail to satisfy these criteria. For instance, a fifth unused connection 640 would both create a loop and create a three-degree vertex. Accordingly, the mission generation system 100 access a shortest connection database and identifies the shortest unused connection that satisfies the criteria. As illustrated in FIG. 6C, by this process, the mission generation system 100 identifies a final shortest connection 650. The final shortest connection 650 does not create a cycle between endpoints and does not create a three-degree vertex. Rather, as illustrated in FIG. 6C, the cheapest-edge linking algorithm generates the flight path 606 that joins all flight legs.

In one or more embodiments, the cheapest-edge linking algorithm ends when the algorithm connects all available endpoints. Similarly, in one or more embodiments, the cheapest-edge linking algorithm continues until the number of segments in the flight path reaches a certain threshold. For example, in one or more embodiments, the cheapest-edge linking algorithm terminates upon determining that the number of segments in the flight path exceeds the total number of flight legs, times two, minus 1.

More specifically, in one or more embodiments, the mission generation system 100 applies the following pseudo-code in implementing the cheapest-edge linking algorithm:

---

Add all flight legs as segments to the flight path;
Start repeat;
   Pick the smallest unpicked connection that does not result in a cycle
   or three-degree vertex;
   Add the connection as a segment to the flight path;
   If S > ((L * 2) − 1), then end repeat (where S is the number of
   segments in the flight path and L is the number of flight legs);
   If else, repeat;
End.

---

In addition to the cheapest-edge linking algorithm, the mission generation system 100 can also utilize a modified Christofides linking algorithm to generate a flight path from flight legs. A Christofides linking algorithm is an algorithm that finds a near-optimal solution to certain routing problems. In particular, with regard to applicable problems, the Christofides linking algorithm can calculate a route within 150% of a minimum. A Christofides linking algorithm generally operates by creating a minimum spanning tree for a problem, forming a multigraph, forming a Eulerian circuit, and making the circuit Hamiltonian by skipping visited nodes.

In one or more embodiments, the mission generation system 100 modifies a traditional Christofides linking algorithm. In particular, the mission generation system 100 applies a Christofides linking algorithm while adding a condition that the minimum spanning tree contains all flight legs. In other words, the mission generation system 100 creates a minimum spanning tree which contains all the flight legs. The mission generation system 100 then applies a Christofides algorithm with the specified condition to generate a flight path. In particular, the modified Christofides algorithm described herein produces a flight path that is within 150% of the minimum route.

Although this approach may not produce the shortest possible route, the modified Christofides linking algorithm requires fewer computing resources than some alternative approaches. Accordingly, the mission generation system 100 can utilize the modified Christofides linking algorithm to identify a near-optimal route without sacrificing exorbitant amounts of time or computing power.

Aside from the Christofides linking algorithm, in one or more embodiments, the mission generation system 100 can also apply a brute-force linking algorithm. A brute-force linking algorithm tests all permutations of available route configurations. Thus, the mission generation system 100 can apply a brute-force linking algorithm to test all possible connections between flight legs and identify the shortest resulting path.

For instance, in one or more embodiments, the mission generation system 100 utilizes the following pseudo-code to implement a brute-force algorithm:

---

Let two endpoints of any flight leg aL be $aL_o$ and $aL_1$;
Let n be the number of flight legs;
Let A = {0,1}, D = $A^n$;
Let inv(x) = 0 when x = 1, and let inv(x) = 1 when x = 0;
For all n-tuple s ∈ D;
   For all possible permutations of flight legs;
      Find the configuration with total flight distance given by the
      distance from $1L_{s[1]}$ to $1L_{inv(s[1])}$ to $2L_{s[2]}$ to $2L_{inv(s[2])}$ to . . . to
      $nL_{s[n]}$ to $nL_{inv(s[n])}$;
   End for;
End for;
Return the configuration with the minimum total flight distance;
End.

---

In some circumstances, a brute-force linking algorithm can require a significant amount of time and/or computing resources. For example, with regard to a mission boundary containing twenty flight legs, applying a brute-force linking algorithm can require a significant amount of time and processing power. Accordingly, in one or more embodiments, prior to applying a brute-force linking algorithm the mission generation system 100 compares the number of flight legs (or number of endpoints) to a pre-determined threshold (e.g., a flight leg threshold).

In particular, if the mission generation system 100 determines that the number of flight legs exceeds (or meets) the flight leg threshold (e.g., 9 flight legs or 10 flight legs), the mission generation system 100 will not apply the brute-force linking algorithm. However, if the mission generation system 100 determines that the number of flight legs falls below the flight leg threshold, in one or more embodiments, the mission generation system 100 will apply the brute-force linking algorithm. Accordingly, in one or more embodiments, the mission generation system 100 can select a particular algorithm based on the number of flight legs (or endpoints) applicable to a particular target site.

In addition to the number of flight legs, in one or more embodiments, the mission generation system 100 can select a particular algorithm for combining flight legs into a flight path based on one or more other characteristics of the target site. For example, in one or more embodiments, the mission generation system 100 can select a particular algorithm based on a shape of the mission boundary.

In particular, in one or more embodiments, the mission generation system 100 determines whether a mission boundary is concave or convex. For instance, if a mission boundary is convex, in one or more embodiments, the mission generation system 100 will apply a nearest-neighbor linking algorithm. Similarly, if a mission boundary is concave, in one or more embodiments the mission generation system 100 will apply a cheapest-edge linking algorithm and a nearest-neighbor linking algorithm. Moreover, in other embodiments, if a mission boundary is concave the mission generation system 100 will apply a cheapest-edge linking algorithm, a nearest-neighbor linking algorithm, and a Christofides linking algorithm (and select the shortest resulting flight path).

The mission generation system 100 can also select one or more algorithms based on one or more characteristics of a computing device. For instance, the mission generation system 100 can determine that a computing device has limited processing capabilities, and, in response, apply only a cheapest-edge linking algorithm, only a Christofides linking algorithm, or only a nearest-neighbor linking algorithm (or some other combination of algorithms).

Figure 7A:
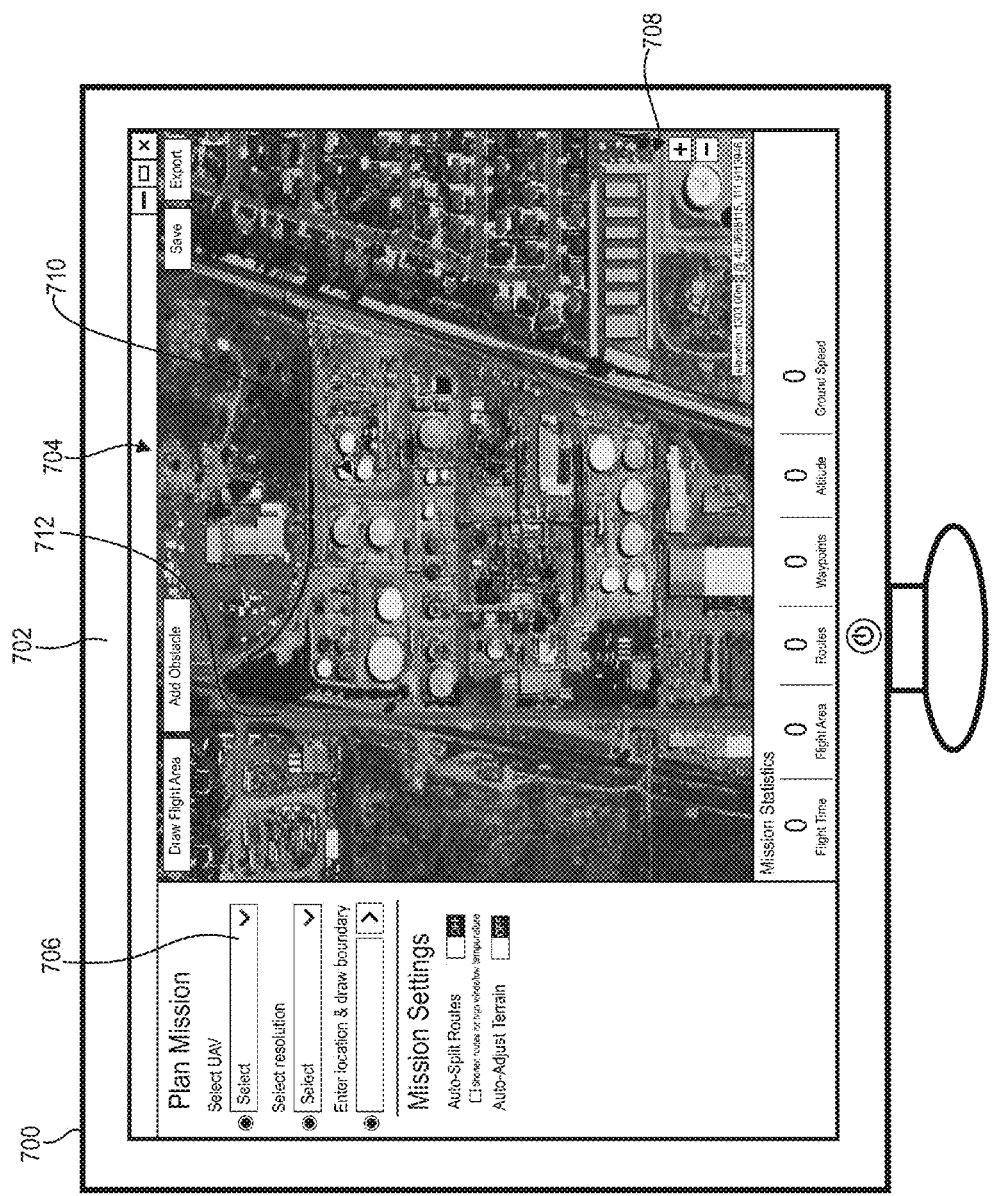
FIG. 7A illustrates a computing device displaying a user interface including a target site in accordance with one or more embodiments.

Turning now to FIGS. 7A-7E, additional detail will be provided regarding generating a mission plan and one or more user interfaces for generating and presenting a mission plan in accordance with one or more embodiments. For example, FIG. 7A illustrates a computing device 700 with a display screen 702 showing a user interface 704.

The user interface 704 is configured to display a variety of user interface elements, including, buttons, check-boxes, menus, drop-down menus, image elements, video elements, data display elements, and other elements. For instance, as shown, the user interface 704 contains a UAV selection element 706 and image display area 708. Moreover, the image display area 708 displays an aerial image comprising a target site 710.

The UAV selection element 706 illustrated in FIG. 7A enables a user to provide user input of a UAV for utilization by the mission generation system 100. Indeed, as mentioned previously, the mission generation system 100 can perform a variety of functions based on one or more characteristics of a UAV. Accordingly, in one or more embodiments, the mission generation system 100 can modify its functions based on the user input of a UAV via the UAV selection element 706. For instance, the mission generation system 100 can modify a leg spacing or an altitude based on one or more characteristics of the UAV provided via the UAV selection element 706.

The image display area 708 is configured to provide a variety of maps, digital aerial images, or other images for display. For instance, as discussed previously, in one or more embodiments the mission generation system 100 can identify a mission boundary based on one or more aerial images. The image display area 708 can display one or more aerial images utilized by the mission generation system 100 to identify one or more mission boundaries.

For example, the mission generation system 100 can suggest a mission boundary utilizing on one or more images within the image display area 708. Specifically, with regard to FIG. 7A, the mission generation system 100 suggests a portion of the mission boundary based on the location of a road 712 contained in the aerial images displayed via the image display area 708. In other embodiments, the mission generation system 100 can identify mission boundaries based on fences, power lines, paths, structures, ground control points, survey markers, or other features of an image.

Figure 7B:
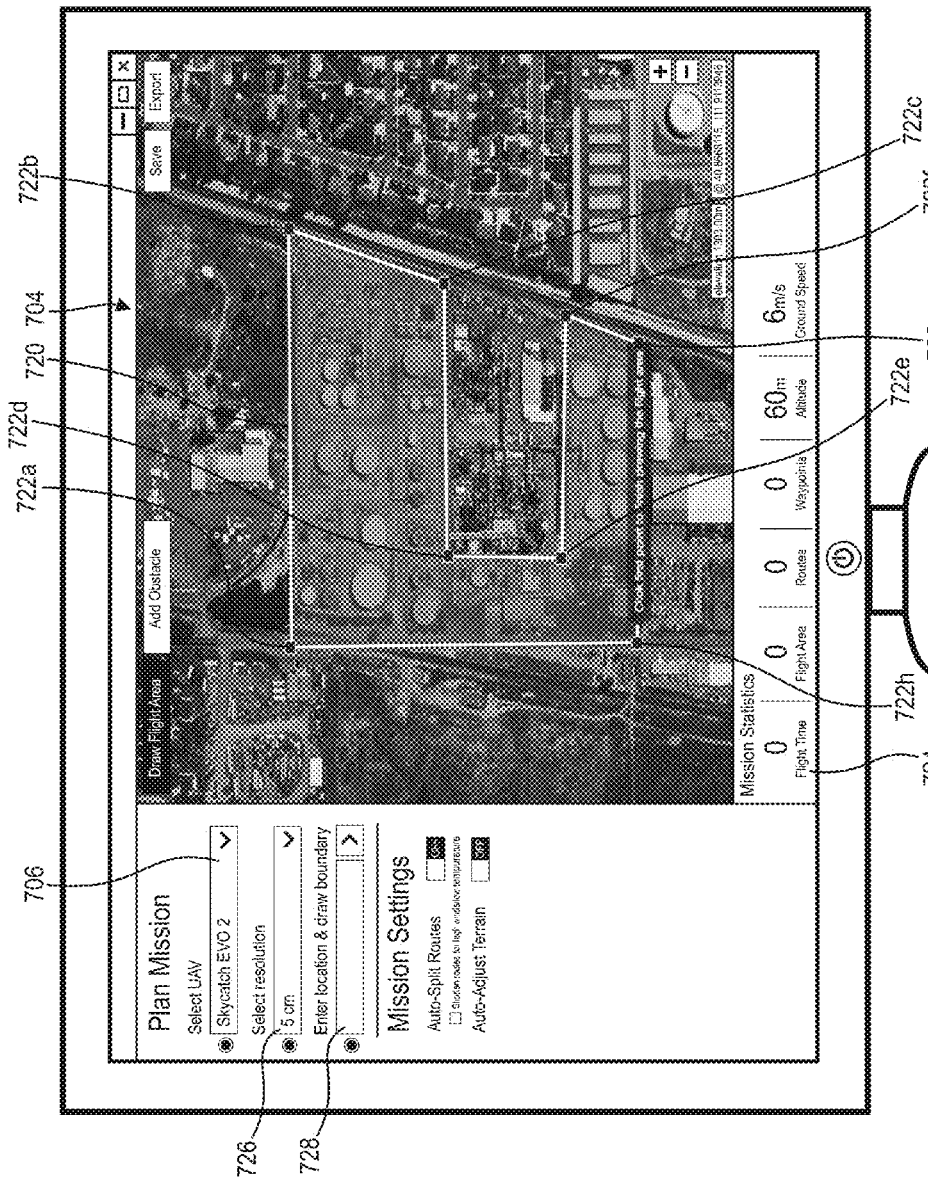
FIG. 7B illustrates the computing device and user interface of FIG. 7A, including an inputted mission boundary in accordance with one or more embodiments.

Moreover, in one or more embodiments, the user can provide user input with regard to the image display area 708. For example, as illustrated in FIG. 7B, the mission generation system 100 can identify a mission boundary 720 based on user input with regard to the image display area 708. In particular, a user can provide user input by selecting locations of the image display area 708 corresponding to locations represented in images shown on the image display area 708. In particular, with regard to FIG. 7B, the mission generation system 100 detects user input of eight corners 722a-722h of a polygon. The mission generation system 100 generates the mission boundary 720 based on the user input of the eight corners 722a-722h.

As mentioned previously, the mission generation system 100 can identify mission boundary corners and/or edges based on digital flight area information. Thus, with regard to FIG. 7B, the eight corners 722a-722h and corresponding polygon edges can correspond to digital flight area information. For instance, in one or more embodiments, the mission generation system 100 can fit or "snap" edges or corners based on digital flight area information. For example, with regard to FIG. 7B, the mission generation system 100 can snap the corner 722b to a property corner corresponding to the target site 710 based on digital property boundary information. In this manner, the mission generation system 100 can generate the mission boundary 720 based on digital flight area information.

As mentioned with regard to FIG. 7A, in one or more embodiments, the mission generation system 100 can receive user input identifying a particular UAV (i.e., via the UAV selection element 706) and modify its operation based on the identified UAV. For example, FIG. 7B illustrates the UAV selection element 706 upon selection of a UAV (i.e., the UAV designated Skycatch EVO 2).

Moreover, FIG. 7B illustrates a mission statistics element 724. The mission statistics element 724 can display various statistics pertinent to a mission plan. For instance, based on the selected UAV (i.e., selected via the UAV selection element 706), the mission generation system 100 can generate and display certain UAV characteristics pertinent to a mission via the mission statistics element 724. For instance, FIG. 7B illustrates a ground speed (i.e. 6 m/s) calculated based on the selected UAV.

In addition, FIG. 7B also shows the user interface 704 with a resolution element 726. The resolution element 726 permits a user to provide user input of a desired resolution of one or more images captured by a UAV. For instance, with regard to the illustrated embodiment, the user provides input indicating a resolution of 5 cm (i.e., 1 pixel per 5 cm).

As mentioned previously, the mission generation system 100 can utilize the selected resolution to modify its operations. For instance, the mission generation system 100 can utilize one or more characteristics of a UAV (e.g., based on the information received via the UAV selection element 706) and a desired resolution (e.g., based on the information provided via the resolution element 726) to calculate a UAV altitude or leg spacing. For instance, with regard to FIG. 7B, the mission generation system 100 identifies the camera affixed to the Skycatch EVO 2, identifies a camera resolution associated with the camera, and identifies the desired resolution of the resulting images. Based on the camera resolution and the desired resolution of the resulting images, the mission generation system 100 determines a flight altitude of 60 m (as illustrated in the mission statistics element 724).

As shown in FIG. 7B, the user interface 704 also contains a location element 728. The location element 728 can receive user input of one or more locations. For example, a user can input an address, city, state, zip code, descriptor, title, or other location identifier via the location element 728. The mission generation system 100 can identify a location based on the information provided via the location element 728 and adjust the image display area 708 to display the identified location. For instance, upon receiving user input of an address via the location element 728, the mission generation system 100 can modify the image display area 708 to display one or more aerial images of the location corresponding to the address.

In addition to the location element 728, the mission generation system 100 can also receive user input of a location based on user interaction with the image display area 708. For example, a user can select and drag within the image display area 708, and the image display area 708 will display aerial images of locations corresponding to the direction of the drag movement. Similarly, the mission generation system 100 can modify aerial images displayed via the image display area 708 so as to zoom in and out, rotate, or otherwise modify the image corresponding to one or more locations.

Figure 7C:
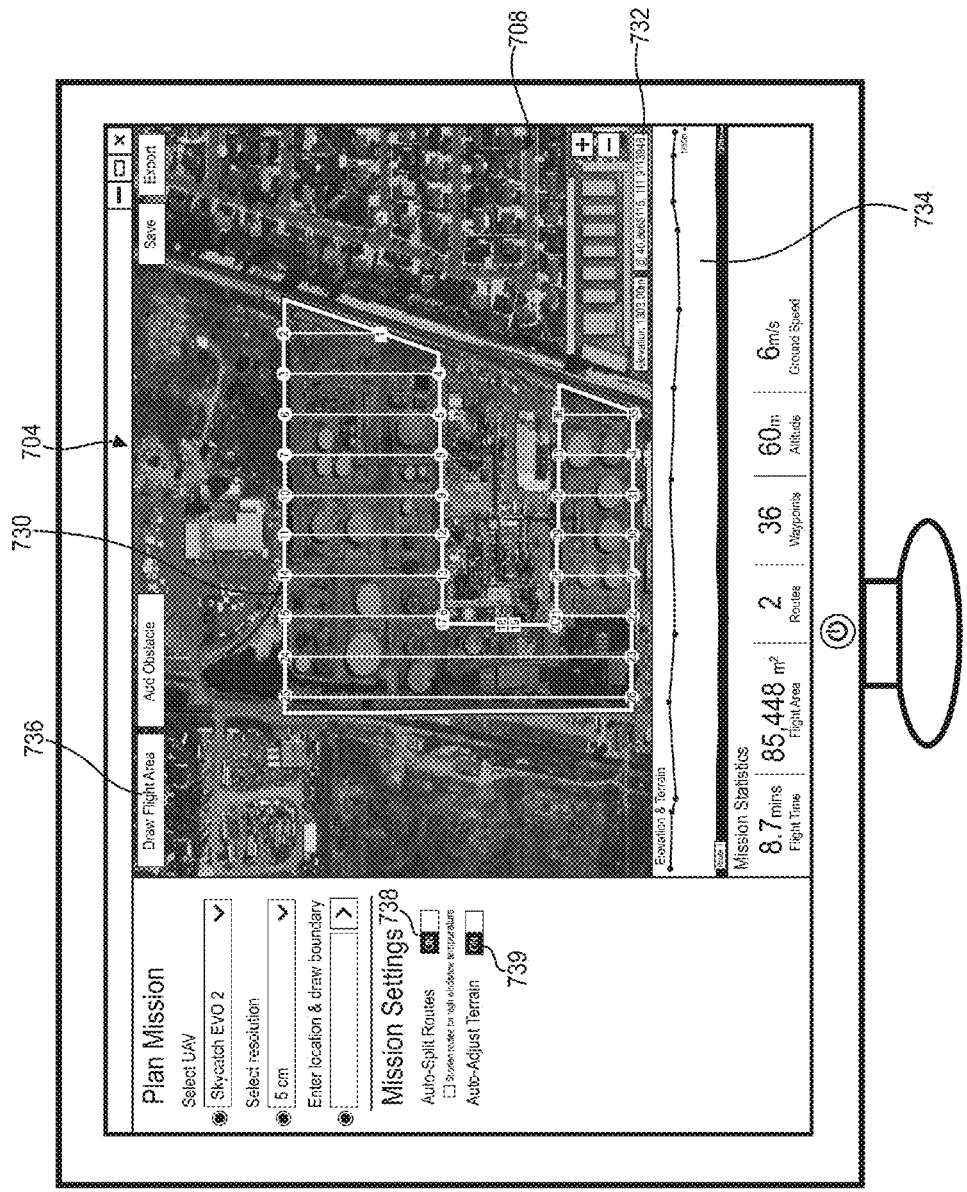
FIG. 7C illustrates the computing device and user interface of FIG. 7A, including a mission plan in accordance with one or more embodiments.

FIG. 7C illustrates the user interface 704 with the image display area 708 displaying a mission plan 730 generated in accordance with one or more embodiments. As discussed previously, in one or more embodiments, the mission generation system 100 can generate flight legs, combine flight legs to build a flight path within a mission boundary, and utilize a flight path to generate a mission plan. The embodiment of the mission generation system 100 illustrated in FIG. 7C utilizes similar methods to identify a flight path. For instance, the mission generation system 100 identifies a leg spacing based on one or more characteristics of the selected UAV (i.e., via the UAV selection element 706) and based on the selected resolution (i.e., via the resolution element 726). The mission generation system 100 also identifies a flight angle based on user input (i.e., based on user input of a flight angle). Utilizing the flight angle and leg spacing, the mission generation system 100 generates flight legs. Moreover, the mission generation system 100 detects that the mission boundary 720 is concave, and therefore applies a nearest-neighbor linking algorithm and a cheapest-edge linking algorithm to the generated flight legs. Furthermore, the mission generation system 100 identifies a shortest flight path based on the flight paths resulting from the nearest-neighbor linking algorithm and the cheapest-edge linking algorithm.

As illustrated in FIG. 7C, the mission generation system 100 also generates a mission plan from the flight path. For instance, the mission generation system 100 detects elevation data and generates altitude information for the mission plan. Specifically, in FIG. 7C, the mission generation system 100 accesses elevation data from NASA's Shuttle Radar Topography Mission (SRTM) corresponding to the location displayed in the image display area 708. As described previously, in other embodiments, the mission generation system 100 can generate elevation data utilizing a plurality of aerial images.

The mission generation system 100 can also provide elevation data for display. Indeed, as illustrated in FIG. 7C, the mission generation system 100 provides, via the user interface 704, the elevation data element 732. The elevation data element 732 provides a user with the elevation of a location displayed via the image display area 708. In particular, the elevation data element 732 can provide the elevation of a particular location in response to a user moving a cursor (or finger in the case of a tablet or touchscreen device) to a position on the image display area 708 corresponding to the particular location. Thus, as shown, the elevation data element 732 shows the elevation (i.e., 1303 m) associated with a particular position indicated by a user (i.e., coordinate (40.87, −111.91) within a local coordinate scheme).

As described previously, the mission generation system 100 can utilize elevation data to generate altitude information for a mission plan. In particular, with regard to FIG. 7C, the mission generation system 100 generates altitude data for the mission plan utilizing elevation data corresponding to the target site. In particular, the mission generation system 100 generates altitude data such that a UAV will maintain an altitude of approximately 60 m as it traverses the UAV flight area. More specifically, the mission generation system 100 generates waypoints 1-36 in the mission plan (i.e., along the flight path) to maintain a desired altitude. In particular, the mission generation system 100 defines an altitude corresponding to each of the waypoints 1-36 to obtain a desired altitude.

Moreover, the mission generation system 100 can provide the altitude of various waypoints for display. In particular, FIG. 7C illustrates the user interface 704 with the elevation and terrain element 734. The elevation and terrain element 734 can display altitude data and corresponding elevation data of a mission plan along one or more flight paths. For example, the elevation and terrain element 734 displays the altitude of each waypoint and the elevation data of the target site corresponding to each waypoint. Similarly, the elevation and terrain element 734 displays the altitude data of the mission plan between waypoints with the corresponding elevation data of the target site.

Although FIG. 7C illustrates waypoints at endpoints, it will be appreciated that the mission generation system 100 can add waypoints at a variety of locations to obtain a desired altitude. For example, if a target site contains an abrupt jump in elevation, the mission generation system 100 can add one or more waypoints (e.g., add a waypoint within a flight leg) corresponding to the location of the jump in elevation of the target site. Thus, the mission generation system 100 can add waypoints at flight leg endpoints, in the middle of a flight leg, or at any other location.

As mentioned, the mission generation system 100 can also consider battery life, range, environmental factors, or other characteristics of a UAV in generating a mission plan. Thus, with regard to FIG. 7C, the mission generation system 100 has divided the mission plan into two flight paths (i.e., one flight path before waypoint 18, and another flight path after waypoint 19). Specifically, the mission generation system 100 has divided the mission plan into two flight paths based on the estimated battery life of the selected UAV (i.e., Skycatch EVO 2). In particular, after the UAV reaches waypoint 18, flight the mission generation system 100 can direct the UAV to return to a docking station to recharge a battery (or exchange batteries). Moreover, upon recharging the battery (or exchanging batteries) the mission generation system 100 can direct the UAV to return to waypoint 19.

The mission generation system 100 can also account for the location of a docking station in generating a mission plan (or generating a flight path). For example, in one or more embodiments, the mission generation system 100 can identify a location of a docking station and modify a mission plan to reduce flight time. For example, with regard to FIG. 7C the mission generation system 100 determines that the docking station will be located in close proximity to waypoint 18. Accordingly, the mission generation system 100 generates two flight paths, and divides the flight paths at waypoint 18 (i.e., a location corresponding to the location of the docking station).

As just mentioned, in one or more embodiments, the mission generation system 100 will split flight paths in generating a mission plan. In particular, in one or more embodiments, the mission generation system 100 will split flight paths based on user input. For example, FIG. 7C illustrates an auto-split element 738. The auto-split element 738 can toggle "on" or "off" based on user interaction. When the auto-split element 738 is in the "on" position, the mission generation system 100 can divide flight paths based on one or more characteristics of the UAV (e.g., battery life, flight range), environmental elements, the location of a docking station, or other features. When the auto-split element 738 is in the "off" position, the mission generation system 100 will not automatically divide flight paths.

Similarly, in one or more embodiments, the mission generation system 100 also permits a user to control whether the mission generation system 100 will adjust UAV altitude based on elevation data of the target site. In particular, FIG. 7C illustrates an auto-adjust terrain element 739. Based on user input with the auto-adjust terrain element 739, the mission generation system 100 can toggle whether it will modify UAV altitude in the mission plan based on elevation data.

As mentioned previously, in one or more embodiments, the mission generation system 100 identifies obstacles and modifies a mission plan based on the identified obstacles. For example, FIG. 7C illustrates an add obstacle element 736. The add obstacle element 736 enables a user to provide user input of an obstacle for utilization by the mission generation system 100. Specifically, upon user interaction with the add obstacle element 736, the mission generation system 100 can receive user input of an obstacle via the image display area 708.

Figure 7D:
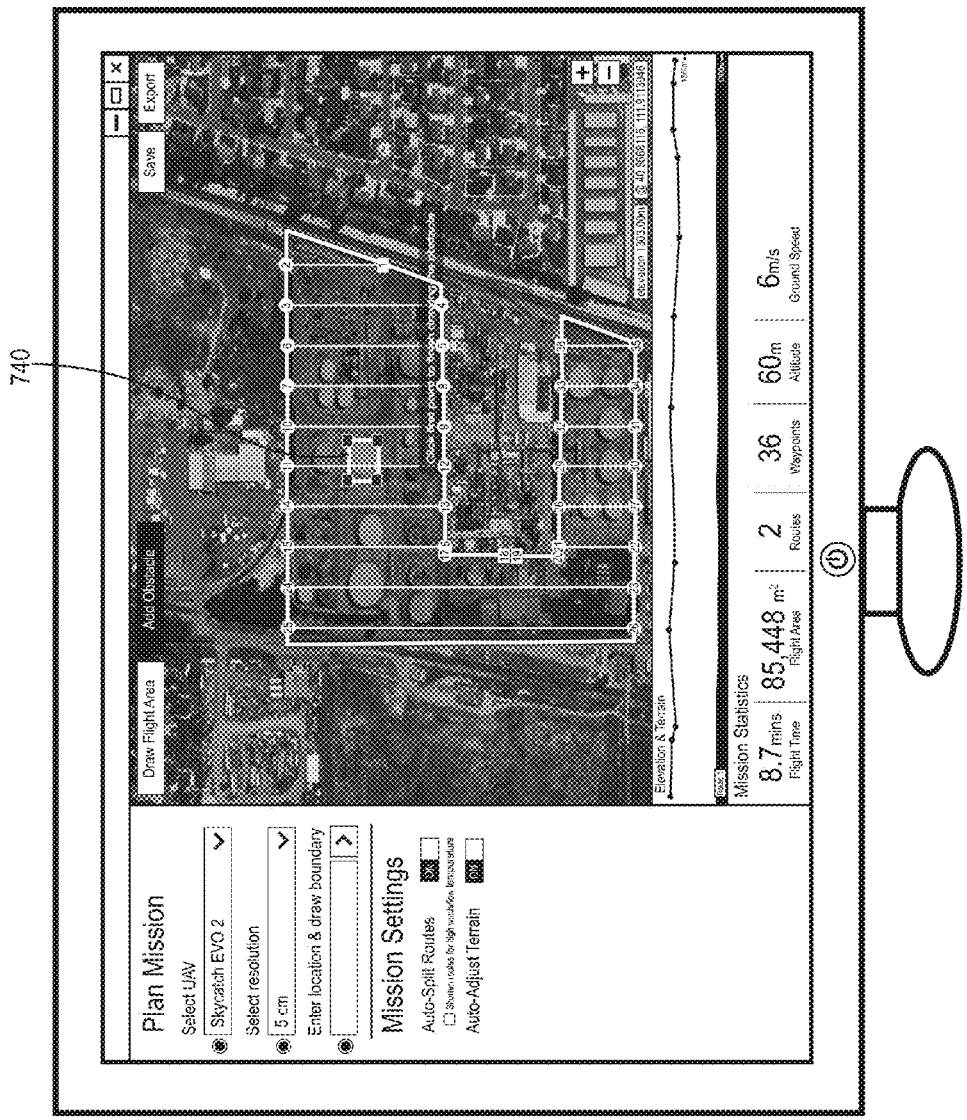
FIG. 7D illustrates the computing device and user interface of FIG. 7A, including an obstacle in accordance with one or more embodiments.

For example, FIG. 7D illustrates an obstacle 740 identified based on user input via the image display area 708. In particular, the mission generation system 100 identifies the obstacle 740 based on user selection of corners associated with the obstacle 740. Although illustrated as a polygon, the obstacle 740 can comprise any shape.

In addition to identifying a location and/or shape of an obstacle, the mission generation system 100 can also identify other characteristics of an obstacle. In particular, the mission generation system 100 can identify an obstacle elevation. For example, in one or more embodiments, the mission generation system 100 can receive user input of one or more obstacle elevations. In other embodiments, the mission generation system 100 can identify an obstacle elevation based on elevation data.

In addition to obstacle elevation, the mission generation system 100 can also identify an obstacle buffer spacing. In particular, the mission generation system 100 can identify an obstacle buffer spacing that describes a minimum distance from the obstacle that a UAV will maintain during flight. In one or more embodiments, the mission generation system 100 can identify an obstacle buffer spacing based on user input (e.g., user input that a UAV must maintain a distance of 20 m from an obstacle). In other embodiments, the mission generation system 100 can identify an obstacle buffer spacing based on the type of obstacle (e.g., a first distance for a building, a second distance for power lines, a third distance for trees, a fourth distance for elevated terrain, etc.).

Figure 7E:
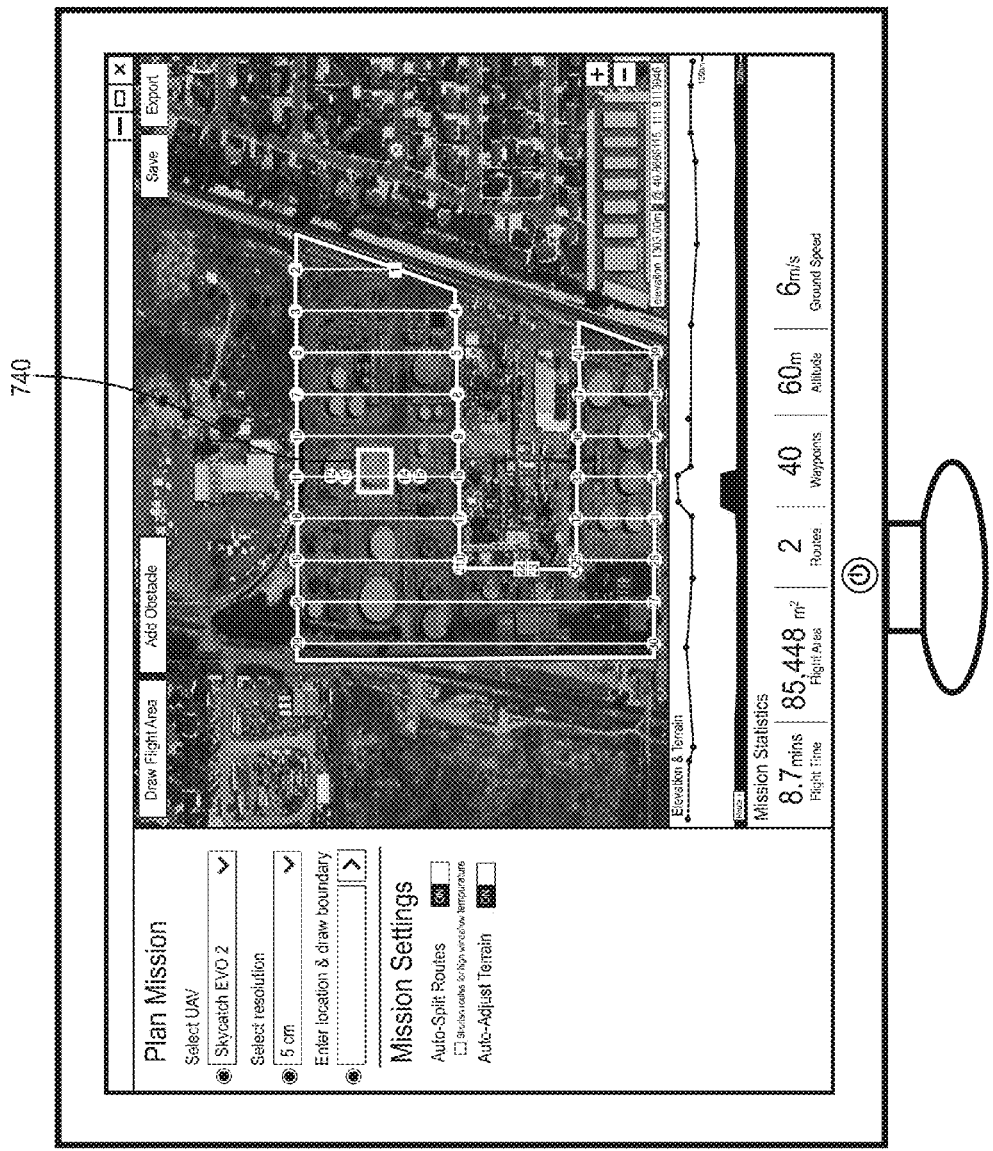
FIG. 7E illustrates the computing device and user interface of FIG. 7A, including a mission plan modified based on the obstacle of FIG. 7D in accordance with one or more embodiments.

Moreover, upon identifying an obstacle, in one or more embodiments, the mission generation system 100 modifies the mission plan based on the identified obstacle. For example, FIG. 7E illustrates a modified mission plan based on the obstacle 740. In particular, the mission generation system 100 has added new waypoints 12-15. In particular, the first new waypoint 12 is located along a flight path prior to the obstacle 740 at a first altitude (e.g., an altitude below the obstacle elevation). The second new waypoint 13 is located along the flight path prior to the obstacle 740 at a second altitude higher than the first altitude (e.g., an altitude above the obstacle 740). The third new waypoint 14 is located along the flight path after the obstacle 740 at a third elevation greater than the first elevation (e.g., an altitude above the obstacle 740). The fourth new waypoint 15 is located along the flight path after the obstacle 740 at a fourth elevation lower than the third altitude (e.g., an altitude below the obstacle 740). By adding the new waypoints 12-15, the mission generation system 100 can generate a mission plan that enables a UAV to fly over the obstacle 740.

In addition to flying over an obstacle, the mission generation system 100 can modify a mission plan to avert an obstacle in a variety of other ways. For example, in one or more embodiments, the mission generation system 100 can modify a mission plan to circumvent an obstacle. For example, rather than adding new waypoints 12-15 with altitude information to fly above the obstacle 740, the mission generation system 100 can add new waypoints at locations around the obstacle (e.g., add way points corresponding to the corners of the obstacle 740).

In addition, in one or more embodiments, the mission generation system 100 can modify a mission plan to circumvent an obstacle, while still capturing aerial images of the obstacle. For instance, upon identifying an obstacle, the mission generation system 100 can generate a series of waypoints that circumvent the obstacle at different altitudes. For example, the mission generation system 100 can identify a structure and generate a series of waypoints that orbit the structure at a plurality of altitudes, each altitude separated by a vertical spacing (e.g., altitudes of 60 m, 100 m, 140 m, 180 m, etc.). Moreover, the mission generation system 100 can modify an orientation of a camera affixed to the UAV such that the camera captures aerial images of the structure (e.g., the side of a building), as the UAV orbits at the plurality of altitudes. In this manner, the mission generation system 100 can generate a mission plan that circumvents an obstacle while capturing aerial images of the obstacle. Additional detail regarding capturing digital aerial images of vertical surfaces of buildings is provided below (e.g., in relation to FIGS. 8A-11D)

In addition, the mission generation system 100 can select a vertical spacing based on one or more characteristics of an obstacle and/or one or more characteristics of a UAV. For example, the mission generation system 100 can select a vertical spacing based on an elevation (or height) of a structure, based on a shape of a structure, based on a resolution of a camera affixed to a UAV, or based on other factors.

Moreover, although FIGS. 7C-7E illustrate an obstacle identified via user input, it will be appreciated that the mission generation system 100 can identify obstacles without user input. For example, the mission generation system 100 can generate a three-dimensional model of a target site utilizing a plurality of images, and identify obstacles based on the three-dimensional model.

Figure 8A:
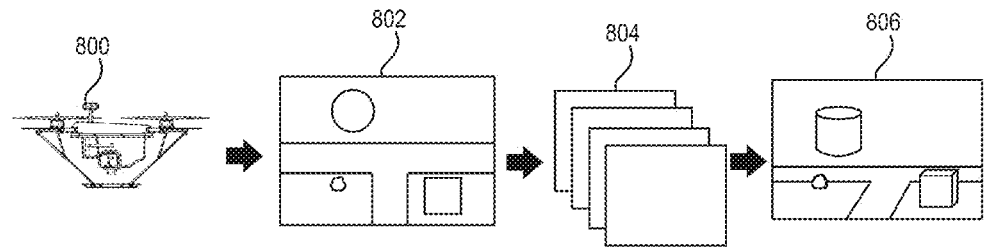
FIGS. 8A-8C illustrate identifying a structure with vertical surfaces on a target site in accordance with one or more embodiments.
Figure 8B:
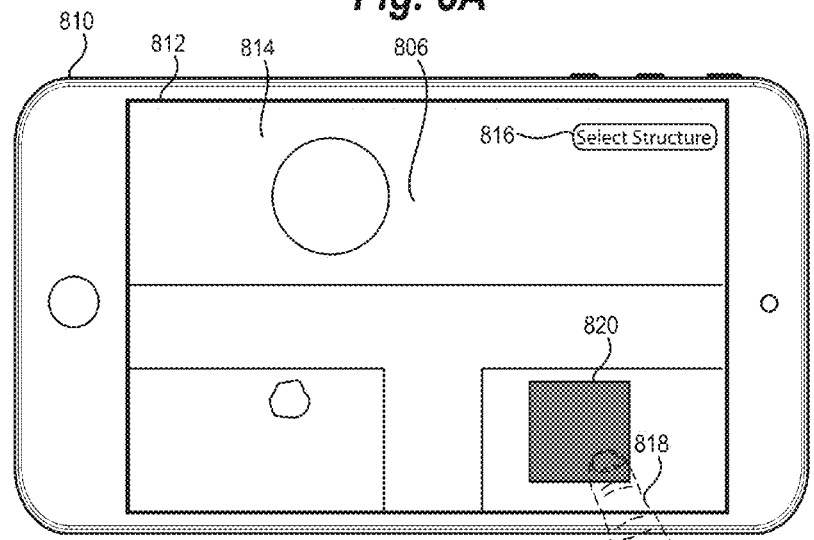
Figure 8C:
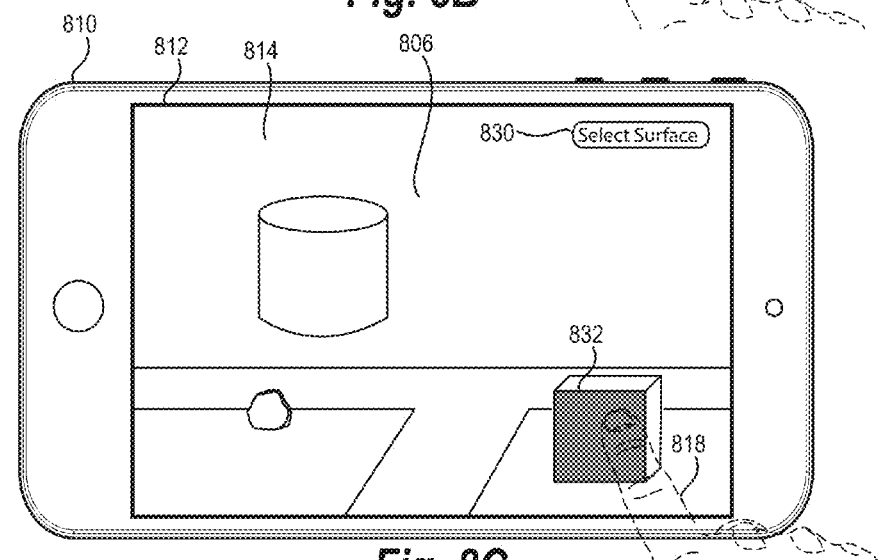

Turning now to FIGS. 8A-8C additional detail will be provided regarding generating a mission plan for capturing digital aerial images of a vertical surface. In particular, FIG. 8A illustrates a UAV 800 flying a mission plan in relation to a target site 802. As shown, the UAV 800 captures a plurality of digital aerial images 804 while flying the mission plan. Moreover, the mission generation system 100 utilizes the plurality of digital aerial images 804 to generate a three-dimensional model 806 of the target site 802. Specifically, the mission generation system 100 utilizes the plurality of digital aerial images 804 to generate a point cloud representation of the target site 802.

The mission generation system 100 can generate the three-dimensional model 806 utilizing a variety of different approaches. For example, in one or more embodiments, the mission generation system 100 generates the three-dimensional model 806 from the plurality of digital aerial images 804 utilizing a structure from motion algorithm and/or bundle adjustment algorithm. Indeed, the mission generation system 100 can utilize one or more approaches described in Manlio Francisco Barajas Hernandez, Leonardo Felipe Romo Morales, David Chen, Generating Georeference Information For Aerial Images, Ser. No. 14/857,238 (filed at the USPTO Sep. 17, 2015), which is incorporated herein by reference.

Generating a three-dimensional model can require a significant amount of time and computing resources. Accordingly, in one or more embodiments, the mission generation system 100 generates a low-resolution (but accurate) three-dimensional model from the plurality of digital aerial images 804 to assist in identifying vertical surfaces. In particular, the mission generation system 100 can down-scale the plurality of digital aerial images 804 to generate low-resolution images. Specifically, the mission generation system 100 can down-scale the plurality of digital aerial images 804 by reducing the size (e.g., number bytes, pixels) for each digital aerial image. The mission generation system 100 can then analyze the low-resolution images to generate a low-resolution three-dimensional model. Utilizing low-resolution images and/or a low-resolution three-dimensional model, the mission generation system 100 can more easily and quickly generate a three-dimensional model. Indeed, the mission generation system 100 can generate a three-dimensional model of a target site while a UAV is in flight capturing digital aerial images of the target site.

In one or more embodiments, the mission generation system 100 can further utilize a monocular simultaneous localization and mapping (i.e. monocular SLAM) algorithm to generate the three-dimensional model. Monocular SLAM algorithms assist in generating three-dimensional models in real-time (e.g., during flight). For instance, the mission generation system 100 can utilize LSD-SLAM, ORB-SLAM, or EKF-SLAM techniques to generate a three-dimensional model. Accordingly, the mission generation system 100 can utilize the UAV 800 (or another device) to generate a three-dimensional model while the UAV 800 is in flight.

As mentioned previously, the mission generation system 100 can also provide a three-dimensional model for display. Indeed, the mission generation system 100 can provide a three-dimensional model for display and identify a vertical surface of the three-dimensional model based on user interaction with the three-dimensional model. For example, FIGS. 8B-8C illustrate a computing device 810 with a display screen 812 displaying a user interface 814. As shown, the user interface 814 includes a representation of the three-dimensional model 806.

The mission generation system 100 can receive user selection of a structure and/or a vertical surface from a three-dimensional model. For example, in relation to FIG. 8A, the user interface 814 includes a structure selection element 816. Upon user interaction with the structure selection element 816, the mission generation system 100 can detect user selection of a structure from the three-dimensional model 806.

Indeed, as illustrated in FIG. 8A, upon user interaction by the finger 818 with the structure selection element 816, a user utilizes a finger to select a structure 820. The mission generation system 100 detects the selection and identifies the structure 820 from the three-dimensional model 806. In particular, the mission generation system 100 detects a position of the selection in relation to the three-dimensional model 806 and identifies the structure 820 corresponding to the detected position.

In one or more embodiments, the mission generation system 100 isolates a structure from surrounding portions of the three-dimensional model 806 by analyzing elevation data in the three-dimensional model 806. For example, the mission generation system 100 can apply an elevation filter that identifies the structure 820 based on changes in elevation in the three-dimensional model 806. In particular, the mission generation system 100 can apply a structure elevation threshold. If the three-dimensional model changes elevation more than the structure elevation threshold (e.g., greater than a ten-foot change in elevation within a ten-foot horizontal distance), the mission generation system 100 identifies the structure 820. By analyzing changes in elevation, the mission generation system 100 can identify a border of the structure 820 and select the structure 820 as illustrated in FIG. 8B.

As mentioned, the mission generation system 100 can also identify one or more vertical surfaces (in addition to or in the alternative to identifying an entire structure). For example, FIG. 8C illustrates a representation of the three-dimensional model 806 within the user interface 814. As shown, the user interface 814 can portray the three-dimensional model 806 from a variety of different viewpoints. In particular, a user can change a viewpoint of the three-dimensional model 806 based on user interaction with the user interface 814 (e.g., select and drag).

Moreover, as shown in FIG. 8C, the user interface 814 includes a surface selection element 830. Upon user interaction with the surface selection element 830, the mission generation system 100 can select one or more vertical surfaces from the three-dimensional model 806. For example, as shown in FIG. 8C, based on user interaction by the finer 818 with the vertical surface 832, the mission generation system 100 selects the vertical surface 832. As mentioned above, the mission generation system 100 can also analyze changes in elevation from the three-dimensional model 806 to identify the vertical surface 832.

Although FIGS. 8A-8B illustrate identifying structures based on user interaction with a user interface, the mission generation system 100 can also identify structures without user interaction. Indeed, in one or more embodiments, the mission generation system 100 analyzes a three-dimensional model of a target site and identifies structures and/or vertical surfaces. The mission generation system 100 can then automatically generate a mission plan to capture digital aerial images of the structures and/or vertical surfaces.

As mentioned above, upon identifying a vertical surface on a target site, the mission generation system 100 can generate (or modify) a mission plan to capture digital aerial images of the vertical surface. Moreover, upon capturing digital aerial images of the vertical surface, the mission generation system 100 can utilize the digital aerial images of the vertical surface to generate a three-dimensional model that includes the vertical surfaces (e.g., a three-dimensional of the entire site that includes a more detailed representation of the vertical surfaces).

For instance, FIG. 9A illustrates generating a mission plan to capture digital aerial images of a vertical surface in accordance with one or more embodiments. In particular, FIG. 9A illustrates a structure 900 with a vertical surface 902. As shown, the mission generation system 100 generates a reference surface 906 by offsetting the vertical surface 902 by an offset 904. The mission generation system 100 then generates a plurality of flight legs 908a-908c and a flight path 910 corresponding to the reference surface 906. The flight path 910 can be utilized as part of a mission plan for capturing digital aerial images of the vertical surface 902.

In relation to the embodiment of FIG. 9A, the mission generation system 100 generates the reference surface 906 by offsetting the vertical surface 902 based on the offset 904. The mission generation system 100 determines the offset 904 based on a resolution of a camera affixed to a UAV. In particular, the mission generation system 100 determines the offset 904 based on a camera resolution and a desired resolution of resulting digital aerial images (or a desired resolution of a three-dimensional model). Specifically, the resolution of digital aerial images changes based on the resolution of a camera and distance from the camera utilized to capture the digital aerial images. The mission generation system 100 can thus determine the offset 904 based on the camera resolution and the desired resolution of resulting digital aerial images.

In addition to camera resolution, the mission generation system 100 can also determine the offset 904 based on a variety of other factors. For example, the mission generation system 100 can also determine the offset 904 based on a minimum safety threshold (e.g., a minimum distance to maintain between the UAV and any structure). Moreover, the mission generation system 100 can also determine the offset 904 based on a desired overlap between digital aerial images. The mission generation system 100 can also determine the offset 904 based on environmental conditions. For instance, the mission generation system 100 can increase the offset 904 based on high winds. Similarly, the mission generation system 100 can decrease the offset 904 in response to poor lighting conditions.

As illustrated in FIG. 9A, the mission generation system 100 also generates the reference surface 906. As shown, the reference surface 906 is a digital surface generated based on an offset from the vertical surface 902. Although the vertical surface is illustrated as a clear plane in FIG. 9A, the vertical surface 902 may be sparsely defined. Indeed, as discussed above, in one or more embodiments, the mission generation system 100 utilizes a low-resolution three-dimensional model with digital aerial images captured from above the structure 900 to determine a mission plan for capturing digital aerial images of the vertical surface 902. Accordingly, in one or more embodiments, the vertical surface 902 may be identified as elevation points in a sparse-point cloud that indicate the elevation of the roof of the structure 900. The mission generation system 100 can estimate the vertical surface 902 based on the elevation of known points in a three-dimensional representation (e.g., the elevation of the known points on the roof projected to the elevation of known points on the ground). Moreover, the mission generation system 100 can generate the reference surface by offsetting the estimated vertical surface by the offset 904.

As shown in FIG. 9A, the mission generation system 100 utilizes the reference surface 906 to generate the flight legs 908a-908c, and the flight path 910. Indeed, the mission generation system 100 can utilize any of the methods described above with regard to generating flight legs and flight paths to generate the flight legs 908a-908c. Notably, however, the flight legs 908a-908c are defined by the reference surface 906 (which is vertically, rather than horizontally, aligned, in contrast to the flight legs generated in relation to FIGS. 3A-6C)).

For example, the mission generation system 100 can identify a centroid of the reference surface 906, generate the flight legs 908a-908c based on the centroid, a leg spacing, and a flight angle. The mission generation system 100 can then generate the flight path 910 based on the flight legs 908a-908c (e.g., utilizing a nearest-neighbor linking algorithm, a cheapest-edge linking algorithm, a Christofides linking algorithm, and/or a brute-force linking algorithm).

In one or more embodiments, the mission generation system 100 selects flight legs by weighting vertical flight legs differently than horizontal flight legs. Indeed, as mentioned above, the mission generation system 100 can weight flight legs to reduce the total distance traveled in a flight mission. The mission generation system 100 can also weight flight legs based on vertical distance travelled. To illustrate, the mission generation system 100 can increase the weight of flight legs based on vertical distance traveled to generate a flight path that minimizes change in elevation required to capture digital aerial images of a vertical surface and/or structure.

As mentioned above, the mission generation system 100 can select a leg spacing and a flight angle in relation to the flight legs 908a-908c. For example, the mission generation system 100 can select the leg spacing based on a desired overlap of digital aerial images of the vertical surface 902. Similarly, the mission generation system 100 can select a flight angle to minimize a number of flight legs, to minimize elevation change, or to minimize flight path distance.

In one or more embodiments, the mission generation system 100 can generate the flight legs 908a-908c and the flight path to avoid prohibited areas along the vertical surface 902 and/or the reference surface 906. For example, a certain portion of the structure 900 may have dangerous equipment or activities (e.g., high-altitude welders, crane work, or mine blasting) or sensitive areas (e.g., areas with sensitive materials that cannot be captured in digital aerial images or an area with high-profile executives that do not wish to be disturbed by a UAV). The mission generation system 100 can determine prohibited flight areas along the vertical surface 902 and/or the reference surface 906 and generate the flight legs 908a-908c and the flight path 910 to avoid the prohibited areas (e.g., as described above in relation to prohibited areas on a target site).

As mentioned above, in one or more embodiments, the mission generation system 100 generates a flight path based on a camera angle. In particular, the mission generation system 100 can modify a camera angle to capture digital aerial images while avoiding a change in elevation. For instance, as discussed previously, in one or more embodiments, the mission generation system 100 applies a minimum flight altitude. In order to capture digital aerial images of structures below the minimum flight altitude, the mission generation system 100 can determine a camera angle so that a UAV can remain above the minimum flight altitude and capture digital aerial images of vertical surfaces below the minimum flight altitude.

Changing a camera angle can impact the resolution and overlap of resulting digital aerial images. Indeed, as camera angle changes, the distance between the camera and the objects portrayed in a digital aerial image changes, which directly impacts the resolution (e.g., pixels per square inch) of the digital aerial images. Similarly, as camera angle changes, the overlap of objects portrayed in digital aerial images changes between different flight legs.

Accordingly, in one or more embodiments, the mission generation system 100 can determine a leg spacing and/or an offset amount based on camera angle. For example, FIG. 9B illustrates generating a leg spacing and an offset based on a camera angle. In particular, FIG. 9B illustrates the structure 900, the vertical surface 902, and the reference surface 906. FIG. 9B also illustrates a minimum flight altitude 920. In order to capture a digital aerial image of a position 922 below the minimum flight altitude 920, the mission generation system 100 modifies a camera angle. Specifically, the mission generation system 100 changes the orientation of the camera from horizontal to an angle 928 pointing toward the position 922.

Based on the angle 928, the mission generation system 100 modifies the offset 904 to a second offset 926. Indeed, if the mission generation system 100 utilizes the offset 904 with the angle 928, the distance 924 between the camera and the position 922 will be much larger than the offset 904. This can result in a digital aerial image with a significantly different resolution than other digital aerial images. Accordingly, the mission generation system 100 generates the second offset 926. In particular, the mission generation system 100 generates the second offset 926 based on the camera resolution. Specifically, the mission generation system 100 generates the second offset 926 such that the distance 924 between the camera and the position 922 corresponds to the offset 904. In this manner, the mission generation system 100 can capture a digital aerial image of the position 922 below the minimum flight altitude 920 without having to fly below the minimum flight altitude 920 and without compromising resolution of the resulting digital aerial images.

As mentioned above, the mission generation system 100 can also determine leg spacing based on camera angle. Indeed, as shown in FIG. 9B, the mission generation system 100 generates a first flight leg 930a to capture digital aerial images of the position 922. Because the camera angle 928 is pointed toward the position 922, however, the flight leg 930a will not capture digital aerial images of the portion of the building immediately adjacent to the UAV. Accordingly, if the mission generation system 100 maintains the same leg spacing and returns the camera angle to horizontal, the amount of overlap between resulting digital aerial images will not be uniform.

Thus, as shown in FIG. 9B, upon generating the flight leg 930a to capture digital aerial images of the position 922, the mission generation system 100 calculates a first leg spacing 932 based on a desired overlap of resulting digital aerial images and the camera angle. Specifically, the mission generation system 100 determines an area of the vertical surface 902 that a camera can capture by flying the first flight leg 930a at the camera angle. The mission generation system 100 then determines a desired overlap amount and generates the first leg spacing 932 to capture digital aerial images of an area of the vertical surface 902 that will satisfy the desired overlap amount.

Upon generating the flight legs 930a, 930b based on the first leg spacing 932, the mission generation system 100 then generates the remainder of the flight legs 930c, 930d based on the second leg spacing 934. As discussed above, the mission generation system 100 can determine the second leg spacing 934 based on a desired amount of overlap (or other factors) to capture digital aerial images of portions of the vertical surface 902 above the minimum flight altitude 920. In this manner, the mission generation system 100 can capture digital aerial images of the entire vertical surface 902, without having to fly below the minimum flight altitude 920 and without compromising a desired amount of overlap between digital aerial images.

Although FIG. 9B illustrates two leg spacings (i.e., the first leg spacing 932 and the second leg spacing 934), the mission generation system 100 can generate flight legs with any number of different leg spacings. For example, a structure may have multiple different levels, where each level has a horizontal surface (i.e., a roof) that the UAV must avoid (i.e., the UAV must maintain a minimum flight altitude above the horizontal surfaces). The mission generation system 100 can generate flight legs with corresponding camera angles to capture portions of vertical surfaces that fall below the minimum flight altitude, and generate a variety of different leg spacings to maintain an overlap amount in resulting digital aerial images.

Moreover, although FIG. 9B illustrates the first leg spacing 932 as being a positive distance, in one or more embodiments, the mission generation system 100 may utilize a leg spacing of zero. For example, the mission generation system 100 may need multiple flight legs at the same elevation (i.e., with a leg spacing of zero) utilizing different camera angles to capture digital aerial images of a vertical surface below a minimum flight altitude. To illustrate, the mission generation system 100 may utilize a first flight leg at a first camera angle to capture digital aerial images of a first portion (e.g., a portion 0 to 30 feet from the ground) and utilize a second flight leg at the same elevation but a second camera angle to capture digital aerial images of a second portion (e.g., a portion from 30 to 60 feet from the ground).

In addition, although FIG. 9A illustrates a mission plan for a single vertical surface 902, the mission generation system 100 can also generate a mission plan for the entire structure 900 (i.e., all four vertical surfaces of the structure 900). For example, in one or more embodiments, the mission generation system 100 can generate a reference surface from each of the four vertical surfaces of the structure 900, generate flight legs for the reference surface and then connect the flight legs to generate a flight path that traverses all of the vertical surfaces of the structure 900.

Although FIGS. 9A-9B illustrate generating flight paths to traverse the reference surface 906, the mission generation system 100 can also generate a flight path to travel to (and from) the structure 900. For example, the mission generation system 100 can generate a flight path to travel to the structure 900, perform the flight path 910, and then travel from the structure 900.

Indeed, in one or more embodiments, the mission generation system 100 selects a starting point of the flight path 910 and an ending point of the flight path 910. The mission generation system 100 can add the starting point and the ending point (and any intermediate points) as waypoints. The mission generation system 100 can determine a mission plan that incorporates the waypoints in an efficient manner (as described above).

The mission generation system 100 can also select a starting point and/or endpoint. For example, the mission generation system 100 can select a starting point (and/or endpoint) for traversing the reference surface 906 based on a variety of factors. To illustrate, the mission generation system 100 can select a starting point based on a direction that a UAV will be traveling from in approaching the structure 900 (e.g., select a starting point on the left side of the reference surface 906 when a UAV will approach the structure from the left), based on a UAV elevation (e.g., select a starting point based on an elevation of an approaching UAV), or based on wind direction (or other environmental factors). Similarly, the mission generation system 100 can select an ending point based on a direction that UAV will be traveling in departing the structure 900, based on a UAV elevation (e.g., select an ending point based on an elevation of the next waypoint in a mission plan) or based on wind direction (or other environmental factors).

Furthermore, although the reference surface 906 of FIG. 9A is a two-dimensional surface from a single vertical surface, in one or more embodiments, the mission generation system 100 generates a reference surface from multiple vertical surfaces. In particular, the mission generation system 100 can generate a three-dimensional shape form multiple vertical surfaces and utilize the three-dimensional shape to generate flight legs and a flight path. For example, FIGS. 10A-10C illustrate generating a reference surface (i.e., a three-dimensional shape) from multiple vertical surfaces and then generating a flight path based on the reference surface.

Figure 10A:
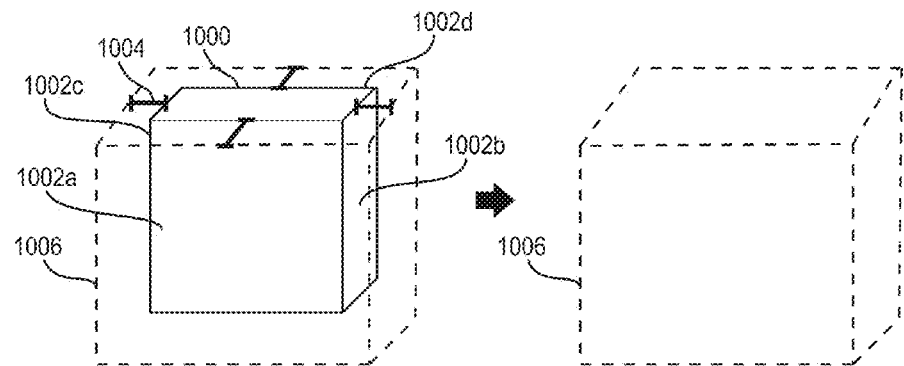
FIGS. 10A-10D illustrate a representation of generating a reference surface by offsetting a plurality of vertical surfaces and generating flight legs corresponding to the reference surface in accordance with one or more embodiments.
Figure 10B:
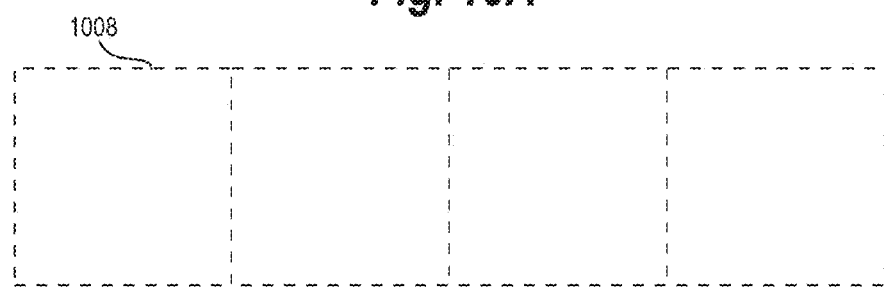
Figure 10C:
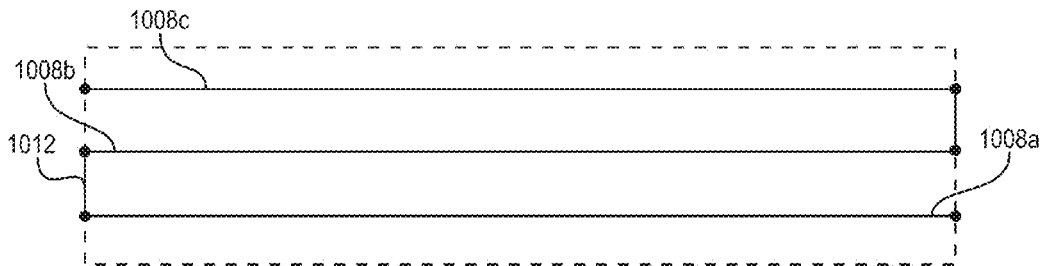

In particular, FIG. 10A illustrates a structure 1000 with vertical surfaces 1002a-1002d. As shown, the mission generation system 100 generates a reference surface 1006 by offsetting the vertical surfaces 1002a-1002d by an offset amount 1004. In particular, the mission generation system 100 offsets the vertical surfaces 1002a-1002d and then projects the surfaces until they intersect to form the reference surface 1006. As illustrate, this results in a three-dimensional polygon with sides parallel to the vertical surfaces 1002a-1002d.

Although the foregoing example illustrates a particular approach to generating the reference surface 1006, the mission generation system 100 can utilize a variety of alternate approaches. For example, in one or more embodiments, the mission generation system 100 utilizes one or more voxels to approximate the shape of a building and then expand the voxels to generate a reference surface. Specifically, the mission generation system 100 can utilize voxels to fill the region defined by the vertical surfaces 1002a-1002d. The mission generation system 100 can then expand the region filled with voxels to generate the reference surface 1006.

Similarly, in one or more embodiments, the mission generation system 100 applies a mesh simplification algorithm to generate a reference surface. Specifically, the mission generation system 100 can apply a mesh simplification algorithm on a structure to produce a simplified polygon. The mission generation system 100 can then expand the simplified polygon into the reference surface 1006.

Furthermore, in one or more embodiments, the mission generation system 100 identifies a ground profile of a structure and utilizes the ground profile to generate a reference surface. For example, the mission generation system 100 can identify a ground profile of a structure (e.g., a two-dimensional shape of the structure at ground level) and extrude the ground profile into an approximation of the vertical structure. The mission generation system 100 can then expand the approximation of the vertical structure into the reference surface 1006.

Upon generating the reference surface, the mission generation system 100 can then utilize the reference surface 1006 to generate a flight path to capture digital aerial images for all four vertical surfaces 1002a-1002d. In particular, as shown in FIG. 10B, the mission generation system 100 projects the reference surface 1006 from a three-dimensional space to a two-dimensional space. For example, the mission generation system 100 can cut and unwrap the reference surface 1006 so that the reference surface 1006 is projected flat onto a two-dimensional surface. To illustrate, the mission generation system 100 can project the reference surface 1006 by traversing the reference surface 1006 from a starting point and recording the vertical and horizontal distance travelled along the reference surface from the starting point as two-dimensional coordinates.

For instance, starting at a bottom corner of the reference surface 1006, the entire reference surface 1006 can be expressed as a horizontal and vertical distance along the outside of the reference surface 1006 from the starting point. The mission generation system 100 maps each horizontal and vertical distance from the starting point along the outside of the reference surface 1006 as a coordinate in a two-dimensional plane. In this manner, as shown in FIG. 10B, the mission generation system 100 generates a two-dimensional representation 1008 of the reference surface 1006.

The mission generation system 100 can utilize the two-dimensional representation 1008 of the reference surface 1006 to generate a plurality of flight legs and a flight path. In particular, the mission generation system 100 can utilize any of the methods described above (for generating\flight legs and flight paths within a boundary) to generate flight legs and flight paths within the two-dimensional representation 1008. Indeed, as shown in FIG. 10C, the mission generation system 100 generates a plurality of flight legs 1010a-1010c and utilizes the flight legs 1010a-1010c to generate a flight path 1012.

Figure 10D:
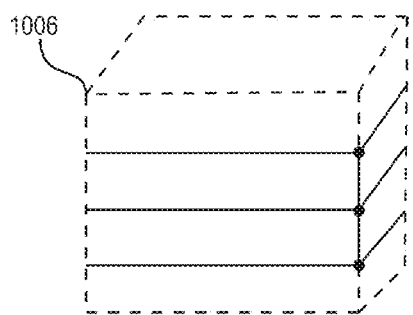

Upon generating the flight path 1012 in two-dimensional space, the mission generation system 100 can then project the flight path 1012 to three-dimensional space. In particular, the mission generation system 100 can wrap the flight path 1012 back onto the reference surface 1006. For instance, FIG. 10D illustrates the mission generation system 100 projecting the flight path 1012 onto the reference surface 1006. In particular, the mission generation system 100 translates the coordinates of the flight path 1012 in two-dimensional space to a horizontal and vertical distance along the reference surface 1006 from a starting point. Thus, the mission generation system 100 projects the flight path 1012 into a three-dimensional path that a UAV can follow to capture digital aerial images of all four vertical surfaces 1002a-1002d of the structure 1000.

Although FIG. 10D illustrates a reference surface that is a particular three-dimensional shape (e.g., a rectangular prism with an open top and bottom), the mission generation system 100 can utilize reference surfaces of a variety of different three-dimensional shapes. For example, rather than generating a rectangular prism utilizing the offset 1004, the mission generation system 100 can generate a cylinder (i.e., a cylinder with an open top and bottom). For instance, the mission generation system 100 can generate a cylinder with a diameter defined by the offset amount 1004. To illustrate, the mission generation system 100 can generate a cylinder that is a minimum of the offset amount 1004 away from any portion of the structure 1000. The mission generation system 100 can then utilize the cylinder as a reference surface, project the cylinder to a two-dimensional space, generate a flight path in the two-dimensional space, and then project the flight path back onto the reference surface.

In addition, although FIG. 10D illustrates a reference surface and flight paths with squared corners/edge, the mission generation system 100 can also generate a reference surface and flight paths with rounded corners/edges to reduce flight distance by a UAV. For example, the mission generation system 100 can generate a rectangular prism with rounded corners and edges by maintaining the offset 1004 from the vertical surfaces 1002a-1002d and also maintaining the offset 1004 around the corners/edges of the structure 1000. In other words, the mission generation system 100 can utilize a circular curve with a radius of the offset 1004 around the corners of the structure 1000 to generate the reference surface 1006 as a rectangular prism with rounded corners/edges. In this manner, the mission generation system 100 can maintain a minimum distance from the structure 1000 while also minimizing the flight distance around corners/edges of the structure 1000.

Furthermore, although the vertical surfaces 1002a-1002d of the structure 1000 are all vertically uniform, in some circumstances, the width of structures can vary significantly with regard to elevation. The mission generation system 100 can generate mission plans to capture digital aerial images of structures, even where the width of the structure varies.

Figure 11A:
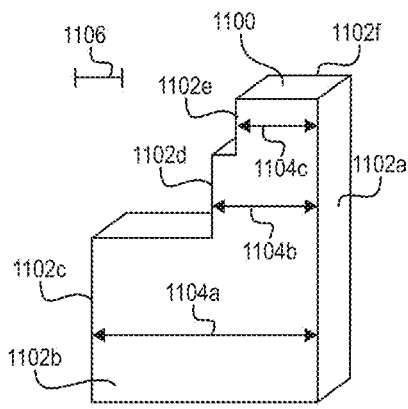
FIGS. 11A-11D illustrate a structure with variations in width and a representation of generating a reference surface and flight legs to capture digital aerial images of the structure in accordance with one or more embodiments.

For example, FIGS. 11A-11D illustrate generating a mission plan for capturing digital aerial images of a structure with vertical surfaces, where the width of the structure varies with respect to elevation. In particular, FIG. 11A illustrates a structure 1100 with vertical surfaces 1102a-1102f. Notably, the width of the structure 1100 changes with regard to elevation. Specifically, the structure 1100 has a first tier with a first width 1104a, a second tier with a second width 1104b, and a third tier with a third width 1104c.

As mentioned above, in one or more embodiments, the mission generation system 100 applies a variation threshold in relation to structures that vary with respect to width. Specifically, the mission generation system 100 can apply a variation threshold to determine whether a change in width is significant enough to warrant a change in a reference surface for generating flight legs. Indeed, minor changes in width will not impact resulting digital images significantly, but can increase computational time for generating reference surfaces and flight legs as well as increase flight time in traversing reference surfaces with multiple width changes. Accordingly, in one or more embodiments, the mission generation system 100 analyzes a change in width of a structure and applies a variation threshold.

For example, in relation to the embodiment of FIG. 11A, the mission generation system 100 applies the variation threshold 1106. Specifically, the mission generation system 100 compares the widths 1104a and 1104b and determines that the change in width satisfies the variation threshold 1106 (i.e., the change in width is greater than the variation threshold). Moreover, the mission generation system 100 compares the width 1104b and the width 1104c and determines that the change in width does not satisfy the variation threshold 1106 (i.e., the change in width is smaller than the variation threshold).

Based on the variation threshold, the mission generation system 100 can determine whether to incorporate a corresponding change in width in a reference surface. In particular, if a change in width satisfies a variation threshold, the mission generation system 100 can generate a reference surface that reflects the change in width. If a change in width does not satisfy a variation threshold, the mission generation system 100 can generate a reference surface that does not reflect the change in width.

Figure 11B:
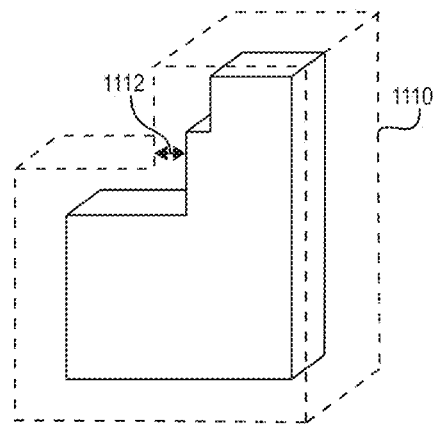

To illustrate, FIG. 11B illustrates a reference surface 1110. The mission generation system 100 generates the reference surface based on an offset 1112 from the structure 1100. However, the mission generation system 100 applies the offset 1112 based on a comparison between changes in width and the variation threshold 1106. To illustrate, the mission generation system 100 determines that the change between the width 1104b and 1104c does not satisfy the variation threshold, accordingly, the mission generation system 100 applies the offset 1112 to the vertical surface 1102d and extends the resulting surface (additionally, or in the alternative, the mission generation system 100 can utilize two different offsets for the vertical surfaces 1102d, 1102e to generate a corresponding reference surface that does not reflect a change in width). The result is a reference surface 1110 that does not reflect the change in width from 1104b to 1104c.

In contrast, the mission generation system 100 determines that the change between the width 1104a and the width 1104b satisfies the variation threshold. Accordingly, the mission generation system 100 generates the reference surface by offsetting the vertical surface 1102c and 1102d by the offset amount 1112. The result is a reference surface 1110 that reflects the change in width from 1104a to 1104b.

Figure 11C:
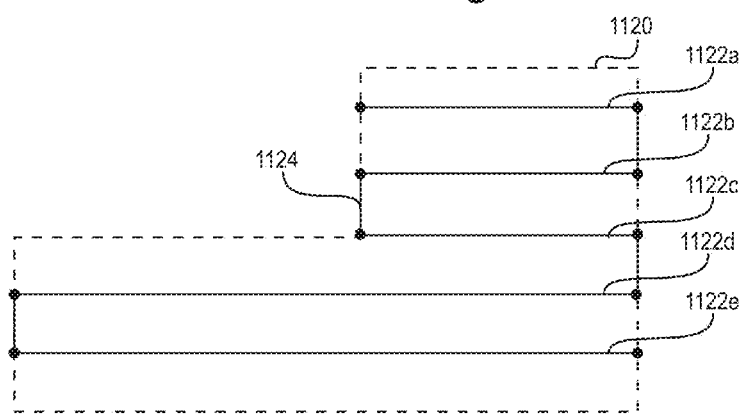

As shown in FIG. 11C, upon generating the reference surface 1110, the mission generation system 100 also generates flight legs and a flight path corresponding to the reference surface 1110. In particular, the mission generation system 100 projects the reference surface 1110 to a two-dimensional space, creating a two-dimensional representation 1120 of the reference surface 1110. Specifically, the mission generation system 100 can begin at a starting position on the reference surface 1110 and map the horizontal and vertical distance from the starting position along the reference surface 1110 to coordinates within a two-dimensional space. Moreover, as shown in FIG. 11C, the mission generation system 100 then generates flight legs 1122a-1122e within the two-dimensional representation 1120 and connects the flight legs to generate a flight path 1124.

Figure 11D:
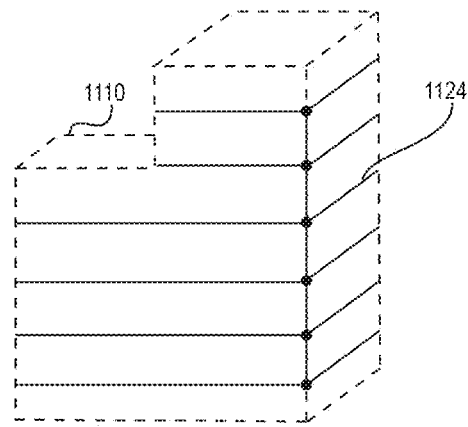

Moreover, as illustrated in FIG. 11D, the mission generation system 100 also projects the flight path 1124 from a two-dimensional space onto the reference surface 1110 (i.e., wrapping the flight path around the reference surface 1110). In particular, the mission generation system 100 converts coordinates of the flight path within the two-dimensional space to a vertical and horizontal distance along the outside of the reference surface 1110 from a starting point. As shown in FIG. 11D, the mission generation system 100 can thus generate the flight path 1124 in a three-dimensional space for traversing the structure 1100 and capturing digital aerial images. Moreover, the mission generation system 100 can then utilize the digital aerial images to generate a three-dimensional model of the vertical surfaces 1102a-1102f.

Although not illustrated in FIGS. 11A-11D, the mission generation system 100 can also generate leg spacings and offsets based on a camera angle (e.g., as discussed in relation to FIG. 9B). Indeed, as mentioned earlier, the mission generation system 100 can apply a minimum flight altitude over any horizontal surface and adjust a camera angle to capture positions of a structure that fall below the minimum flight altitude. Moreover, the mission generation system 100 can generate flight legs at different offsets to account for the change in camera angle and generate flight legs with different leg spacings to account for the change in camera angle.

Further, although FIGS. 11A-11D illustrate generating a single three-dimensional reference surface 1110 from a plurality of vertical surfaces 1102a-1102f as mentioned above, the mission generation system 100 can also analyze and generate a flight path for each vertical surface individually (e.g., as described in relation to FIGS. 9A-9B). Indeed, the mission generation system 100 can generate a reference surface and flight path corresponding to the vertical surface 1102a, another reference surface and flight path corresponding to the vertical surface 1102b, and so forth for each of the vertical surfaces 1102a-1102f.

Although FIGS. 11A-11D illustrate a particular approach for generating a reference surface for a structure with variations in width, as mentioned above, the mission generation system 100 can utilize a variety of other approaches. For example, as discussed above, in one or more embodiments, the mission generation system 100 utilizes one or more voxels to approximate the shape of a structure. Utilizing this approach, the mission generation system 100 can estimate the shape of the structure based on the size of the voxels and modify the reference surface based on the voxels utilized to estimate the shape of the structure. In particular, the mission generation system 100 can fill a region defined by vertical surfaces of a structure with voxels and automatically smooth variations in the vertical surfaces of the structure based on the size of the voxels. For instance, the mission generation system 100 can utilize larger voxels to roughly estimate the shape of a structure, and utilize smaller voxels to more specifically estimate the shape of the structure. The mission generation system 100 can then expand the estimated shape of the structure as defined by the voxels to generate a reference surface. In this manner, the mission generation system 100 can generate the reference surface 1110 and then generate flight legs from the reference surface.

Furthermore, as mentioned above, the mission generation system 100 can also apply a mesh simplification algorithm to generate a reference surface with regard to a structure with vertical surfaces that vary in width. The mission generation system 100 can apply a variety of mesh simplification algorithms, including vertex clustering, shape approximation, vertex decimation, edge contraction, or similar algorithms to approximate a simplified polygon from a three-dimensional representation of a structure. The mission generation system 100 can then expand the simplified polygon into the reference surface 1110 and generate flight legs (as described above).

In addition, as previously described, in one or more embodiments, the mission generation system 100 utilizes a ground profile to generate a reference surface with regard to a structure of varying width. Specifically, because vertical structures generally become more narrow as they increase in height, the mission generation system 100 can utilize the shape of a structure at a base (e.g., at the ground level, or at a base level where the structure changes width) to generate a reference surface for generating a flight path. To illustrate, the mission generation system can identify a ground profile of a structure (e.g., a two-dimensional shape of the structure at ground level) and extrude the ground profile into an approximation of the vertical structure (e.g., ignoring variations in width). The mission generation system 100 can then expand the approximation of the vertical structure into a reference surface.

Figure 12:
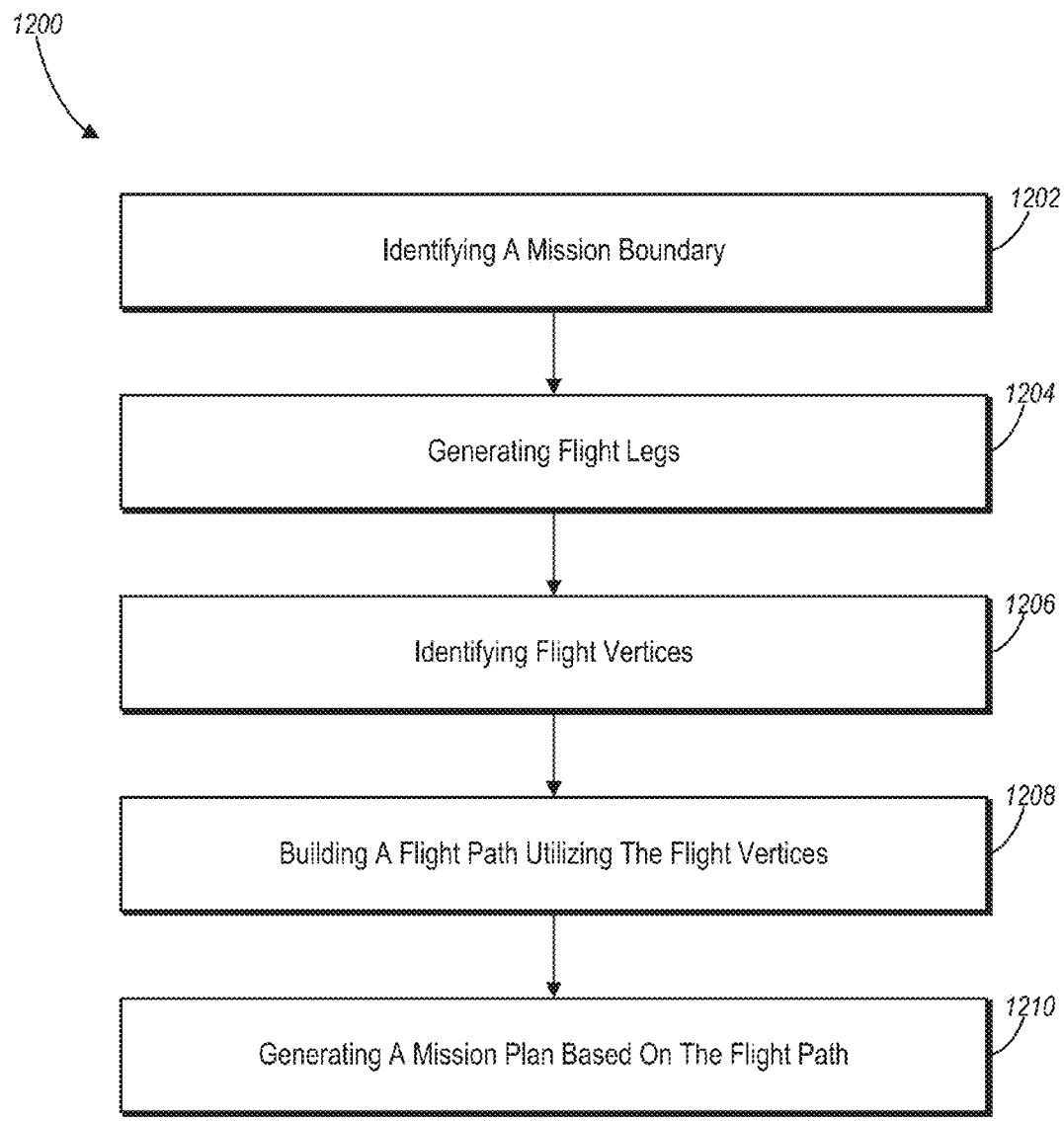
FIG. 12 illustrates a flowchart of a series of acts in a method of generating a mission plan in accordance with one or more embodiments.
Figure 13:
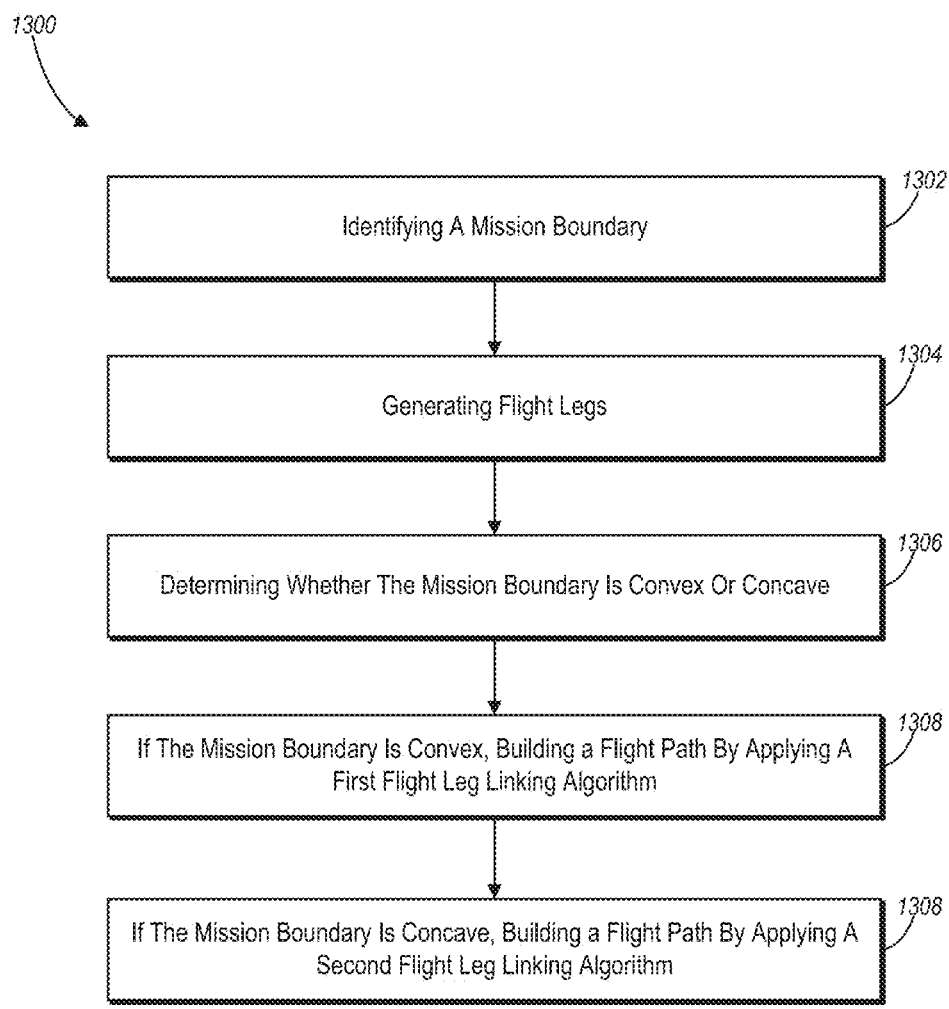
FIG. 13 illustrates another flowchart of a series of acts in a method of generating a mission plan in accordance with one or more embodiments.
Figure 14:
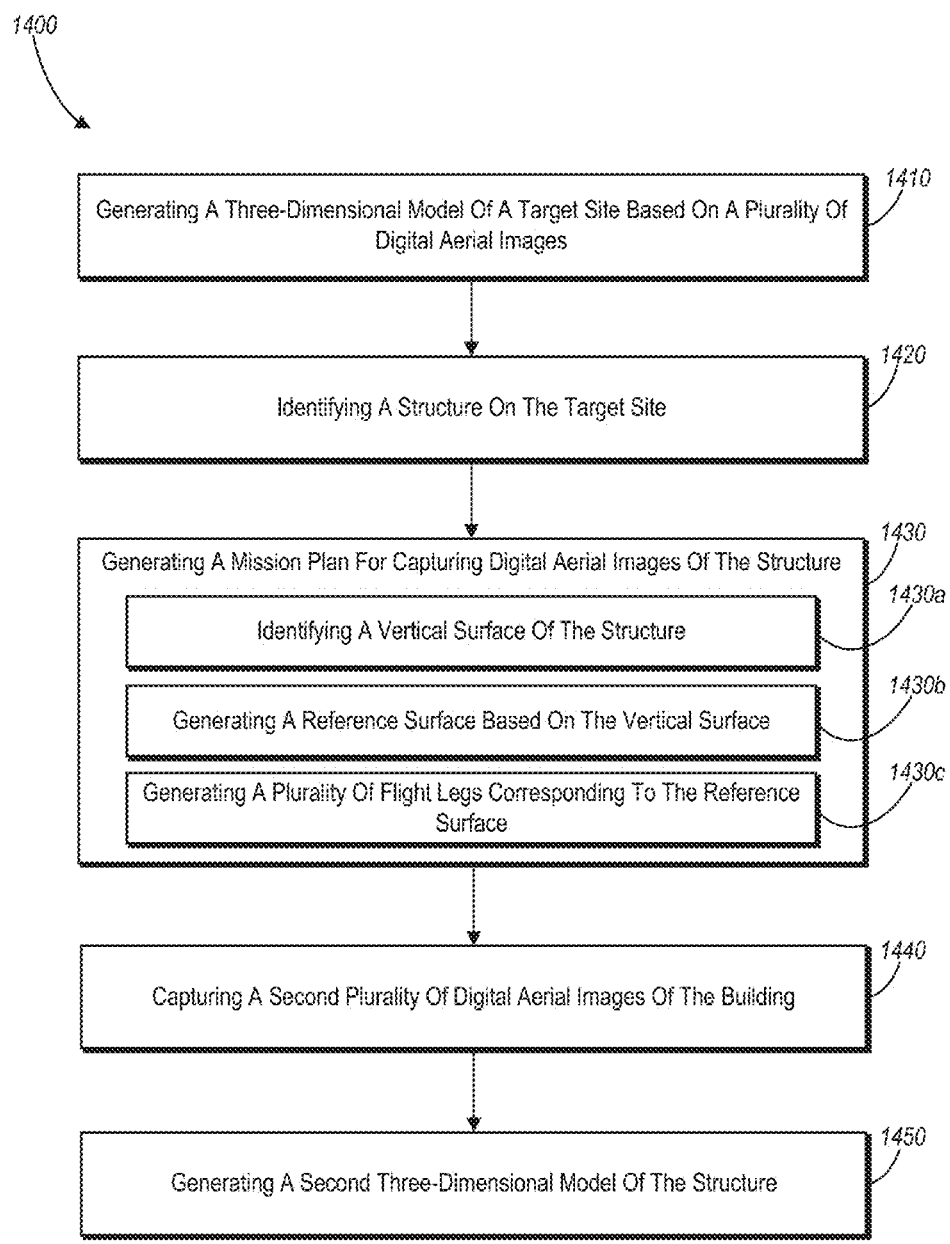
FIG. 14 illustrates another flowchart of a series of acts in a method of generating a mission plan in accordance with one or more embodiments.

FIGS. 1-11D, the corresponding text, and the examples, provide a number of different systems and devices for generating a mission plan. In addition to the foregoing, one or more embodiments can also be described in terms of flowcharts comprising acts and steps in a method for accomplishing a particular result. For example, FIGS. 12-14 illustrate flowcharts of exemplary methods in accordance with one or more embodiments. The methods described in relation to FIGS. 12-14 may be performed with less or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart of one example method 1200 of generating a mission plan in accordance with one or more embodiments. As illustrated, the method 1200 may include the act 1202 of identifying a mission boundary. In particular, the act 1202 includes identifying a mission boundary defining a UAV flight area, the mission boundary encompassing a target site for capturing a plurality of aerial images by a UAV.

For instance, the act 1202 may include accessing digital flight area information, the digital flight area information comprising at least one of: a digital flight zone, a digital property boundary, a digital aerial image, or a digital survey. Moreover, the act 1202 may include transforming the digital flight area information to at least a portion of the mission boundary.

As illustrated in FIG. 12, the method 1200 also includes an act 1204 of generating flight legs. In particular, the act 1204 may include generating, by at least one processor, flight legs for the UAV flight area, the flight legs being separated by a leg spacing based on one or more characteristics of the UAV, and each flight leg intersecting the mission boundary at two endpoints. For instance, in one or more embodiments, the one or more characteristics of the UAV comprises at least one of the following: a resolution of a camera affixed to the UAV, a resolution of images resulting from use of the camera, a lens angle of the camera, a width of images resulting from use of the camera, or a maximum flight altitude of the UAV.

In addition, the act 1204 may also include generating each flight leg at a flight angle. Moreover, the act 1204 can include calculating the flight angle applicable to the flight legs such that the angle maximizes an average length of the flight legs.

Moreover, as shown in FIG. 12, the method 1200 also includes an act 1206 of identifying flight vertices. In particular, the act 1206 may include identifying flight vertices, the flight vertices comprising corners of the mission boundary and the endpoints for each of the flight legs.

In addition, FIG. 12 illustrates that the method 1200 also includes an act 1208 of building a flight path utilizing the flight vertices. In particular, the act 1208 includes building, by the at least one processor, a flight path by combining the flight legs utilizing the flight vertices, wherein the flight path does not extend beyond the mission boundary.

Moreover, the act 1208 may also include determining whether the mission boundary is convex or concave. In addition, if the mission boundary is convex, the act 1208 may include building a flight path by applying a first flight leg linking algorithm. Similarly, if the mission boundary is concave, the act 1208 may include building a flight path by applying a second flight leg linking algorithm different from the first flight leg linking algorithm. More specifically, in one or more embodiments, the act 1208 includes calculating a plurality of shortest connections by, for a plurality of pairs of the endpoints, calculating the shortest connection within the UAV flight area between each pair of endpoints. Moreover, in one or more embodiments, the first flight leg linking algorithm is a nearest-neighbor linking algorithm that utilizes the flight legs and the plurality of shortest connections to combine a second flight leg to an initial flight leg based on a determination that the second flight leg and the initial flight leg are closest in proximity. In addition, in one or more embodiments, the second flight leg linking algorithm is a cheapest-edge linking algorithm that utilizes the flight legs and the plurality of shortest connections to combine flight legs based on a determination of the shortest connection available between unused flight leg endpoints that does not create a cycle or a three-degree vertex.

Furthermore, the act 1208 may also include determining that the number of flight legs falls below a predetermined flight leg threshold and, based on the determination that the number of flight legs falls below the predetermined flight leg threshold, applying a third algorithm different from the first algorithm and the second algorithm. For instance, in one or more embodiments, the third algorithm is a brute-force algorithm.

As shown in FIG. 12, the method 1200 also includes the act 1210 of generating a mission plan based on the flight path. In particular, the act 1210 includes generating a mission plan based on the flight path, the mission plan comprising computer-executable instructions for causing the UAV to capture aerial images of the target site in accordance with the flight path.

In addition, in one or more embodiments, the act 1210 includes identifying digital elevation data with regard to the target site. Furthermore, the act 1210 can include defining UAV flight altitudes within the mission plan based on the digital elevation data and the one or more characteristics of the UAV. For instance, the act 1210 can include capturing a plurality of aerial images of the target site utilizing a UAV, and calculating elevation data with regard to the target site based on the plurality of aerial images. Thus, the act 1210 can include defining UAV flight altitude within the mission plan based on the elevation data and the one or more characteristics of the UAV. Moreover, the act 1210 can include accessing a digital image, the digital image comprising elevation data transformed into RGB values within the digital image, and transforming a plurality of the RGB values into elevation data.

The act 1210 can also include identifying an obstacle, the obstacle corresponding to an obstacle elevation. In addition, the act 1210 can include creating a first waypoint at a first altitude, the first altitude lower than the obstacle elevation; creating a second waypoint at a second altitude, the second waypoint higher than the obstacle elevation; and adding the first waypoint and the second waypoint to the mission plan such that the first waypoint and the second waypoint correspond to a location of the obstacle.

FIG. 13 illustrates another flowchart of one example method 1300 of generating a mission plan in accordance with one or more embodiments. As illustrated, the method 1300 may include the act 1302 of identifying a mission boundary. In particular, in one or more embodiments, the act 1302 includes identifying a mission boundary defining a UAV flight area.

As illustrated in FIG. 13, the method 1300 also includes the act 1304 of generating flight legs. In particular, the act 1302 may include generating, by at least one processor, flight legs for the UAV flight area, the flight legs contained within the UAV flight area.

Moreover, FIG. 13 also shows that the method 1300 includes the act 1306 of determining whether the mission boundary is convex or concave. For instance, the act 1306 may include determining that the mission boundary is convex. Additional, or alternatively, the act 1306 may include determining that the mission boundary is concave. Similarly, the act 1306 may include identifying a plurality of mission boundaries and determining whether each of the plurality of mission boundaries is convex or concave. In addition, the act 1306 may also include identifying an inner mission boundary and an outer mission boundary. The act 1306 may also include determining that the inner mission boundary is encompassed by the outer mission boundary.

As shown in FIG. 13, the method 1300 also includes the act 1308 of, if the mission boundary is convex, building a flight path by applying a first flight leg linking algorithm. For instance, the act 1308 may include if the mission boundary is convex, building a flight path by applying a first flight leg linking algorithm to the flight legs.

For instance the act 1308 may include applying a nearest-neighbor linking algorithm. More specifically, the act 1308 may include identifying a starting point comprising a first endpoint corresponding to an initial flight leg, the initial flight leg having both the first endpoint and a second endpoint; identifying a third endpoint corresponding to a second flight leg, the third endpoint being closest to the second endpoint of the initial flight leg along a first shortest connection from the shortest connections within the permissible UAV flight area; and building the flight path by combining the first flight leg, the first shortest connection, and the second flight leg.

Furthermore the act 1308 may also include, identifying a plurality of additional starting points, each additional starting point comprising a different endpoint; building a plurality of additional flight paths based on the plurality of additional starting points; and selecting the flight path based on a comparison between the length of the flight path and the length of each additional flight path.

Similarly, as illustrated in FIG. 13, the method 1300 also includes the act 1310 of, if the mission boundary is concave, building a flight path by applying a second flight leg linking algorithm. In particular, the act 1310 may include if the mission boundary is concave, building a flight path by applying a second flight leg linking algorithm different from the first flight leg linking algorithm to the flight legs.

For instance, the second flight leg linking algorithm may include a cheapest-edge linking algorithm. Accordingly, in one or more embodiments, the act 1310 includes adding each flight leg to the flight path; identifying the shortest connection from the calculated shortest connections within the UAV flight area between the plurality of the endpoints; adding the identified shortest connection to the flight path; identifying the next shortest connection from the remaining shortest connections within the permissible UAV flight area between a plurality of the endpoints; and based upon a determination that adding the next shortest connection to the flight path does not create a cycle and does not result in a three-degree vertex, adding the next shortest connection to the flight path. In one or more embodiments, each flight leg intersects the mission boundary at two endpoints. Moreover, the method 1300 may also include calculating, utilizing a Floyd-Warshall algorithm, the shortest connections within the UAV flight area between a plurality of endpoints.

FIG. 14 illustrates another flowchart of one example method 1400 of generating a mission plan in accordance with one or more embodiments. In particular, as shown in FIG. 14, the method 1400 includes an act 1410 of generating a three-dimensional model of a target site based on a plurality of digital aerial images. In particular, the act 1410 can include generating a three-dimensional model of a target site based on a plurality of digital aerial images of the target site captured by a UAV. For example, in one or more embodiments, the act 1410 includes generating a plurality of low-resolution digital aerial images from the plurality of digital aerial images by scaling down the plurality of digital aerial images of the target site captured by the UAV; and utilizing the low-resolution digital aerial images to generate a low-resolution three-dimensional representation. Further, in one or more embodiments, the act 1430 comprises generating a three-dimensional model of a target site based on a plurality of digital aerial images of the target site captured by a UAV during a mission plan, while the UAV is flying the mission plan of the target site.

As illustrated in FIG. 14, the method 1400 also includes an act 1420 of identifying a structure on the target site. In particular, the act 1430 can include identifying a structure on the target site based on the three-dimensional model of the target site. For example, in one or more embodiments, the act 1420 includes providing the three-dimensional representation for display to a computing device of a user; receiving a user interaction with the three-dimensional representation; and identifying the structure on the target site based on the user interaction with the three-dimensional representation.

In addition, as illustrated in FIG. 14, the method 1400 also includes an act 1430 of generating a mission plan for capturing digital aerial images of the structure. In particular, the act 1430 can include generating a mission plan for capturing digital aerial images of the structure from different positions and elevations. Moreover, in one or more embodiments, the act 1430 includes modifying the mission plan to capture digital aerial images of the structure from different positions and elevations while the UAV is flying the mission plan.

As shown in FIG. 14, the act 1430 can also include the act 1430*a* of identifying a vertical surface of the structure. In particular, the act 1430*a* includes identifying a vertical surface of the structure from the three-dimensional model. For example, in one or more embodiments, identifying the vertical surface of the structure comprises identifying a plurality of vertical surfaces of the structure from the three-dimensional representation.

Moreover, as illustrated, the act 1430 can also include the act 1430*b* of generating a reference surface based on the vertical surface. In particular, the act 1430*b* can include generating a reference surface by offsetting the vertical surface of the structure based on a camera resolution. For example, in one or more embodiments, generating the reference surface comprises offsetting the plurality of vertical surfaces of the structure based on the camera resolution to generate a three-dimensional shape.

Further, in one or more embodiments, the act 1430*b* includes detecting a variation in width of the structure with respect to elevation; comparing the variation in width of the structure with a variation threshold; if the variation satisfies the variation threshold, generating the three-dimensional shape such that the three-dimensional shape comprises a change in width corresponding to the variation in width of the structure; and if the variation does not satisfy the variation threshold, generating the three-dimensional shape such that the three-dimensional shape does not comprise a change in width corresponding to the variation in width of the structure.

In addition, as shown in FIG. 14, the act 1430 can also include the act 1430*c* of generating a plurality of flight legs corresponding to the reference surface. For example, in one or more embodiments, the act 1430 includes projecting the three-dimensional shape to a two-dimensional space; determining a leg spacing based on an amount of overlap between digital aerial images; and utilizing the leg spacing, generating parallel flight legs on the three-dimensional shape projected on the two-dimensional space. Moreover, in one or more embodiments, the act 1430 includes projecting the reference surface from a three-dimensional space to a two-dimensional space; generating parallel flight legs on the reference surface projected on the two-dimensional space at a leg spacing based on an amount of overlap between digital aerial images; and projecting the parallel flight legs to the three-dimensional space.

In one or more embodiments, the act 1430 includes identifying a portion of the vertical surface below a minimum flight altitude; determining a camera angle to capture the portion of the vertical surface below the minimum flight altitude from a position above the minimum flight altitude; determining an offset of the vertical reference surface based on the camera resolution and the camera angle; and generating a flight leg based on the offset.

Moreover, in one or more embodiments, the act 1430 can include determining a first offset corresponding to a portion of the vertical surface above a minimum flight altitude; generating a first flight leg based on the first offset; identifying a portion of the vertical surface below a minimum flight altitude; determining a camera angle to capture a digital aerial image of the portion of the vertical surface below the minimum flight altitude from a position above the minimum flight altitude; determining a second offset of the vertical reference surface based on the camera resolution and the camera angle; and generating a second flight leg based on the second offset.

In addition, the act 1430 can also include detecting a variation in width of the structure with respect to elevation; comparing the variation in width of the structure with a variation threshold; if the variation satisfies the variation threshold, generating the three-dimensional shape such that the three-dimensional shape comprises a change in width corresponding to the variation in width of the structure; and if the variation does not satisfy the variation threshold, generating the three-dimensional shape such that the three-dimensional shape does not comprise a change in width corresponding to the variation in width of the structure.

As shown in FIG. 14, the method 1400 also includes an act 1440 of capturing a second plurality of digital aerial images of the building. In particular, the act 1440 can include capturing a second plurality of digital aerial images of the structure by causing the UAV to fly the mission plan.

Moreover, as illustrated in FIG. 14, the method 1400 also includes an act 1450 of generating a second three-dimensional model of the structure. In particular, the act 1450 can include generating, by the at least one processor, a second three-dimensional representation of the structure based on the second plurality of digital aerial images of the structure.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
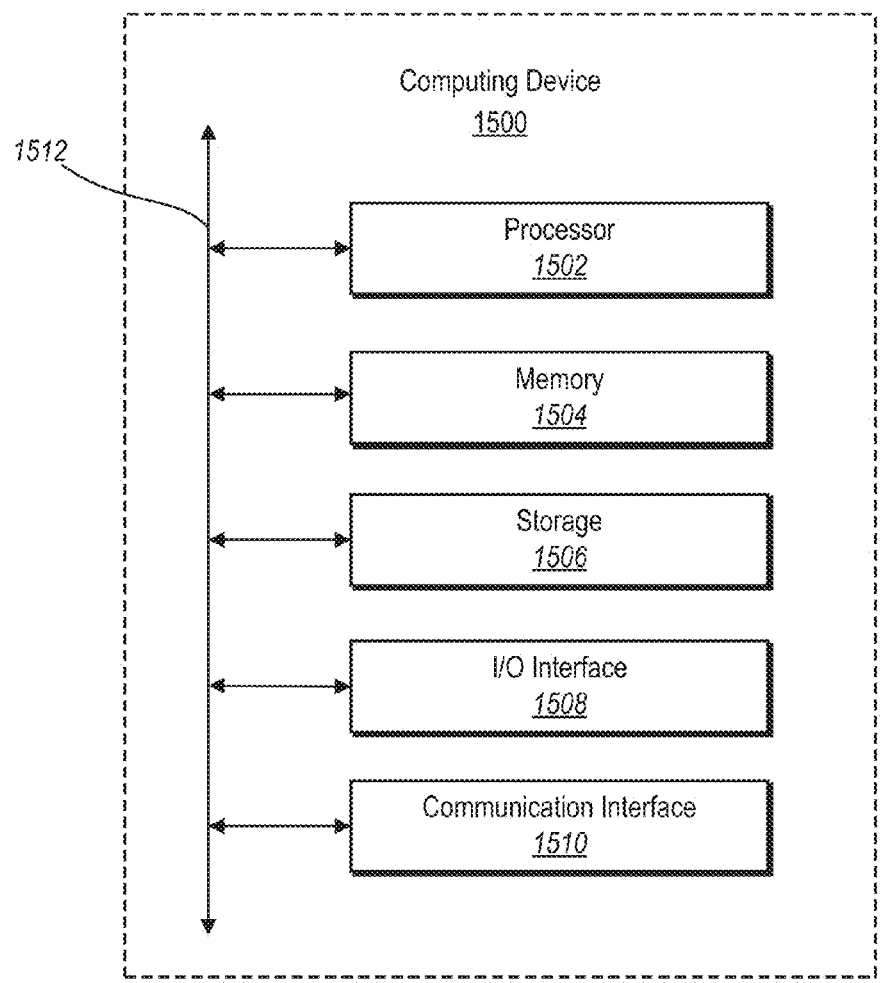
FIG. 15 illustrates a block diagram of an exemplary computing device in accordance with one or more embodiments.

FIG. 15 illustrates a block diagram of an exemplary computing device 1500 that may be configured to perform one or more of the processes described above. One will appreciate that the mission generation system 100 may be implemented by one or more computing devices such as the computing device 1500. As shown by FIG. 15, the computing device 1500 can comprise a processor 1502, memory 1504, a storage device 1506, an I/O interface 1508, and a communication interface 1510, which may be communicatively coupled by way of a communication infrastructure 1512. While an exemplary computing device 1500 is shown in FIG. 15, the components illustrated in FIG. 15 are not intended to be limiting. Additional or alternative components may be used in other embodiments. Furthermore, in certain embodiments, the computing device 1500 can include fewer components than those shown in FIG. 15. Components of the computing device 1500 shown in FIG. 15 will now be described in additional detail.

In particular embodiments, the processor 1502 includes hardware for executing instructions, such as those making up a computer program. As an example and not by way of limitation, to execute instructions, the processor 1502 may retrieve (or fetch) the instructions from an internal register, an internal cache, the memory 1504, or the storage device 1506 and decode and execute them. In particular embodiments, the processor 1502 may include one or more internal caches for data, instructions, or addresses. As an example and not by way of limitation, the processor 1502 may include one or more instruction caches, one or more data caches, and one or more translation lookaside buffers (TLBs). Instructions in the instruction caches may be copies of instructions in the memory 1504 or the storage 1506.

The memory 1504 may be used for storing data, metadata, and programs for execution by the processor(s). The memory 1504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1504 may be internal or distributed memory.

The storage device 1506 includes storage for storing data or instructions. As an example and not by way of limitation, the storage device 1506 can comprise a non-transitory storage medium described above. The storage device 1506 may include a hard disk drive (HDD), a floppy disk drive, flash memory, an optical disc, a magneto-optical disc, magnetic tape, or a Universal Serial Bus (USB) drive or a combination of two or more of these. The storage device 1506 may include removable or non-removable (or fixed) media, where appropriate. The storage device 1506 may be internal or external to the computing device 1500. In particular embodiments, the storage device 1506 is non-volatile, solid-state memory. In other embodiments, the storage device 1506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1508 allows a user to provide input to, receive output from, and otherwise transfer data to and receive data from the computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example and not by way of limitation, the communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1512 may include hardware, software, or both that couples components of the computing device 1500 to each other. As an example and not by way of limitation, the communication infrastructure 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

I claim:

1. A computer-implemented method comprising:
generating, by at least one processor, a three-dimensional representation of a target site based on a plurality of digital aerial images of the target site captured by a UAV;
identifying, by the at least one processor, a structure on the target site based on the three-dimensional representation;
generating, by the at least one processor, a mission plan for capturing digital aerial images of the structure from different positions and different elevations by:
identifying a vertical surface of the structure from the three-dimensional representation;
generating a reference surface from the vertical surface by offsetting the vertical surface of the structure based on a camera resolution; and
generating a plurality of flight legs that traverse the different elevations based on the reference surface;
capturing a second plurality of digital aerial images of the structure at the different elevations by causing the UAV to fly the mission plan; and
generating, by the at least one processor, a second three-dimensional representation of the structure based on the second plurality of digital aerial images of the structure.

2. The method of claim 1, wherein generating the three-dimensional representation comprises:
generating a plurality of low-resolution digital aerial images from the plurality of digital aerial images by scaling down the plurality of digital aerial images of the target site captured by the UAV; and
utilizing the low-resolution digital aerial images to generate a low-resolution three-dimensional representation.

3. The method of claim 1, wherein identifying the structure comprises:
providing the three-dimensional representation for display to a computing device of a user;
receiving a user interaction with the three-dimensional representation; and
identifying the structure on the target site based on the user interaction with the three-dimensional representation.

4. The method of claim 1, wherein:
identifying the vertical surface of the structure comprises identifying a plurality of vertical surfaces of the structure from the three-dimensional representation; and
generating the reference surface comprises offsetting the plurality of vertical surfaces of the structure based on the camera resolution to generate a three-dimensional shape.

5. The method of claim 4, wherein generating the plurality of flight legs corresponding to the reference surface comprises:
projecting the three-dimensional shape to a two-dimensional space;
determining a leg spacing based on an amount of overlap between digital aerial images; and
utilizing the leg spacing, generating parallel flight legs on the three-dimensional shape projected on the two-dimensional space.

6. The method of claim 1, wherein generating the mission plan comprises:
identifying a portion of the vertical surface below a minimum flight altitude;
determining a camera angle to capture the portion of the vertical surface below the minimum flight altitude from a position above the minimum flight altitude;
determining an offset of the vertical surface based on the camera resolution and the camera angle; and
generating a flight leg based on the offset.

7. The method of claim 4, wherein generating the reference surface comprises:
detecting a variation in width of the structure with respect to elevation;
comparing the variation in width of the structure with a variation threshold;
if the variation satisfies the variation threshold, generating the three-dimensional shape such that the three-dimensional shape comprises a change in width corresponding to the variation in width of the structure; and
if the variation does not satisfy the variation threshold, generating the three-dimensional shape such that the three-dimensional shape does not comprise a change in width corresponding to the variation in width of the structure.

8. A system comprising:
at least one processor; and
at least one non-transitory computer readable storage medium storing instructions thereon that, when executed by the at least one processor, cause the system to:
generate a three-dimensional model of a target site based on a plurality of digital aerial images of the target site captured by a UAV;
identify a structure on the target site based on the three-dimensional model of the target site;
generate a mission plan for capturing digital aerial images of the structure from different positions and different elevations by:
identifying a vertical surface of the structure from the three-dimensional model;
generating a reference surface from the vertical surface by offsetting the vertical surface of the structure based on a camera resolution; and
generating a plurality of flight legs that traverse the different elevations based on the reference surface;
capturing a second plurality of digital aerial images of the structure at the different elevations by causing the UAV to fly the mission plan; and
generating a second three-dimensional model of the structure based on the second plurality of digital aerial images of the structure.

9. The system of claim 8, further comprising instructions that, when executed by the at least one processor, cause the system to generate the three-dimensional model by:
generating a plurality of low-resolution digital aerial images from the plurality of digital aerial images by scaling down the plurality of digital aerial images of the target site captured by the UAV; and
utilizing the low-resolution digital aerial images to generate a low-resolution three-dimensional model.

10. The system of claim 8, further comprising instructions that, when executed by the at least one processor, cause the system to identify the structure by:

providing the three-dimensional model for display to a computing device of a user;
receiving a user interaction with the three-dimensional model; and
identifying the structure on the target site based on the user interaction with the three-dimensional model.

11. The system of claim 8, further comprising instructions that, when executed by the at least one processor, cause the system to:
identify the vertical surface of the structure by identifying a plurality of vertical surfaces of the structure from the three-dimensional model; and
generate the reference surface by offsetting the plurality of vertical surfaces of the structure based on the camera resolution to generate a three-dimensional shape.

12. The system of claim 11, further comprising instructions that, when executed by the at least one processor, cause the system to generate the plurality of flight legs by:
projecting the three-dimensional shape to a two-dimensional space; and
generating parallel flight legs on the three-dimensional shape projected on the two-dimensional space at a leg spacing based on an amount of overlap between digital aerial images.

13. The system of claim 8, further comprising instructions that, when executed by the at least one processor, cause the system to generate the mission plan by:
determining a first offset corresponding to a portion of the vertical surface above a minimum flight altitude;
generating a first flight leg based on the first offset;
identifying a portion of the vertical surface below the minimum flight altitude;
determining a camera angle to capture a digital aerial image of the portion of the vertical surface below the minimum flight altitude from a position above the minimum flight altitude;
determining a second offset of the vertical surface based on the camera resolution and the camera angle; and
generating a second flight leg based on the second offset.

14. The system of claim 11, further comprising instructions that, when executed by the at least one processor, cause the system to generate the reference surface by:
detecting a variation in width of the structure with respect to elevation;
comparing the variation in width of the structure with a variation threshold;
if the variation satisfies the variation threshold, generating the three-dimensional shape such that the three-dimensional shape comprises a change in width corresponding to the variation in width of the structure; and
if the variation does not satisfy the variation threshold, generating the three-dimensional shape such that the three-dimensional shape does not comprise a change in width corresponding to the variation in width of the structure.

15. A computer-implemented method comprising:
while a UAV is flying a mission plan of a target site, generating, by at least one processor, a three-dimensional model of the target site based on a plurality of digital aerial images of the target site captured by the UAV during the mission plan;
identifying, by the at least one processor, a structure on the target site based on the three-dimensional model;
while the UAV is flying the mission plan, modifying, by the at least one processor, the mission plan to capture digital aerial images of the structure from different positions and different elevations by:
identifying a vertical surface of the structure from the three-dimensional model;
generating a reference surface by offsetting the vertical surface of the structure; and
generating a plurality of flight legs that traverse the different elevations based on the reference surface; and
capturing a second plurality of digital aerial images of the structure at the different elevations by causing the UAV to fly the modified mission plan; and
generating a second three-dimensional model of the structure based on the second plurality of digital aerial images of the structure.

16. The method of claim 15, wherein generating the three-dimensional model comprises:
generating a plurality of low-resolution digital aerial images from the plurality of digital aerial images by scaling down the plurality of digital aerial images of the target site captured by the UAV; and
utilizing the low-resolution digital aerial images to generate a low-resolution three-dimensional model while the UAV is flying the mission plan.

17. The method of claim 15, wherein identifying the structure comprises:
providing the three-dimensional model for display to a computing device of a user while the UAV is flying the mission plan;
receiving a user interaction with the three-dimensional model while the UAV is flying the mission plan; and
identifying the structure on the target site based on the user interaction with the three-dimensional model.

18. The method of claim 15, wherein generating the plurality of flight legs comprises:
projecting the reference surface from a three-dimensional space to a two-dimensional space;
generating parallel flight legs on the reference surface projected on the two-dimensional space at a leg spacing based on an amount of overlap between digital aerial images; and
projecting the parallel flight legs to the three-dimensional space.

19. The method of claim 15, wherein generating the reference surface comprises:
determining a first offset corresponding to a portion of the vertical surface above a minimum flight altitude;
generating a first flight leg based on the first offset;
identifying a portion of the vertical surface below the minimum flight altitude;
determining a camera angle to capture a digital aerial image of the portion of the vertical surface below the minimum flight altitude from a position above the minimum flight altitude;
determining a second offset of the vertical surface based on a camera resolution and the camera angle; and
generating a second flight leg based on the second offset.

20. The method of claim 15, further comprising:
detecting a variation in width of the structure with respect to elevation;
comparing the variation in width of the structure with a variation threshold;
if the variation satisfies the variation threshold, generating the reference surface such that the reference surface comprises a change in width corresponding to the variation in width of the structure; and
if the variation does not satisfy the variation threshold, generating the reference surface such that the reference surface does not comprise a change in width corresponding to the variation in width of the structure.

* * * * *